(12) United States Patent
Longley et al.

(10) Patent No.: US 11,591,133 B2
(45) Date of Patent: *Feb. 28, 2023

(54) PALLET COVER COMPRISING ONE OR MORE TEMPERATURE-CONTROL MEMBERS AND KIT FOR USE IN MAKING THE PALLET COVER

(71) Applicant: Cold Chain Technologies, LLC, Franklin, MA (US)

(72) Inventors: Amanda Longley, Hudson, MA (US); Geoffrey Kaiser, Westborough, MA (US); James Robert Chasteen, Grosse Pointe Farms, MI (US); Shreyas S. Panse, Boston, MA (US); Richard M. Formato, Grafton, MA (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 578 days.

This patent is subject to a terminal disclaimer.

(21) Appl. No.: 16/614,220

(22) PCT Filed: May 15, 2018

(86) PCT No.: PCT/US2018/032828
§ 371 (c)(1),
(2) Date: Nov. 15, 2019

(87) PCT Pub. No.: WO2018/213348
PCT Pub. Date: Nov. 22, 2018

(65) Prior Publication Data
US 2021/0331834 A1 Oct. 28, 2021

Related U.S. Application Data

(63) Continuation-in-part of application No. 15/595,671, filed on May 15, 2017, now Pat. No. 10,583,978, (Continued)

(51) Int. Cl.
B65D 19/38 (2006.01)
B65D 81/18 (2006.01)
B65D 81/38 (2006.01)

(52) U.S. Cl.
CPC .............. B65D 19/38 (2013.01); B65D 81/18 (2013.01); B65D 81/3897 (2013.01); B65D 2519/00218 (2013.01); B65D 2519/00537 (2013.01)

(58) Field of Classification Search
CPC .................... B65D 19/38; B65D 81/18; B65D 2519/00218; B65D 2519/00537
See application file for complete search history.

(56) References Cited

U.S. PATENT DOCUMENTS 3,950,789 A 4/1976 Konz et al.
4,000,815 A 1/1977 Wingbro et al.
(Continued)

FOREIGN PATENT DOCUMENTS

AU 705627 B2 5/1999
CA 2371456 C 4/2009
(Continued)

OTHER PUBLICATIONS

Energy Shield Insulated Pallet Covers' (Steel Guard) Apr. 23, 2015. Retrieved from the Internet on Dec. 6, 2016. URL: https://web.archive.org/web/20150423145914/http://www.steelguardsafety.com/insulated-pallet-covers.
(Continued)

Primary Examiner — Matthew W Ing
(74) Attorney, Agent, or Firm — Kriegsman & Kriegsman

(57) ABSTRACT

A pallet cover suitable for use in covering at least a portion of a payload on a pallet and a kit for use in making the pallet cover. In one embodiment, the pallet cover includes a top wall, a front wall, a rear wall, a left side wall, and a right side
(Continued)

wall, wherein the walls are detachably joined to one another. Each of the top wall, the front wall, the rear wall, the left side wall, and the right side wall includes a first fabric sheet and a second fabric sheet, the first and second fabric sheets being joined together to form a plurality of pockets. Each pocket may removably receive a temperature-control member containing a phase-change material. At least one of the top wall, the front wall, the rear wall, the left side wall and the right side wall may include a plurality of detachably joined portions.

29 Claims, 46 Drawing Sheets

Related U.S. Application Data which is a continuation-in-part of application No. 15/287,631, filed on Oct. 6, 2016, now Pat. No. 10,604,326.

(60) Provisional application No. 62/400,015, filed on Sep. 26, 2016, provisional application No. 62/237,742, filed on Oct. 6, 2015.

(56) References Cited

U.S. PATENT DOCUMENTS

| | | |
|---|---|---|
| 4,311,022 A | 1/1982 | Hall |
| 4,324,111 A | 4/1982 | Edwards |
| 4,377,075 A | 3/1983 | Russo |
| 4,399,668 A | 8/1983 | Williamson |
| 4,413,481 A | 11/1983 | Thomas |
| 4,442,162 A | 4/1984 | Kuester |
| 4,585,003 A | 4/1986 | Meistrell |
| 4,676,247 A | 6/1987 | Van Cleve |
| 4,688,572 A | 8/1987 | Hubbard et al. |
| 4,700,706 A | 10/1987 | Muench |
| 4,846,176 A | 7/1989 | Golden |
| 4,892,226 A | 1/1990 | Abtahi |
| H000759 H | 4/1990 | Jones |
| 4,986,089 A | 1/1991 | Raab |
| 4,989,418 A | 2/1991 | Hewlett |
| 5,005,374 A | 4/1991 | Spitler |
| 5,020,711 A | 6/1991 | Kelley |
| 5,088,487 A | 2/1992 | Turner |
| 5,226,557 A | 7/1993 | Nelson |
| 5,237,838 A | 8/1993 | Merritt-Munson |
| 5,270,550 A | 12/1993 | Martorana et al. |
| 5,304,216 A | 4/1994 | Wallace |
| 5,305,471 A | 4/1994 | Steele et al. |
| 5,313,809 A | 5/1994 | Isaacson et al. |
| 5,314,087 A | 5/1994 | Shea |
| 5,361,603 A | 11/1994 | Merritt-Munson |
| 5,361,605 A | 11/1994 | Pizzi et al. |
| 5,409,500 A | 4/1995 | Dyrek |
| 5,417,082 A | 5/1995 | Foster et al. |
| 5,595,069 A | 1/1997 | Gies |
| 5,638,979 A | 6/1997 | Shea |
| 5,641,325 A | 6/1997 | Delk et al. |
| 5,669,233 A | 9/1997 | Cook et al. |
| 5,770,295 A | 6/1998 | Alderman |
| 5,840,080 A | 11/1998 | Der Ovanesian |
| 5,857,778 A | 1/1999 | Ells |
| 5,881,908 A | 3/1999 | Hays et al. |
| 5,887,437 A | 3/1999 | Maxim |
| 5,899,088 A | 5/1999 | Purdum |
| 5,906,290 A | 5/1999 | Haberkorn |
| 5,934,100 A | 8/1999 | Hornick |
| 5,950,450 A | 9/1999 | Meyer et al. |
| 5,953,928 A | 9/1999 | Saia, III et al. |
| 5,987,910 A | 11/1999 | Kothe et al. |
| 6,016,664 A | 1/2000 | Larsson et al. |
| 6,036,047 A | 3/2000 | Dobbie |
| 6,114,003 A | 9/2000 | Gottfried |
| 6,116,042 A | 9/2000 | Purdum |
| 6,128,915 A | 10/2000 | Wagner |
| 6,223,551 B1 | 5/2001 | Mitchell |
| 6,276,164 B1 | 8/2001 | Santa Cruz et al. |
| 6,325,281 B1 | 12/2001 | Grogan |
| 6,412,545 B1 | 7/2002 | Buff et al. |
| 6,427,761 B1 | 8/2002 | Georges |
| 6,478,061 B2 | 11/2002 | Haberkorn |
| 6,482,332 B1 | 11/2002 | Malach |
| 6,540,085 B1 | 4/2003 | Davies |
| 6,558,608 B2 | 5/2003 | Haraldsson et al. |
| 6,584,797 B1 | 7/2003 | Smith et al. |
| 6,645,598 B2 | 11/2003 | Alderman |
| 6,685,012 B2 | 2/2004 | Bowden et al. |
| 6,832,562 B2 | 12/2004 | Tabor et al. |
| 6,868,982 B2 | 3/2005 | Gordon |
| 6,901,711 B2 | 6/2005 | Fay et al. |
| 7,028,504 B2 | 4/2006 | Derifield |
| 7,083,147 B2 | 8/2006 | Movsesian et al. |
| 7,140,768 B2 | 11/2006 | Prabhakar |
| 7,240,513 B1 | 7/2007 | Conforti |
| 7,257,963 B2 | 8/2007 | Mayer |
| 7,310,967 B2 | 12/2007 | Aragon |
| 7,328,583 B2 | 2/2008 | Hillman et al. |
| 7,631,799 B2 | 12/2009 | Turvey et al. |
| 7,641,812 B2 | 1/2010 | Alderman |
| 7,704,584 B2 * | 4/2010 | Alderman ............... C08K 3/32 165/104.19 |
| 7,721,566 B1 | 5/2010 | Wilken |
| 7,766,590 B2 | 8/2010 | Mapitigama et al. |
| 7,849,708 B2 | 12/2010 | Goncharko et al. |
| 7,908,870 B2 | 3/2011 | Williams et al. |
| 7,913,511 B2 | 3/2011 | Meyer et al. |
| 7,919,163 B2 | 4/2011 | Romero |
| 7,963,397 B2 | 6/2011 | Seagle et al. |
| 8,074,465 B2 | 12/2011 | Heroux et al. |
| 8,141,328 B2 | 3/2012 | Villers et al. |
| 8,156,703 B2 | 4/2012 | Alderman |
| 8,163,363 B2 | 4/2012 | Dummett |
| 8,192,924 B1 | 6/2012 | Barakat et al. |
| 8,224,719 B2 | 7/2012 | Seagle et al. |
| 8,250,835 B2 | 8/2012 | Kenneally |
| 8,250,882 B2 | 8/2012 | Mustafa et al. |
| 8,292,119 B2 | 10/2012 | Kenneally |
| 8,349,552 B2 | 1/2013 | Haarmann et al. |
| 8,499,533 B2 | 8/2013 | Emond et al. |
| 8,505,314 B1 | 8/2013 | Romero |
| 8,580,369 B2 | 11/2013 | Emond et al. |
| 8,607,581 B2 | 12/2013 | Williams et al. |
| 8,672,137 B2 | 3/2014 | Seagle et al. |
| 8,763,423 B2 | 7/2014 | Tattam |
| 8,763,886 B2 | 7/2014 | Hall |
| 8,781,921 B2 | 7/2014 | Seagle et al. |
| 8,887,515 B2 | 11/2014 | Patstone |
| 8,938,986 B2 | 1/2015 | Matta et al. |
| 8,980,397 B2 | 3/2015 | Patberg et al. |
| 9,045,254 B2 | 6/2015 | Davies et al. |
| 9,045,278 B2 | 6/2015 | Mustafa et al. |
| 9,151,531 B2 | 10/2015 | Wengreen et al. |
| 9,180,998 B2 | 11/2015 | Banks et al. |
| 9,366,469 B2 | 6/2016 | Chapman, Jr. |
| 9,429,350 B2 | 8/2016 | Chapman, Jr. |
| 9,556,373 B2 | 1/2017 | Formato et al. |
| 9,598,622 B2 | 3/2017 | Formato et al. |
| 9,689,602 B2 | 6/2017 | Emond et al. |
| 9,707,156 B2 | 7/2017 | Wengreen et al. |
| 9,814,651 B2 | 11/2017 | Wengreen et al. |
| 9,827,529 B2 | 11/2017 | Rebouillat et al. |
| 9,877,894 B2 | 1/2018 | Wengreen et al. |
| 9,913,777 B2 | 3/2018 | Wengreen et al. |
| 9,944,449 B2 | 4/2018 | Wood et al. |
| 9,956,140 B2 | 5/2018 | Wengreen et al. |
| 9,957,099 B2 | 5/2018 | White et al. |
| 9,981,797 B2 | 5/2018 | Aksan et al. |
| 10,077,389 B2 | 9/2018 | Formato et al. |
| 10,583,978 B2 * | 3/2020 | Longley ............... F28D 20/02 |
| 10,604,326 B2 | 3/2020 | Longley et al. |
| 10,661,969 B2 | 5/2020 | Pranadi et al. |

(56) References Cited

U.S. PATENT DOCUMENTS

| | | |
|---|---|---|
| 10,829,675 B2 | 11/2020 | Formato et al. |
| 11,137,190 B2 | 10/2021 | Martino |
| 2002/0043218 A1 | 4/2002 | Butler |
| 2002/0096445 A1 | 7/2002 | Austin et al. |
| 2002/0147242 A1 | 10/2002 | Salyer et al. |
| 2002/0164474 A1 | 11/2002 | Buckley |
| 2002/0185403 A1 | 12/2002 | Russo |
| 2003/0124318 A1 | 7/2003 | Magill et al. |
| 2003/0163182 A1 | 8/2003 | Hickey |
| 2004/0231346 A1 | 11/2004 | Smith et al. |
| 2004/0244413 A1 | 12/2004 | Trinh et al. |
| 2007/0051734 A1 | 3/2007 | Kuhn |
| 2008/0066490 A1 | 3/2008 | Santeler |
| 2008/0290086 A1 | 11/2008 | Caterina et al. |
| 2009/0230138 A1 | 9/2009 | Williams et al. |
| 2009/0258180 A1 | 10/2009 | Goulet |
| 2009/0288980 A1 | 11/2009 | Hadala |
| 2010/0037563 A1 | 2/2010 | Luyten |
| 2010/0301057 A1 | 12/2010 | Tattam et al. |
| 2010/0314397 A1 | 12/2010 | Williams et al. |
| 2011/0079330 A1* | 4/2011 | Raine .................. B65D 65/02 150/154 |
| 2011/0179807 A1 | 7/2011 | Holloway et al. |
| 2011/0185682 A1 | 8/2011 | Rockwell et al. |
| 2011/0186473 A1 | 8/2011 | Rockwell et al. |
| 2011/0248038 A1 | 10/2011 | Mayer |
| 2011/0290792 A1 | 12/2011 | Krzak et al. |
| 2012/0261278 A1 | 10/2012 | Madzsu et al. |
| 2013/0015184 A1 | 1/2013 | Lake et al. |
| 2013/0015191 A1 | 1/2013 | Seagle et al. |
| 2013/0015192 A1 | 1/2013 | Seagle et al. |
| 2013/0034732 A1 | 2/2013 | Parker et al. |
| 2013/0062355 A1 | 3/2013 | Shulman |
| 2013/0213977 A1 | 8/2013 | Stathes et al. |
| 2013/0255306 A1 | 10/2013 | Mayer |
| 2013/0289680 A1 | 10/2013 | Hasegawa |
| 2013/0291584 A1 | 11/2013 | Chapman, Jr. |
| 2014/0087105 A1 | 3/2014 | Formato et al. |
| 2014/0138281 A1 | 5/2014 | Emond et al. |
| 2014/0174692 A1 | 6/2014 | Emond et al. |
| 2014/0190976 A1 | 7/2014 | Imbrecht |
| 2014/0290285 A1* | 10/2014 | Formato .................. C09K 5/06 165/185 |
| 2014/0311170 A1 | 10/2014 | Mills et al. |
| 2014/0331711 A1* | 11/2014 | Blezard .............. B65D 81/3813 62/457.2 |
| 2014/0343493 A1 | 11/2014 | Wengreen |
| 2015/0053086 A1 | 2/2015 | Rebouillat et al. |
| 2015/0191291 A1* | 7/2015 | Wood ................ B65D 81/3827 62/457.2 |
| 2015/0239639 A1* | 8/2015 | Wenner .................. B65D 19/38 206/386 |
| 2015/0276297 A1* | 10/2015 | Moore ............... B65D 71/0096 62/4 |
| 2015/0285548 A1 | 10/2015 | Emond et al. |
| 2015/0367604 A1 | 12/2015 | Anderson et al. |
| 2016/0262979 A1 | 9/2016 | Wengreen et al. |
| 2016/0362240 A1 | 12/2016 | Ferracamo, Jr. |
| 2017/0096283 A1 | 4/2017 | Longley et al. |
| 2017/0131015 A1 | 5/2017 | Farrar |
| 2017/0197752 A1 | 7/2017 | Imbrecht et al. |
| 2018/0036202 A1 | 2/2018 | Wengreen et al. |
| 2018/0093816 A1 | 4/2018 | Longley et al. |
| 2018/0100682 A1 | 4/2018 | Nilsen et al. |
| 2018/0320947 A1 | 11/2018 | Jain et al. |
| 2018/0328644 A1 | 11/2018 | Rizzo et al. |
| 2019/0210790 A1 | 7/2019 | Rizzo et al. |
| 2020/0002075 A1 | 1/2020 | Lee et al. |
| 2020/0047993 A1 | 2/2020 | Brabbs et al. |
| 2020/0231362 A1 | 7/2020 | Kulangara et al. |
| 2020/0324959 A1 | 10/2020 | Longley et al. |
| 2020/0331686 A1 | 10/2020 | Longley et al. |
| 2021/0024270 A1 | 1/2021 | Mirzaee Kakhki |
| 2021/0070539 A1 | 3/2021 | Chasteen et al. |
| 2021/0278120 A1 | 9/2021 | Kuhn et al. |
| 2021/0300665 A1 | 9/2021 | Melchor |
| 2022/0002070 A1 | 1/2022 | Moghaddas et al. |

FOREIGN PATENT DOCUMENTS

| | | |
|---|---|---|
| CN | 104781159 A | 7/2015 |
| DE | 8801345 U1 | 3/1988 |
| DE | 102008004485 A1 | 7/2009 |
| EP | 1006058 A1 | 6/2000 |
| EP | 1534608 A1 | 3/2004 |
| EP | 2157024 A1 | 2/2010 |
| FR | 2928354 A1 | 9/2009 |
| FR | 2989359 A1 | 10/2013 |
| FR | 2994420 A1 | 2/2014 |
| GB | 2418413 B | 3/2008 |
| GB | 2448469 A | 10/2008 |
| GB | 2452059 A | 2/2009 |
| GB | 2476110 A | 6/2011 |
| GB | 2559451 A | 8/2018 |
| JP | H02232291 A | 9/1990 |
| JP | 2001180767 A | 7/2001 |
| JP | 2011046399 A | 3/2011 |
| KR | 101507398 B1 | 3/2015 |
| WO | 9843028 A1 | 10/1998 |
| WO | 0373030 A1 | 9/2003 |
| WO | 2004020311 A1 | 3/2004 |
| WO | 2005007519 A2 | 1/2005 |
| WO | 2005075307 A1 | 8/2005 |
| WO | 2006043092 A1 | 4/2006 |
| WO | 2009024804 A1 | 2/2009 |
| WO | 2009140194 A1 | 11/2009 |
| WO | 2013025827 A1 | 2/2013 |
| WO | 2014070167 A1 | 5/2014 |
| WO | 2014083320 A1 | 6/2014 |
| WO | 2014113035 A1 | 7/2014 |
| WO | 2014118821 A1 | 8/2014 |
| WO | 2014185925 A1 | 11/2014 |
| WO | 2015097788 A1 | 7/2015 |
| WO | 2016171539 A1 | 10/2016 |
| WO | 2017062675 A2 | 4/2017 |
| WO | 2017072638 A1 | 5/2017 |
| WO | 2017220953 A1 | 12/2017 |
| WO | 2017220954 A1 | 12/2017 |
| WO | 2018142133 A1 | 8/2018 |
| WO | 2018167478 A1 | 9/2018 |
| WO | 2018213348 A2 | 11/2018 |

OTHER PUBLICATIONS

Sales literature entitled "creating solutions: Pallet Thermal Protection System," CAPPI (Competences Associees en Plasturgie et Process Industriels), Auxerre, France (Jan. 2015).

International Search Report dated May 4, 2017, in PCT Application No. PCT/US16/55831.

Written Opinion dated May 4, 2017, in PCT Application No. PCT/US16/55831.

Sales literature for PalletQuilt, Q Products & Services, Hazel Crest, Illinois (2010).

Sales literature for Tyvek cargo covers, E.I.du Pont de Nemours and Company, Wilmington, Delaware (2014).

Sales literature for SilverSkin thermal pallet covers, TP3 Global, Redditch, West Midlands, UK (2017).

Sales literature for Polar Tech insulated pallet covers, Polar Tech Industries, Inc., Genoa, Illinois (2015).

BusinessWire article entitled "Cold Chain Technologies Responds to Envirotainer's Resized RKN t2 Pallet Shipper," (2009); https://www.businesswire.com/news/home/20090306005069/en/Cold-Chain-Technologies-Responds-Envirotainers-Resized-RKN.

Sales literature for Envirotainer RKN t2 container, Envirotainer AB, Stockholm, Sweden (2018); https://www.envirotainer.com/en/active-containers/our-container-products/envirotainer-rkn-t2/.

Sales literature for KoolTemp insulated pallet container—ZX4500, Cold Chain Technologies, Inc., Holliston, Massachusetts (2009).

Sales literature for Foam Fabricators Airdex pallet, Scottsdale, Arizona (2018); http://www.foamfabricatorsinc.com/Page.aspx?nid=103.

(56) References Cited

OTHER PUBLICATIONS

Sales literature for Trip & Co. GoodCape thermal cover (2018); https://www.trip-co.nl/aircargo/products/insulation-cover/.
Sales literature for DuPont Tyvek air cargo covers for pharmaceuticals, E.I. du Pont de Nemours and Company, Wilmington, Delaware (2014).
Sales literature for CooLiner, accessed on Oct. 5, 2018 at https://ipcpack.com/pdf/cooliner-brochure.pdf, Insulated Products Corp. Rancho Dominguez, California.
Sales literature for PolarTech ICE-BRIX saddle bags/cold pockets, accessed on Oct. 5, 2018 at http://coldchain.polar-tech.com/viewitems/all-categories-food-cold-packs/ce-refrigerants-ice-brix-line-ice-brix-saddle-bags, PolarTech Industries, Inc., Elysburg, Pennsylvania.
International Search Report dated Aug. 13, 2018, in PCT Application No. PCT/US18/32828.
Written Opinion dated Aug. 13, 2018, in PCT Application No. PCT/US18/32828.
Literature for PalletQuilt Shipping System, Summer Packout, Cold Chain Technologies, Holliston, MA (2013).
Spec sheets for GoodCape Standard, GoodCape Light and GoodCape Extreme laminates, Trip & Co., Nieuw-Vennep, The Netherlands (2016).

\* cited by examiner

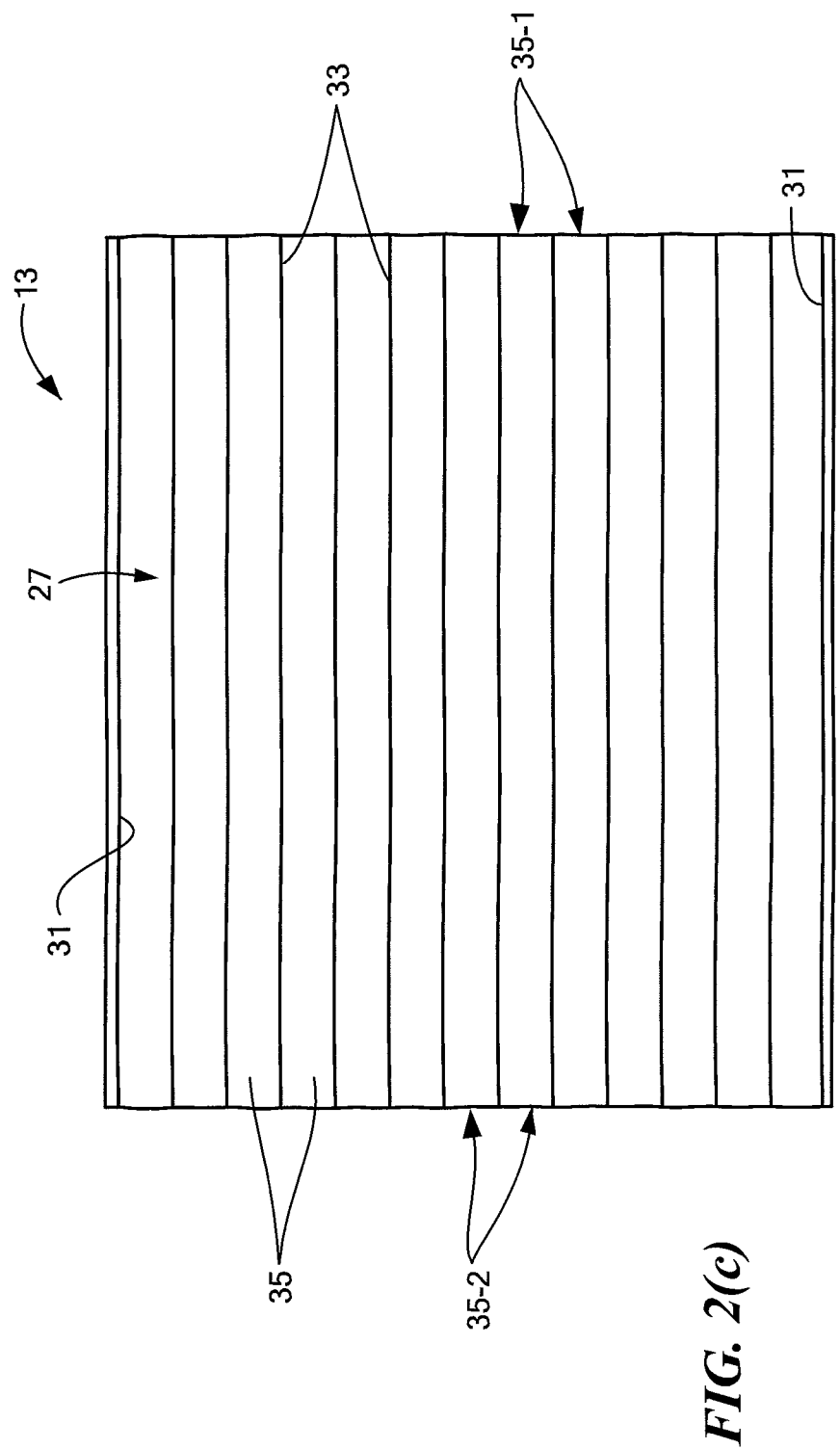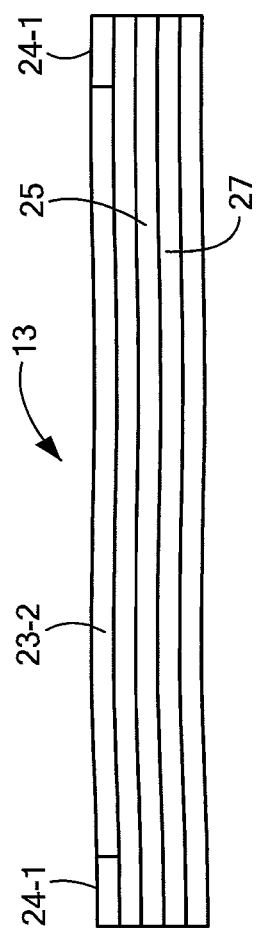
FIG. 2(c)
FIG. 2(d)

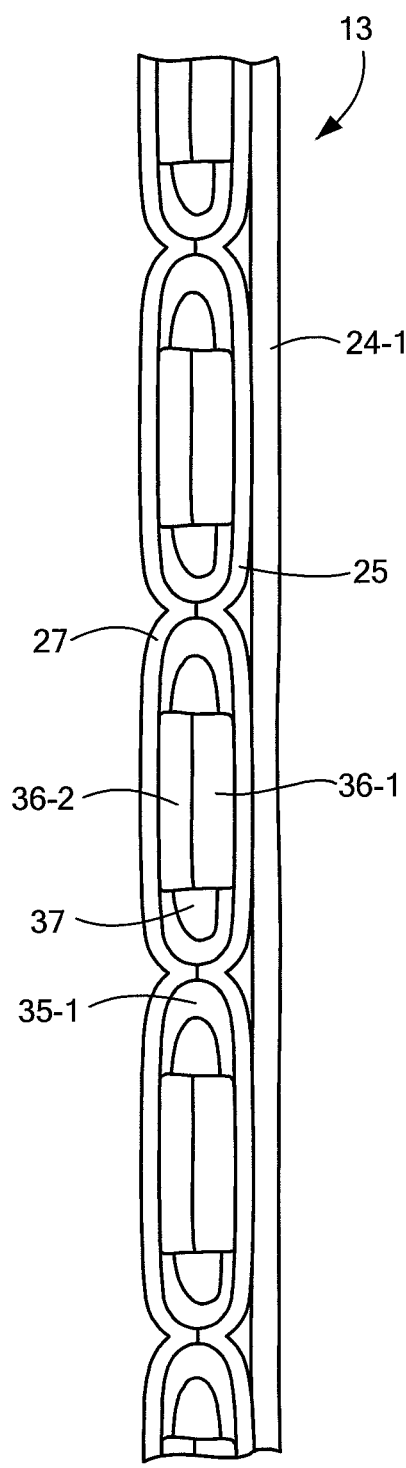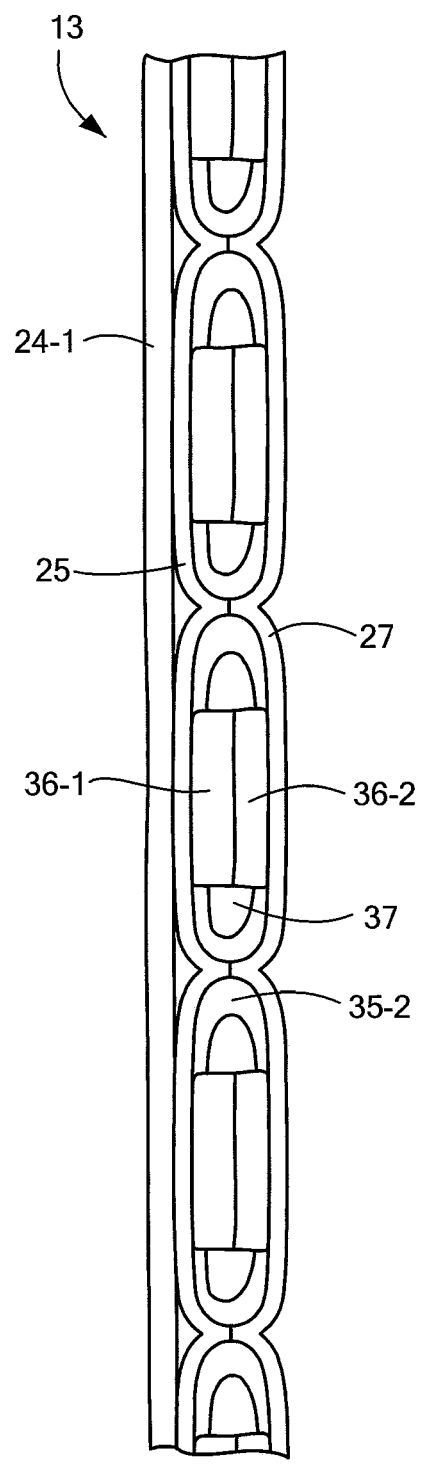
*FIG. 2(e)*  *FIG. 2(f)*

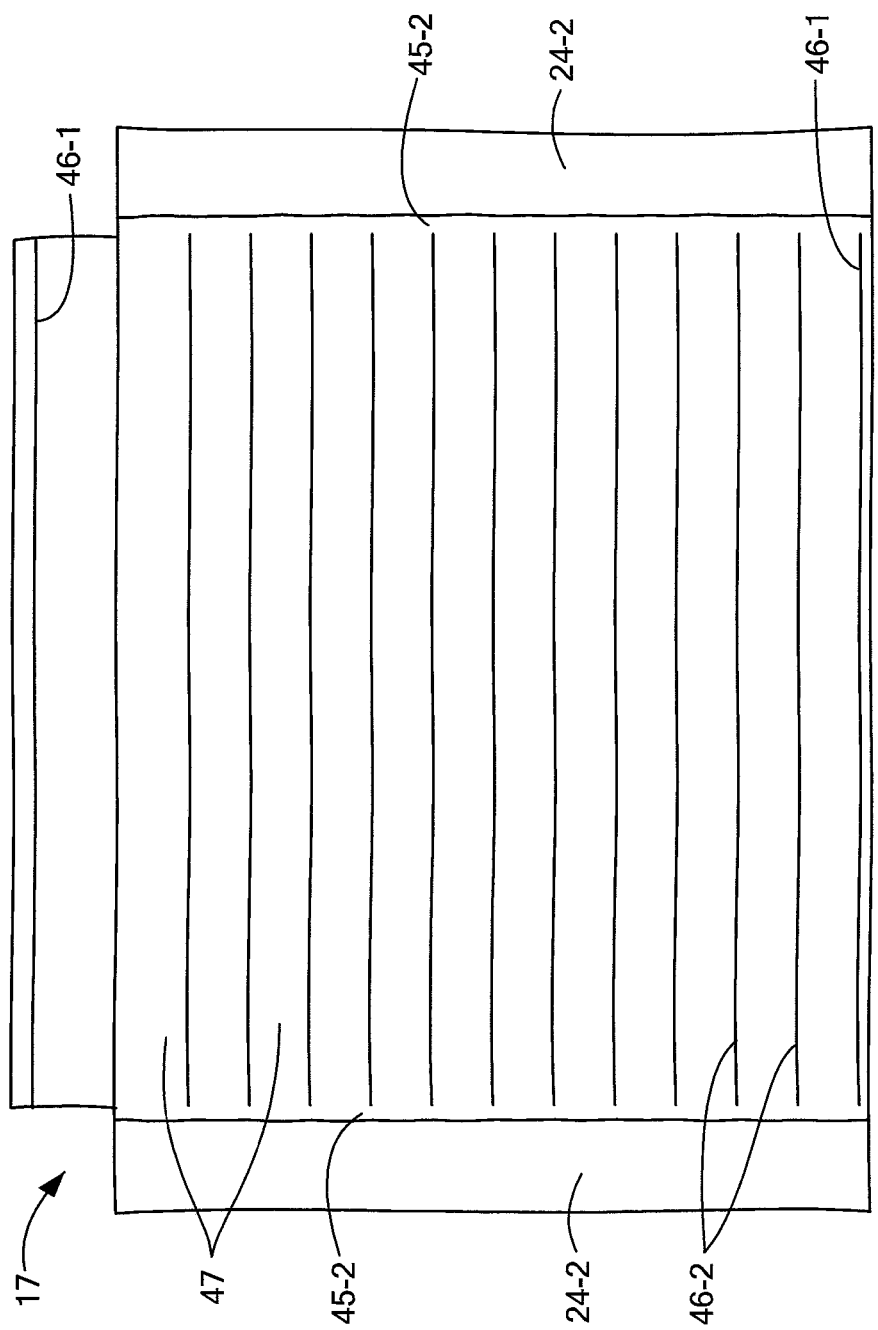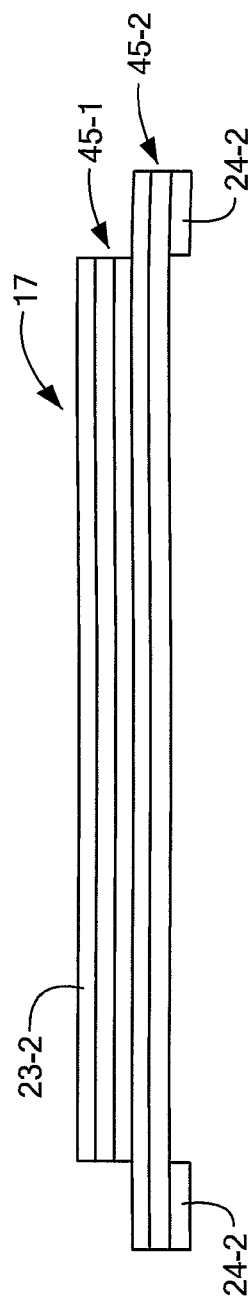
FIG. 4(c)
FIG. 4(d)

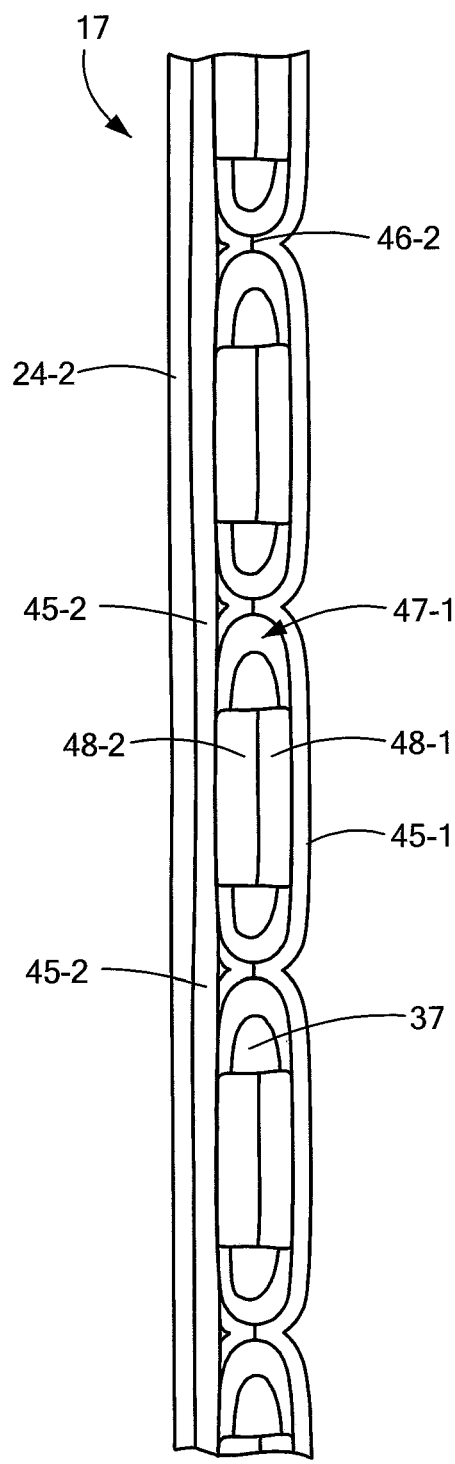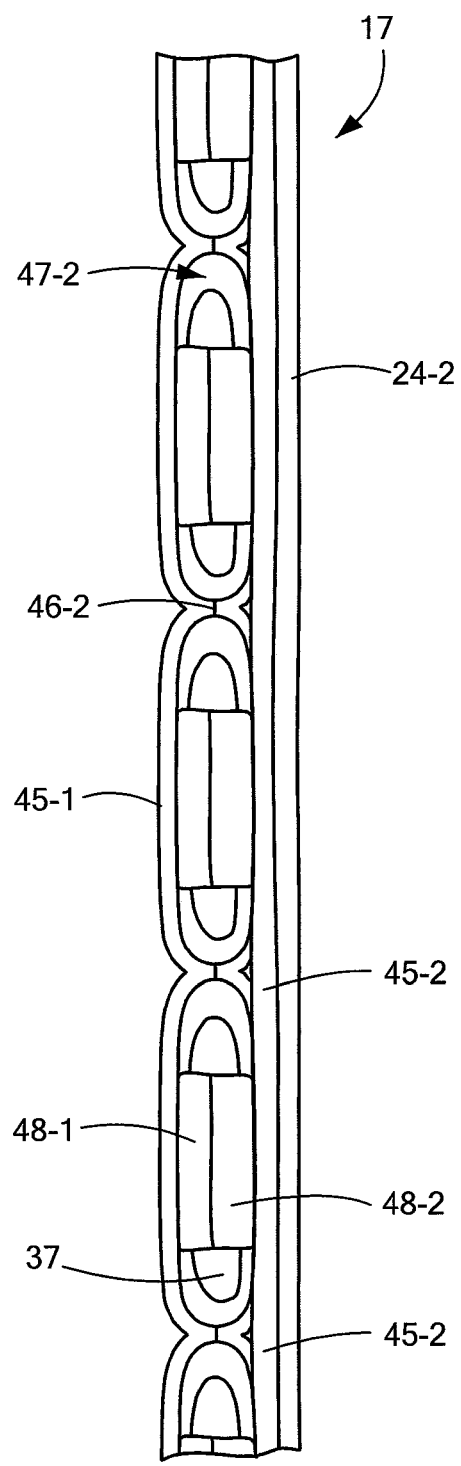
*FIG. 4(e)*                *FIG. 4(f)*

PALLET COVER COMPRISING ONE OR MORE TEMPERATURE-CONTROL MEMBERS AND KIT FOR USE IN MAKING THE PALLET COVER

CROSS-REFERENCE TO RELATED APPLICATIONS

The present application is a 371 of international application no. PCT/US2018/032828, filed May 15, 2018, which, in turn, is a continuation-in-part of U.S. patent application Ser. No. 15/595,671, inventors Amanda Longley et al., filed May 15, 2017, which, in turn, is a continuation-in-part of U.S. patent application Ser. No. 15/287,631, inventors Amanda Longley et al., filed Oct. 6, 2016, which, in turn, claims the benefit under 35 U.S.C. 119(e) of U.S. Provisional Patent Application No. 62/237,742, filed Oct. 6, 2015, and U.S. Provisional Patent Application No. 62/400,015, filed Sep. 26, 2016, the disclosures of all of the foregoing being incorporated herein by reference.

BACKGROUND OF THE INVENTION

The present invention relates generally to pallet covers and relates more particularly to pallet covers that include one or more temperature-control members.

Pallet covers that are used to help maintain pallet-sized loads of temperature-sensitive materials, such as biological and/or pharmaceutical products, within a desired temperature range for a desired period of time are well-known. Examples of such pallet covers, also sometimes referred to as "pallet blankets," are discussed below.

In U.S. Pat. No. 8,250,835 B2, inventor Kenneally, which issued Aug. 28, 2012, and which is incorporated herein by reference, there is disclosed an airtight cover assembly that includes a side panel folded around goods on a pallet presenting top and bottom opening, a top panel with a plurality of pouches positioned on an inside surface above a vented rigid plate, and a bottom panel enclosing the pallet. Hook and loop closures secure the panel assembly. Panel inner and outer surfaces of a polyvinyl chloride material bonded to an aluminum laminate enclose multiple layers of foam.

In U.S. Pat. No. 6,482,332, inventor Malach, which issued Nov. 19, 2002, and which is incorporated herein by reference, there is disclosed a phase change material that comprises 1-99.5% by weight polyol, wherein the polyol is selected from the group consisting of 1,4 butanediol and 1,6 hexanediol, 0.5-99% by weight water, and an amount of a nucleating agent sufficient to reduce super cooling of the phase change formulation. The phase change material may be placed in blankets made up of pouches of phase change material. The blankets may also be thin, flat sheets using permeable mats. Blankets of phase change material may be used to enclose entire pallets of product.

In U.S. Patent Application Publication No. US 2013/0062355 A1, inventor Shulman, which was published Mar. 14, 2013, and which is incorporated herein by reference, there are disclosed packaging and storing assemblies having phase change materials and methods of using the packaging and storage assemblies. The packaging can have a temperature barrier layer and can be used to insulate a trailer (e.g., in walls of trailer or liner inside trailer). The packaging can be in the form of reusable blankets to cover/wrap pallets or as hanging curtains/separators in a storage unit or trailer.

In U.S. Patent Application Publication No. US 2008/0066490 A1, inventor Santeler, which was published Mar. 20, 2008, and which is incorporated herein by reference, there is disclosed a compartmentalized refrigerant wrap. More specifically, according to the subject patent application publication, there is disclosed an elongated sheet having repeating compartments and intermittent sections placed after any repeating compartment. The repeating compartments are closed membranes encasing refrigerant therein. Alternatively, the repeating compartments may be disposed with pockets for releasably retaining the refrigerant. The intermittent sections are flat in cross section and provide holes along its sides for creating a passageway therethrough. The holes may be strengthened using a grommet or the like. In use, one elongate sheet is secured to other elongated sheets in any various end-to-end and/or side-to-side combinations for creating a modular blanket of refrigerant. The sheets are secured to one another by hooks or other known means in which holes in one sheet are connected to various holes in another sheet. The refrigerant blanket may then be placed around the exterior of a large quantity of perishable goods for maintaining the temperature of the sensitive goods.

In PCT International Publication No. WO 2014/070167 A1, which was published May 8, 2014, and which is incorporated herein by reference, there is disclosed a thermal stabilization shipping system that comprises a pallet to underlie a palletized load and a blanket dimensioned to drape over a top of the palletized load and reach down to the pallet. The blanket has compartments containing a phase change material.

Other documents that may be of interest include the following, all of which are incorporated herein by reference: U.S. Pat. No. 7,919,163 B2, inventor Romero, issued Apr. 5, 2011; U.S. Pat. No. 6,478,061 B2, inventor Haberkorn, issued Nov. 12, 2002; U.S. Pat. No. 5,906,290, inventor Haberkorn, issued May 25, 1999; U.S. Patent Application Publication No. US 2013/0015192 A1, inventors Seagle et al., published Jan. 17, 2013; U.S. Patent Application Publication No. US 2013/0015191 A1, inventors Seagle et al., published Jan. 17, 2013; U.S. Patent Application Publication No. US 2010/0037563 A1, inventor Luyten, published Feb. 18, 2010; UK Patent No. GB 2418413 B, published Mar. 19, 2008; and German Gebrauchsmuster No. DE 8801345 U1, published Mar. 31, 1988.

SUMMARY OF THE INVENTION

It is an object of the present invention to provide a novel pallet cover suitable for use in covering at least a portion of a payload on a pallet.

Therefore, according to one aspect of the invention, there is provided a pallet cover suitable for use in covering at least a portion of a payload on a pallet, the pallet cover comprising (a) a top wall; (b) a front wall; (c) a rear wall; (d) a left side wall; and (e) a right side wall; (f) wherein at least one of said top wall, said front wall, said rear wall, said left side wall, and said right side wall comprises a plurality of pockets capable of receiving a temperature-control member, wherein at least one of said top wall, said front wall, said rear wall, said left side wall, and said right side wall further comprises a first type of temperature-control member disposed in a first pocket of said plurality of pockets and a second type of temperature-control member disposed in a second pocket of said plurality of pockets, wherein the first type of temperature-control member comprises a first plurality of pouches containing phase-change material, the first plurality of pouches extending substantially across the first pocket, and wherein the second type of temperature-control member comprises a second plurality of pouches containing phase-change material, at least some of the second plurality of pouches being separated from one another within the second pocket by one or more spacers.

According to a more detailed feature of the invention, the first type of temperature-control member may further comprise a first support and a first wrapping material, the first plurality of pouches may be positioned on the first support, and the first wrapping material may be wrapped around the first plurality of pouches and the first support.

According to a more detailed feature of the invention, the second type of temperature-control member may further comprise a second support and a second wrapping material, the second plurality of pouches and the one or more spacers may be positioned on the second support, and the second wrapping material may be wrapped around the second plurality of pouches, the one or more spacers and the second support.

According to a more detailed feature of the invention, the one or more spacers may be one or more pieces of insulation.

According to a more detailed feature of the invention, the one or more spacers may be one or more pouches of an alternative phase-change material.

According to a more detailed feature of the invention, the first type of temperature-control member may comprise a single phase-change material, the second type of temperature-control member may comprise a single phase-change material, and the first type of temperature-control member and the second type of temperature-control member may comprise the same phase-change material.

According to a more detailed feature of the invention, at least one pouch of the first plurality of pouches and the second plurality of pouches may contain a different phase-change material than at least one other pouch of the first plurality of pouches and the second plurality of pouches.

According to a more detailed feature of the invention, the top wall, the front wall, the rear wall, the left side wall, and the right side wall may be formed by the assembly of a first subassembly and a second subassembly, the first subassembly may comprise a first central portion, a first end portion disposed at a first end of the first central portion, and a second end portion disposed at a second end of the first central portion, and the second subassembly may comprise a second central portion, a first end portion disposed at a first end of the second central portion, and a second end portion disposed at a second end of the second central portion.

According to a more detailed feature of the invention, each of said top wall, said front wall, said rear wall, said left side wall, and said right side wall may comprise a plurality of pockets.

According to a more detailed feature of the invention, the first type of temperature-control member may be disposed within at least some of the pockets, and the second type of temperature-control member may be disposed within the remaining pockets.

According to a more detailed feature of the invention, one end of each pocket may be sealed, and another end of each pocket may be constructed to be reversibly opened and closed.

According to a more detailed feature of the invention, at least one of said front wall, said rear wall, said left side wall, and said right side wall may be adjustable in length.

According to yet another aspect of the invention, there is provided a pallet cover suitable for use in covering at least a portion of a payload on a pallet, the pallet cover comprising (a) a top wall; (b) a front wall; (c) a rear wall; (d) a left side wall; and (e) a right side wall; (f) wherein each of said top wall, said front wall, said rear wall, said left side wall, and said right side wall comprises at least one pocket for receiving a temperature-control member, and wherein at least one of said top wall, said front wall, said rear wall, said left side wall, and said right side wall further comprises a temperature-control member disposed in at least one of said pockets, and wherein at least one of said top wall, said front wall, said rear wall, said left side wall and said right side wall has an adjustable length.

According to a more detailed feature of the invention, each of said front wall, said rear wall, said left side wall and said right side wall may have an adjustable length.

According to a more detailed feature of the invention, each of said front wall, said rear wall, said left side wall and said right side wall may comprise a first portion and a second portion, the first portion may have a bottom, the second portion may have a top, and the top of the second portion may be detachably joined to the bottom of the first portion.

According to a more detailed feature of the invention, the first portion and the second portion may have different lengths.

According to a more detailed feature of the invention, the second portion may be devoid of a temperature-control member.

According to a more detailed feature of the invention, each of the front wall, the rear wall, the left side wall and the right side wall may be detachably joined to the top wall.

According to a more detailed feature of the invention, each of the top wall, the front wall, the rear wall, the left side wall, and the right side wall may comprise a first fabric sheet and a second fabric sheet, the first fabric sheet and the second fabric sheet may be joined to one another to define a plurality of pockets, and each of the plurality of pockets may be suitable for holding a separate temperature-control member.

According to a more detailed feature of the invention, the pockets may have open ends, and each of the top wall, the front wall, the rear wall, the left side wall, and the right side wall may further include closures for securely yet removably retaining a temperature-control member in a pocket.

According to a more detailed feature of the invention, each of the top wall, the front wall, the rear wall, the left side wall, and the right side wall may further comprise a layer of insulation, and the second fabric sheet may be disposed between the first fabric sheet and the layer of insulation.

According to a more detailed feature of the invention, the top wall may further comprise at least one looped handle to facilitate transport of the top wall.

According to a more detailed feature of the invention, the temperature-control member may comprise a phase-change material.

According to a more detailed feature of the invention, the phase-change material may be a gelled organic phase-change material and may comprise at least one n-alkane and a gelling agent selected from the group consisting of a styrene-ethylene-butylene-styrene triblock copolymer and a styrene-ethylene-propylene-styrene triblock copolymer.

According to a more detailed feature of the invention, the above-described pallet cover may be combined with a thermal insulation wrap removably inserted over the pallet cover.

According to still another aspect of the invention, there is provided a pallet cover suitable for use in covering at least a portion of a payload on a pallet, the pallet cover comprising (a) a top wall; (b) a front wall; (c) a rear wall; (d) a left side wall; and (e) a right side wall; (f) wherein at least one of said top wall, said front wall, said rear wall, said left side wall, and said right side wall comprises a first plurality of temperature-control members and at least one insulating member, the first plurality of temperature-control members arranged to circumscribe at least one void, the at least one insulating member being positioned within the at least one void.

According to a more detailed feature of the invention, each of said top wall, said front wall, said rear wall, said left side wall, and said right side wall may comprise a first plurality of temperature-control members, each of the temperature-control members may comprise a phase-change material, the temperature-control members of each of said top wall, said front wall, said rear wall, said left side wall and said right wall may be arranged to circumscribe two voids, and an insulating member may be positioned within each of the voids.

According to a more detailed feature of the invention, each of said top wall, said front wall, said rear wall, said left side wall and said right side wall may further comprise additional insulation members, and the additional insulation members may be arranged similarly to and in contact with the first plurality of temperature-control members.

According to a more detailed feature of the invention, each of said top wall, said front wall, said rear wall, said left side wall and said right side wall may further comprise an inner sheet and an outer sheet, and the first plurality of temperature control members and the insulating members may be positioned between the inner sheet and the outer sheet.

According to a more detailed feature of the invention, each of said top wall, said front wall, said rear wall, said left side wall and said right side wall may further comprise a second plurality of temperature-control members, and the second plurality of temperature-control members may be arranged similarly to and in contact with the first plurality of temperature-control members.

According to a more detailed feature of the invention, the second plurality of temperature-control members may comprise a phase-change material, and the phase-change material of the second plurality of temperature-control members may differ from the phase-change material of the first plurality of temperature-control members.

According to a more detailed feature of the invention, the pallet cover may further comprise a bottom wall, and the bottom wall may comprise a third plurality of temperature-control members.

According to a more detailed feature of the invention, each of the third plurality of temperature-control members may comprise a phase-change material, and the third plurality of temperature-control members may be arranged to circumscribe a void.

According to a more detailed feature of the invention, the void of the bottom wall may be unoccupied.

According to a more detailed feature of the invention, the phase-change material may be a gelled organic phase-change material and may comprise at least one n-alkane and a gelling agent selected from the group consisting of a styrene-ethylene-butylene-styrene triblock copolymer and a styrene-ethylene-propylene-styrene triblock copolymer.

According to a more detailed feature of the invention, the above-described pallet cover may be combined with a thermal insulation wrap removably inserted over the pallet cover.

According to still yet another aspect of the invention, there is provided a pallet cover suitable for use in covering at least a portion of a payload on a pallet, the pallet cover comprising (a) a first subassembly, said first subassembly comprising (i) a central portion, (ii) a first end portion disposed at a first end of the central portion, and (iii) a second end portion disposed at a second end of the central portion; (b) a second subassembly, said second subassembly comprising (i) a central portion, (ii) a first end portion disposed at a first end of the central portion, and (iii) a second end portion disposed at a second end of the central portion; (c) wherein each of the first end portion of the first subassembly, the second end portion of the first subassembly, the central portion of the second subassembly, the first end portion of the second subassembly, and the second end portion of the second subassembly comprises at least one temperature-control member and wherein the central portion of the first subassembly is devoid of a temperature-control member; and (d) wherein the central portion of the second subassembly is mounted over the central portion of the first subassembly and wherein the first and second end portions of the first subassembly are offset relative to the first and second end portions of the second subassembly, whereby, when the pallet cover is positioned over a payload on a pallet, the central portions of the first and second subassemblies are positioned substantially over the top of the payload and the first and second end portions of the first and second subassemblies are positioned substantially along the sides of the payload.

According to a more detailed feature of the invention, the first subassembly and the second subassembly may be detachably joined to one another.

According to a more detailed feature of the invention, the first end portion of the first subassembly may be detachably joined to each of the first and second end portions of the second subassembly, and the second end portion of the first subassembly may be detachably joined to each of the first and second end portions of the second assembly.

According to a more detailed feature of the invention, the first end portion of the first subassembly may be detachably joined to each of the first and second end portions of the second subassembly with complementary hook and loop fasteners, and the second end portion of the first subassembly may be detachably joined to each of the first and second end portions of the second assembly with complementary hook and loop fasteners.

According to a more detailed feature of the invention, the first subassembly may comprise a first pair of sheets, and the first pair of sheets may be joined to one another so as to define therein the central portion, the first end portion, the second end portion, and at least one pocket in each of the central portion, the first end portion and the second end portion for receiving at least one temperature-control member.

According to a more detailed feature of the invention, the second subassembly may comprise a second pair of sheets, and the second pair of sheets may be joined to one another so as to define therein the central portion, the first end portion, the second end portion, and at least one pocket in each of the first end portion and the second end portion for receiving at least one temperature-control member.

According to a more detailed feature of the invention, each of the first and second end portions of the first subassembly and each of the central portion, the first end portion, and the second end portion of the second subassembly may comprise a plurality of pockets for receiving temperature-control members.

According to a more detailed feature of the invention, each of the temperature-control members may comprise a phase-change material.

According to a more detailed feature of the invention, the above-described pallet cover may be combined with a thermal insulation wrap removably inserted over the pallet cover.

It is another object of the present invention to provide a kit for use in making the above-described pallet cover.

Therefore, according to one aspect of the invention, there is provided a kit for use in constructing a pallet cover, the pallet cover being suitable for covering at least a portion of a payload on a pallet, the kit comprising (a) a top wall; (b) a front wall, the front wall being detachably joinable to the top wall; (c) a rear wall, the rear wall being detachably joinable to the top wall; (d) a left side wall, the left side wall being detachably joinable to each of the top wall, the front wall, and the rear wall; (e) a right side wall, the right side wall being detachably joinable to each of the top wall, the front wall, and the rear wall; and (f) a plurality of temperature-control members, each of the temperature-control members comprising a phase-change material; (g) wherein each of said top wall, said front wall, said rear wall, said left side wall, and said right side wall comprises a plurality of pockets, each of the pockets being suitable for removably receiving at least one temperature-control member.

According to a more detailed feature of the invention, at least one of said front wall, said rear wall, said left side wall, and said right side wall may comprise a plurality of detachably joinable portions.

According to a more detailed feature of the invention, each of said top wall, said front wall, said rear wall, said left side wall, and said right side wall may comprise a first fabric sheet and a second fabric sheet, and the first fabric sheet and the second fabric sheet may be joined to one another to define the pockets for holding the temperature-control members.

According to a more detailed feature of the invention, each of said top wall, said front wall, said rear wall, said left side wall, and said right side wall may further comprise a layer of insulation and a third fabric sheet, the layer of insulation may be positioned between the second fabric sheet and the third fabric sheet, and the second fabric sheet may be positioned between the first fabric sheet and the layer of insulation.

According to a more detailed feature of the invention, the kit may comprise a thermal insulation wrap dimensioned to be removably inserted over the pallet cover.

According to a more detailed feature of the invention, each of the first end portion of the first subassembly, the central portion of the first subassembly, the second end portion of the first subassembly, the first end portion of the second subassembly, and the second end portion of the second subassembly may comprise a plurality of temperature-control members, with one of the plurality of temperature-control members being mounted within each of the plurality of pockets, and at least some of said plurality of temperature-control members within each plurality of pockets may be of a first of two different varieties of temperature-control members and at least some of said plurality of temperature-control members within each of the plurality of pockets may be of a second of two different varieties of temperature-control members.

According to a more detailed feature of the invention, the first of said two different varieties of temperature-control members may comprise a uniform distribution of phase-change material, and the second of said two different varieties of temperature-control members may comprise an alternating pattern of phase-change material and an insulating material, with phase-change material disposed at opposite ends of the temperature-control member.

According to a more detailed feature of the invention, each of the central portion and the first and second end portions of the first subassembly and each of the first end portion and the second end portion of the second subassembly may comprise two end pockets for receiving temperature-control members and at least one intermediate pocket for receiving temperature-control members. In addition, the first of said two different varieties of temperature-control members may be disposed in each of the two end pockets, and the second of said two different varieties of temperature-control members may be disposed in each of the at least one intermediate pocket.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numerals represent like parts:

FIGS. 2(a) through 2(g) are enlarged fragmentary section, enlarged rear, enlarged front, enlarged top, enlarged fragmentary left side, enlarged fragmentary right side, and enlarged partly exploded rear views, respectively, of the front wall of the pallet cover shown in FIGS. 1(a) through 1(c);

FIGS. 4(a) through 4(g) are enlarged fragmentary section, enlarged rear, enlarged front, enlarged top, enlarged fragmentary right side, enlarged fragmentary left side, and enlarged partly exploded rear views, respectively, of the left wall of the pallet cover shown in FIGS. 1(a) through 1(c);

FIG. 16 is a schematic diagram illustrating the placement of phase-change material and insulation in the first assembly of FIG. 12, the first assembly being shown in an unfolded state;

DETAILED DESCRIPTION OF THE INVENTION

Figure 1A:
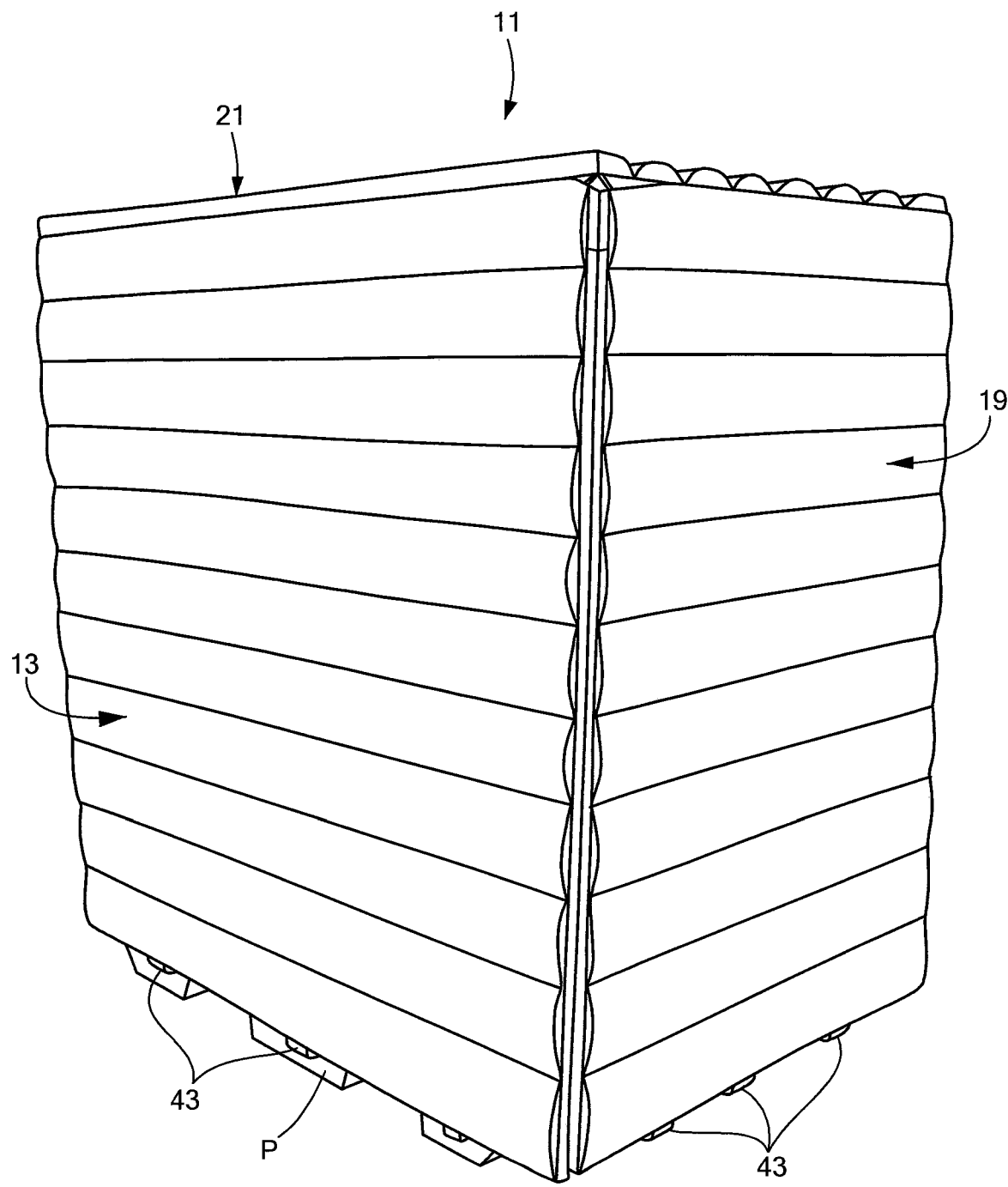
FIGS. 1(a) through 1(c) are perspective, front, and partly exploded perspective views, respectively, of a first embodiment of a pallet cover constructed according to the teachings of the present invention, the pallet cover being shown in FIGS. 1(a) and 1(b) covering a payload on a pallet.
Figure 1B:
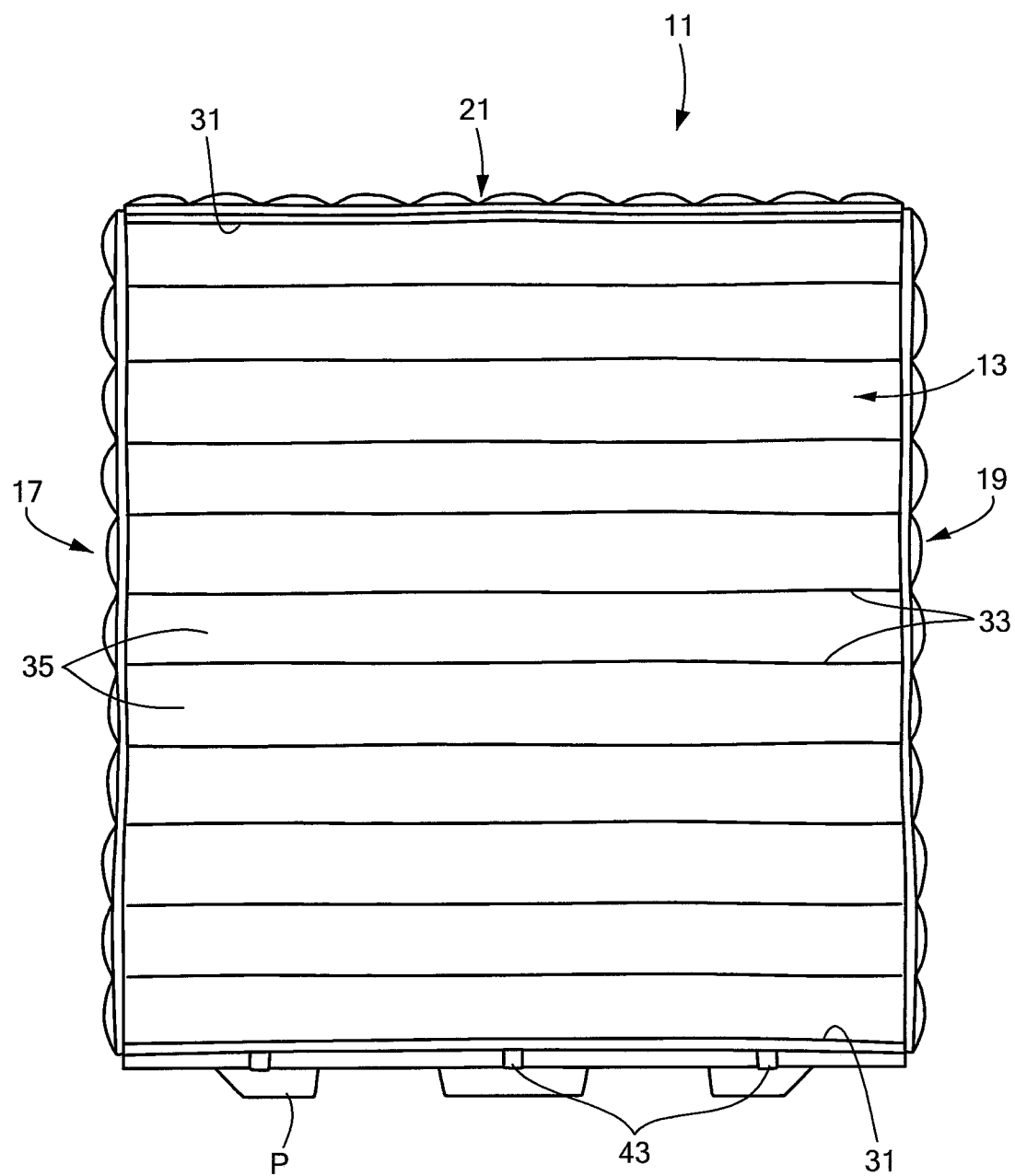
Figure 1C:
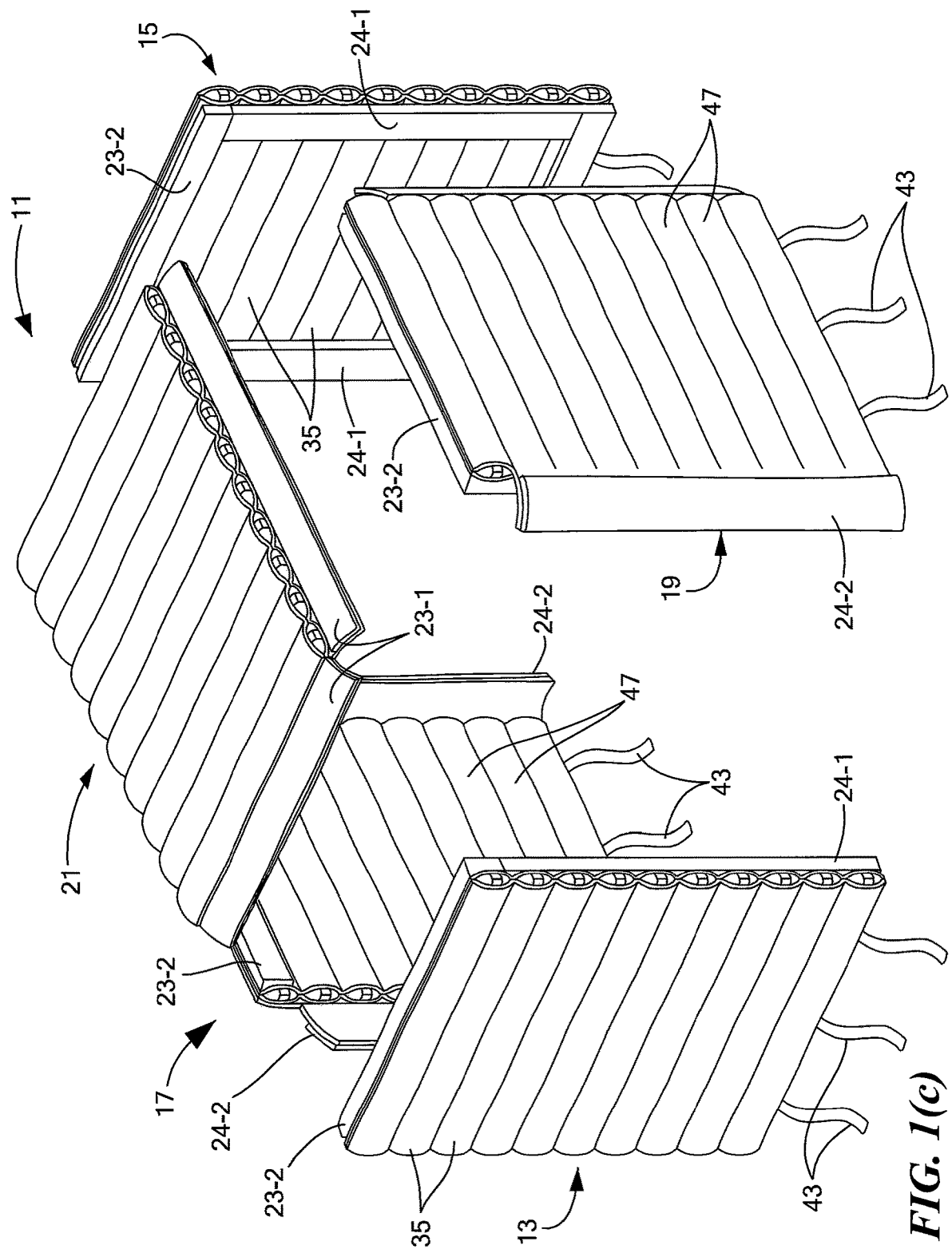
Figure 1D:
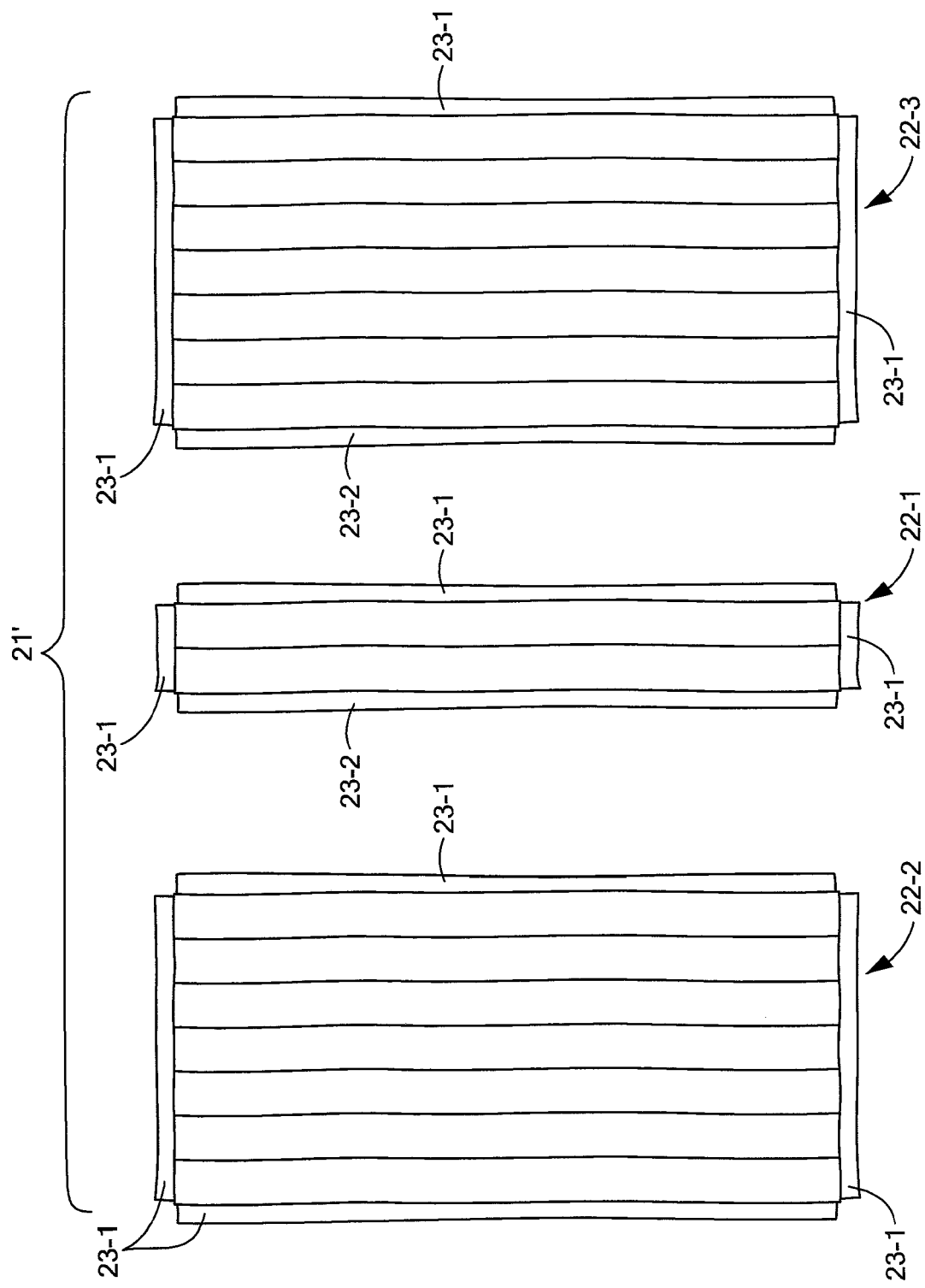
FIG. 1(d) is an enlarged, partly exploded, top view of a first alternative top wall for use in the pallet cover of FIG. 1.
Figure 2A:
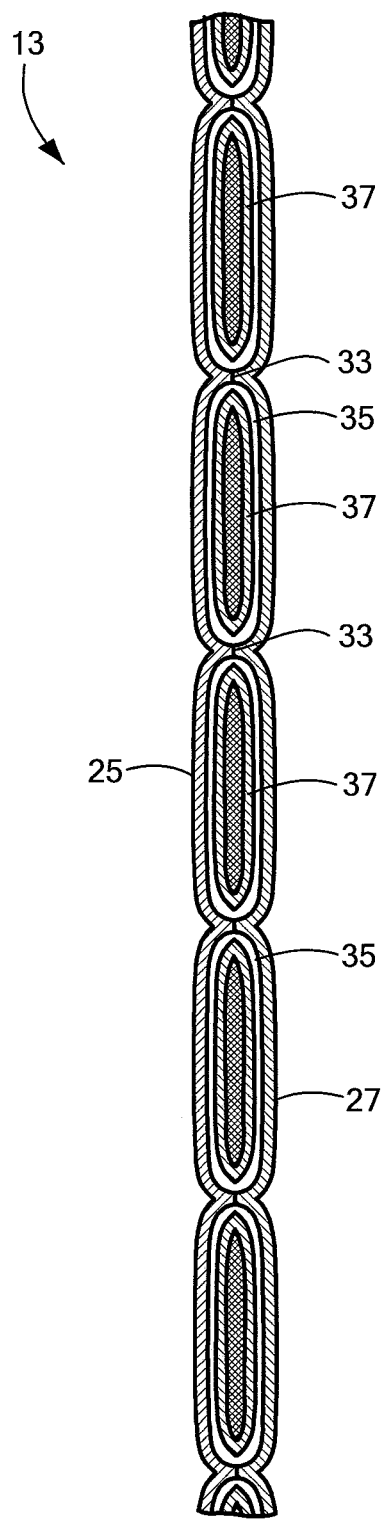
Figure 2B:
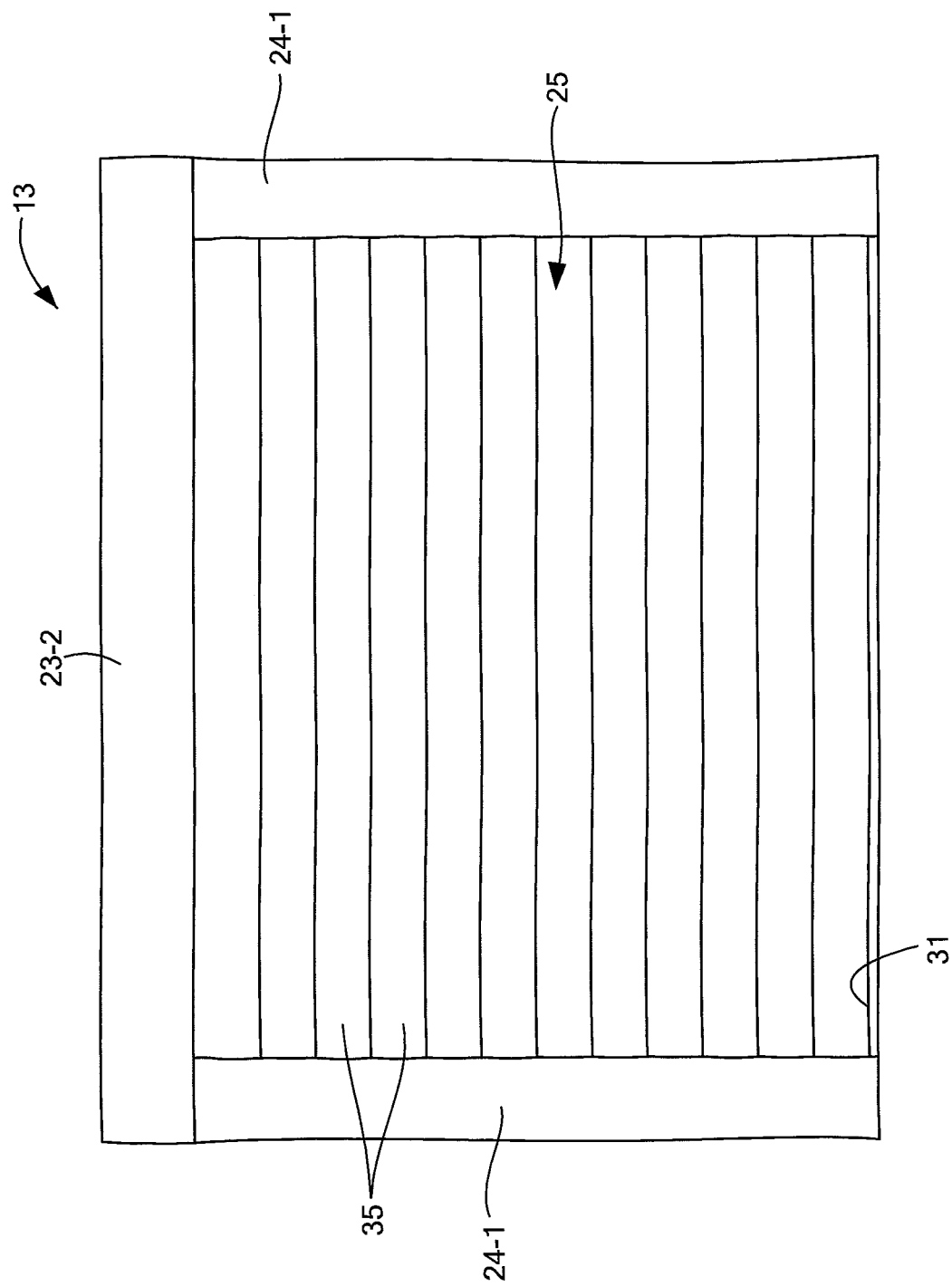
Figure 2G:
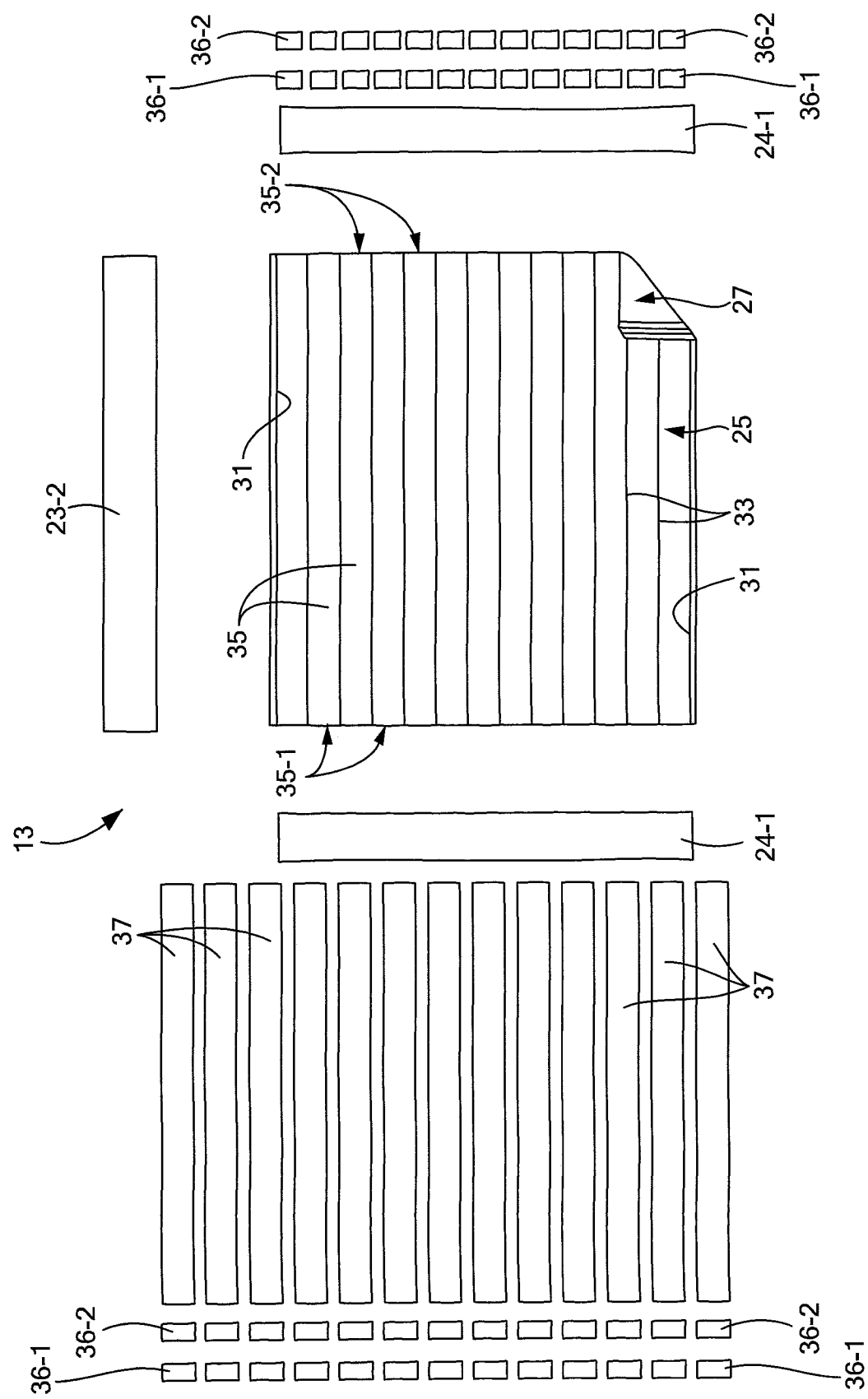

Referring now to FIGS. 1(*a*), 1(*b*), and 1(*c*), there are shown various views of a first embodiment of a pallet cover that may be used to help maintain a pallet-sized load of temperature-sensitive materials within a desired temperature range for a desired period of time, the pallet cover being constructed according to the present invention and being represented generally by reference numeral 11. For clarity, certain details of pallet cover 11 that are discussed elsewhere in this application or that are not critical to an understanding of the invention may not be shown in one or more of FIGS. 1(*a*) through 1(*c*) or may be shown therein in a simplified manner.

Pallet cover 11 may comprise a front wall 13, a rear wall 15, a left wall 17, a right wall 19, and a top wall 21. Front wall 13, rear wall 15, left wall 17, right wall 19, and top wall 21 may be appropriately dimensioned to cover substantially the entire front, rear, left side, right side, and top, respectively, of a pallet-sized payload. Examples of a pallet-sized payload include, but are not limited to, a 48 inch×40 inch×48 inch payload, a 48 inch×40 inch×40 inch payload, and a 48 inch×40 inch×59 inch payload. Alternatively, it should be understood that, if desired, one or more of front wall 13, rear wall 15, left wall 17, right wall 19 and top wall 21 may be dimensioned to cover only a portion of a pallet-sized payload. For example, front wall 13, rear wall 15, left wall 17, right wall 19 and top wall 21 may be dimensioned to cover only a top portion of a payload, with a bottom portion of the payload being left uncovered. Alternatively, if desired, one or more of front wall 13, rear wall 15, left wall 17, and right wall 19 may be constructed to have an adjustable length, for example, by being made of two or more detachably joinable portions (e.g., a 40-inch long portion and a 20-inch long portion that may be used alternatively to form a 40-inch wall portion or a 20-inch wall portion, respectively, or that may be used in combination to form a 60-inch wall portion) or by having a releasable securing mechanism to permit a wall to be folded and secured to itself or to another wall. Moreover, as can be seen in FIG. 1(*d*), an alternative embodiment of top wall 21, namely, top wall 21', may be adjustable in length and/or width, for example, by being made of a plurality of detachably joinable portions (e.g., one or more intermediate portions 22-1 detachably joinable between end portions 22-2 and 22-3).

Referring back now to FIGS. 1(*a*) through 1(*c*), top wall 21 may be detachably joined to each of front wall 13, rear wall 15, left wall 17, and right wall 19 using suitable releasable fasteners 23-1 and 23-2, such as strips of VELCRO complementary hook and loop fasteners, zippers, buttons, snaps, releasable adhesive tapes, and the like, located on adjacent edges of top wall 21, front wall 13, rear wall 15, left wall 17, and right wall 19. For example, one type of hook/loop fastener may be employed in fastener 23-1, which may be located along the edges of top wall 21, and a complementary type of hook/loop fastener may be employed in fastener 23-2, which may be located on adjacent edges of each of front wall 13, rear wall 15, left wall 17, and right wall 19. In like fashion, each of front wall 13, rear wall 15, left wall 17, and right wall 19 may be detachably joined to its two neighboring side walls using suitable releasable fasteners 24-1 and 24-2, such as VELCRO complementary hook and loop fasteners, zippers, buttons, snaps, releasable adhesive tapes, and the like, located on adjacent edges of front wall 13, rear wall 15, left wall 17, and right wall 19. For example, one type of hook/loop fastener may be employed in fastener 24-1, which may be located along the left and right sides of front wall 13 and rear wall 15, and a complementary type of hook/loop fastener may be employed in fastener 24-2, which may be located along the left and right edges of left wall 17 and right wall 19. Notwithstanding the above, if desired, top wall 21 may be permanently secured to each of front wall 13, rear wall 15, left wall 17, and right wall 19 using a suitable permanent fastening mechanism, such as rivets, stitches, a permanent adhesive, and the like, and each of front wall 13, rear wall 15, left wall 17, and right wall 19 may be permanently secured to its two neighboring side walls using a suitable permanent fastening mechanism, such as rivets, stitches, a permanent adhesive, and the like. Moreover, if desired, one or more of front wall 13, rear wall 15, left wall 17, right wall 19 and top wall 21 may be constructed as integrally formed portions of a unitary structure.

Referring now to FIGS. 2(a) through 2(g), front wall 13 is shown in greater detail (the straps 43 of front wall 13, as well as other features not critical to the invention, not being shown in one or more of FIGS. 2(a) through 2(g) for the sake of simplicity or are shown therein in a simplified manner). As can be seen, front wall 13 may be an assembly of components and may comprise an inner (i.e., proximate to the payload) sheet 25 and an outer (i.e., distal to the payload) sheet 27. Inner sheet 25 and outer sheet 27 may be generally rectangular sheets of substantially matching size. Each of inner sheet 25 and outer sheet 27 may be made from a suitable material, such as a fabric material. Solely for purposes of illustration and not intended as an exhaustive discussion of variations, each of sheets 25 and 27 may be a NYLON polyamide fabric sheet, each of sheets 25 and 27 may be a polyvinyl chloride (PVC) fabric sheet, each of sheets 25 and 27 may be a PVC-coated fabric sheet, sheet 25 may be a PVC fabric sheet and sheet 27 may be a PVC-coated fabric sheet or vice versa, one or more of sheets 25 and 27 may be a polyethylene fabric sheet, a polyethylene scrim, or a polyethylene terephthalate fabric sheet, such as a metalized or vinyl-coated polyethylene terephthalate fabric sheet; alternatively, sheets 25 and 27 may be any suitable combination of materials previously described. According to one particular embodiment, sheet 25 may be a PVC mesh fabric sheet, and sheet 27 may be a PVC-coated fabric sheet. A benefit to using a mesh fabric for sheet 25 is that a user may easily visually inspect whatever contents, if any, that may be positioned between sheets 25 and 27. If desired, to prevent a payload that is covered by pallet cover 11 from being heated due to exposure to direct sunlight, one or both of sheets 25 and 27 may be made from a material that reflects solar radiation or may be coated with a material that reflects solar radiation; alternatively, one or both of sheets 25 and 27 may have a color that reflects solar radiation. For example, the base polymer or a coating for the fabric could have a pigment or dye.

Inner sheet 25 and outer sheet 27 may be joined to one another along the top and bottom edges of sheets 25 and 27 by a pair of parallel outer seams 31 and may additionally be joined to one another along a plurality of generally parallel inner seams 33. Seams 31 and 33, which may be parallel to each other, may be formed by sewing, heat-sealing, or other suitable means. Seams 31 and 33 may define a series of parallel pockets 35 that may extend generally horizontally across substantially the entire width of front wall 13. Pockets 35 may be formed to have a pair of open ends 35-1 and 35-2; however, pockets 35 may be reversibly opened and closed using releasable fasteners, such as VELCRO complementary hook and loop fasteners. For example, a strip of one type of complementary hook/loop fastener 36-1 may be secured, for example, by stitching, to the outer face of sheet 25 at each of ends 35-1 and 35-2, and a strip of the other type of complementary hook/loop fastener 36-2 may be secured, for example, by stitching, to the inner face of sheet 27 at each of ends 35-1 and 35-2. (Although not shown, a tab of fabric or another similarly suitable material may be positioned over a portion of fastener 36-1 and/or fastener 36-2 to facilitate the pulling apart of fasteners 36-1 and 36-2 from one another.) Alternatively, other types of non-permanent fasteners (e.g., snaps, buttons, zippers, ties, cinches, releasable adhesives, etc.) may be used instead of complementary hook and loop fasteners. As will become apparent below, by using non-permanent fasteners to reversibly close ends 35-1 and 35-2, temperature-control members may be removably and securely disposed within pockets 35. However, it is to be understood that, in another embodiment, one of ends 35-1 and 35-2 may be permanently closed or sealed, for example, by stitching or heat-sealing, whereas the other of ends 35-1 and 35-2 may be non-permanently closed or sealed using one or more non-permanent fasteners of the type described above. Moreover, in yet another embodiment, both of ends 35-1 and 35-2 may be permanently closed or sealed, for example, by stitching or heat-sealing, in which case the temperature-control members disposed within pockets 35 may not be removed therefrom. Furthermore, although front wall 13 is constructed so that ends 35-1 and 35-2 of pockets 35 are disposed on the outward-facing side of front wall 13 (i.e., facing away from a payload), it is to be understood that front wall 13 could be constructed so that ends 35-1 and 35-2 of pockets 35 are disposed on the inward-facing side of front wall 13 (i.e., facing towards a payload).

As noted above, front wall 13 and top wall 21 may be detachably joined to one another using complementary fasteners 23-1 and 23-2. More specifically, fastener 23-2 may be secured, for example, by stitching, to the inner face of sheet 25 along its top edge, and fastener 23-1 may be provided as a part of top wall 21 (see FIG. 1(c)). In addition, front wall 13 may be detachably joined to each of left wall 17 and right wall 19 using complementary fasteners 24-1 and 24-2. More specifically, fasteners 24-1 may be secured, for example, by stitching, to the inner face of sheet 25 along its left and right edges, and fasteners 24-2 may be provided as parts of left wall 17 and right wall 19 (see FIG. 1(c)). (As can be appreciated, instead of securing fasteners 23-2 and 24-1 to the inner face of sheet 25, one or more of fasteners 23-2 and 24-1 may be secured to the outer face of sheet 27.)

Figure 3B:
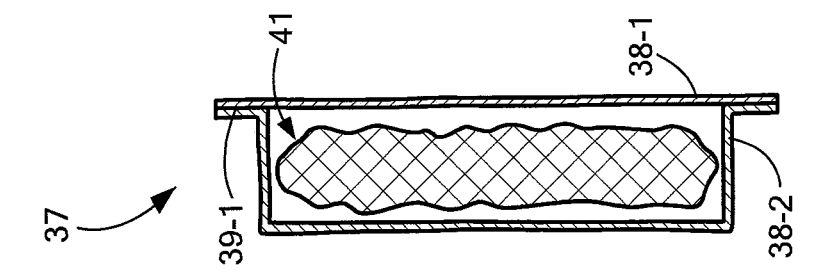
FIGS. 3(a) and 3(b) are front and enlarged section views of one of the temperature-control members shown in FIG. 2(a)
Figure 3A:
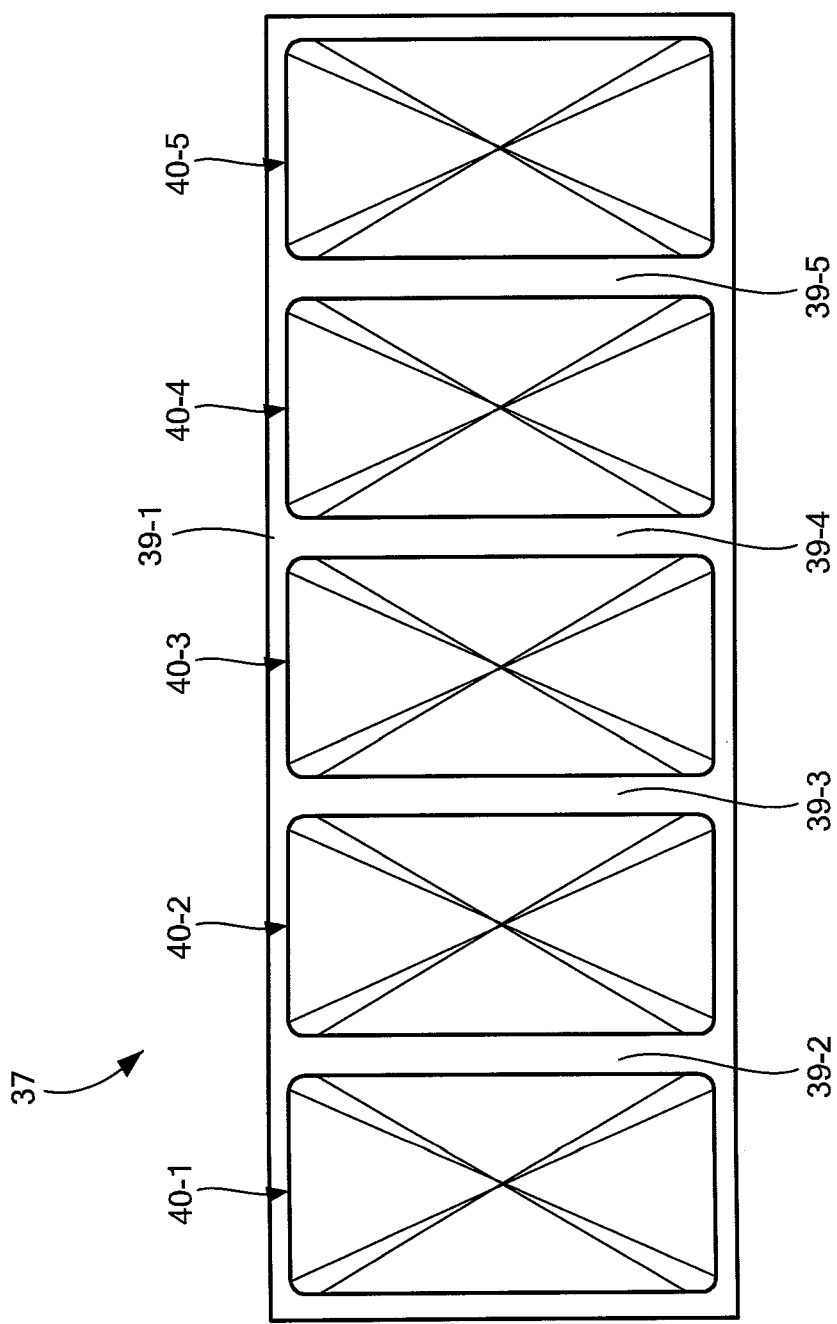
Figure 4A:
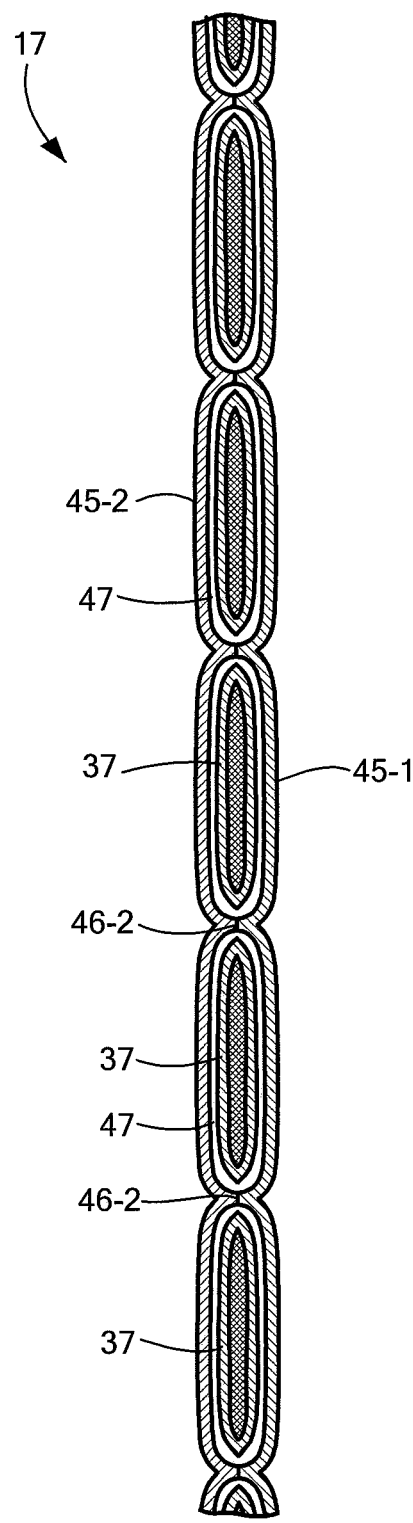
Figure 4B:
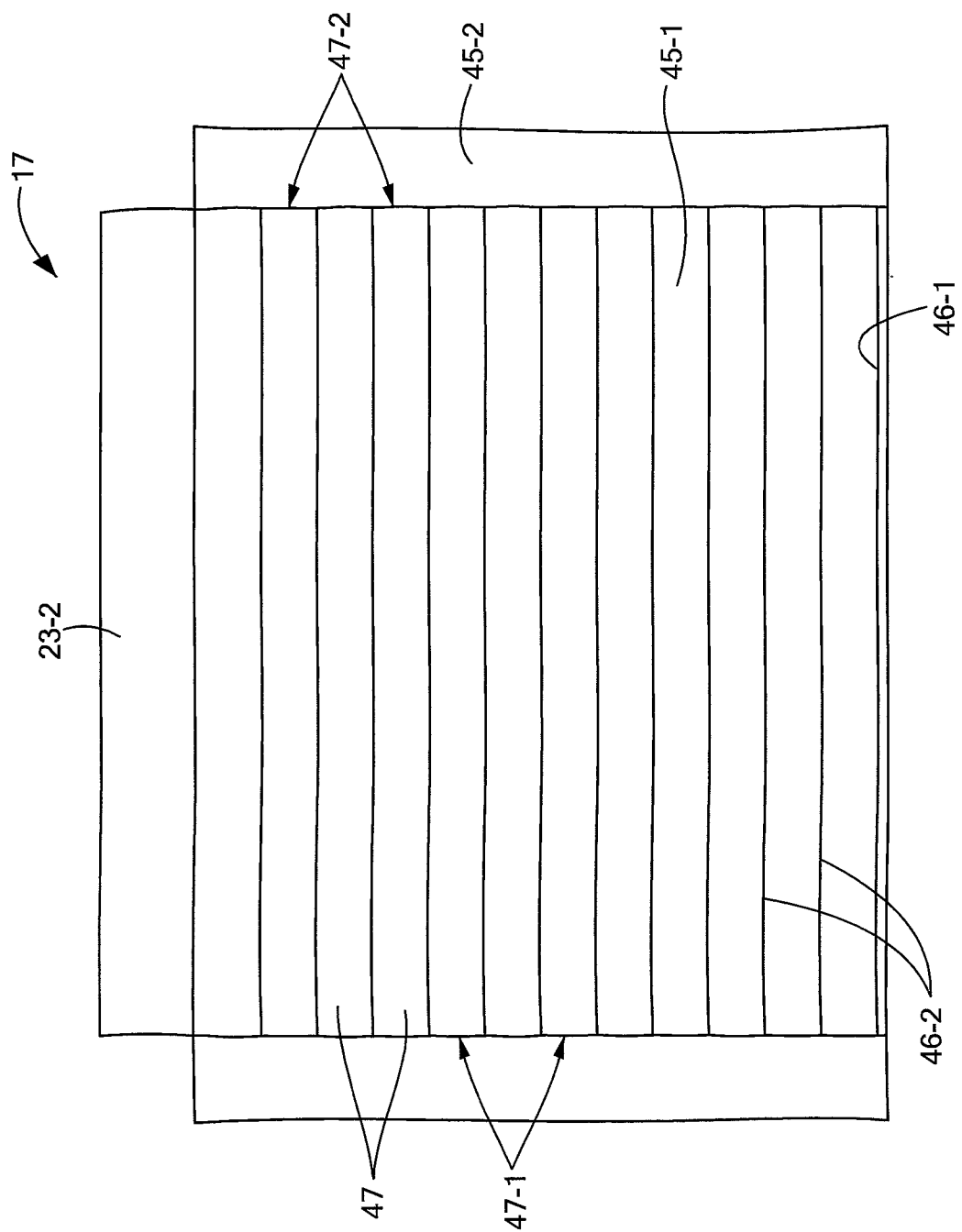
Figure 4G:
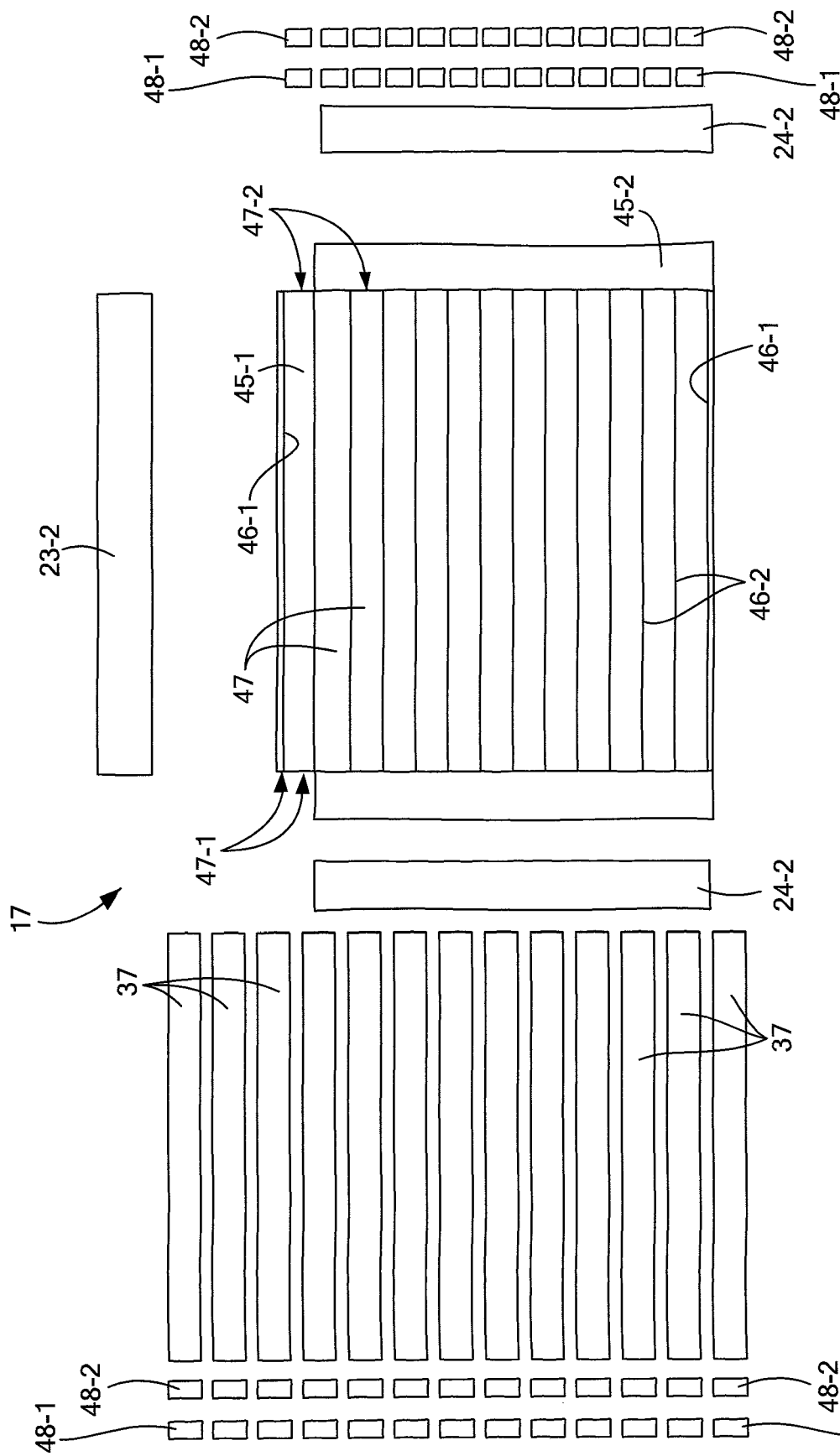
Figure 5A:
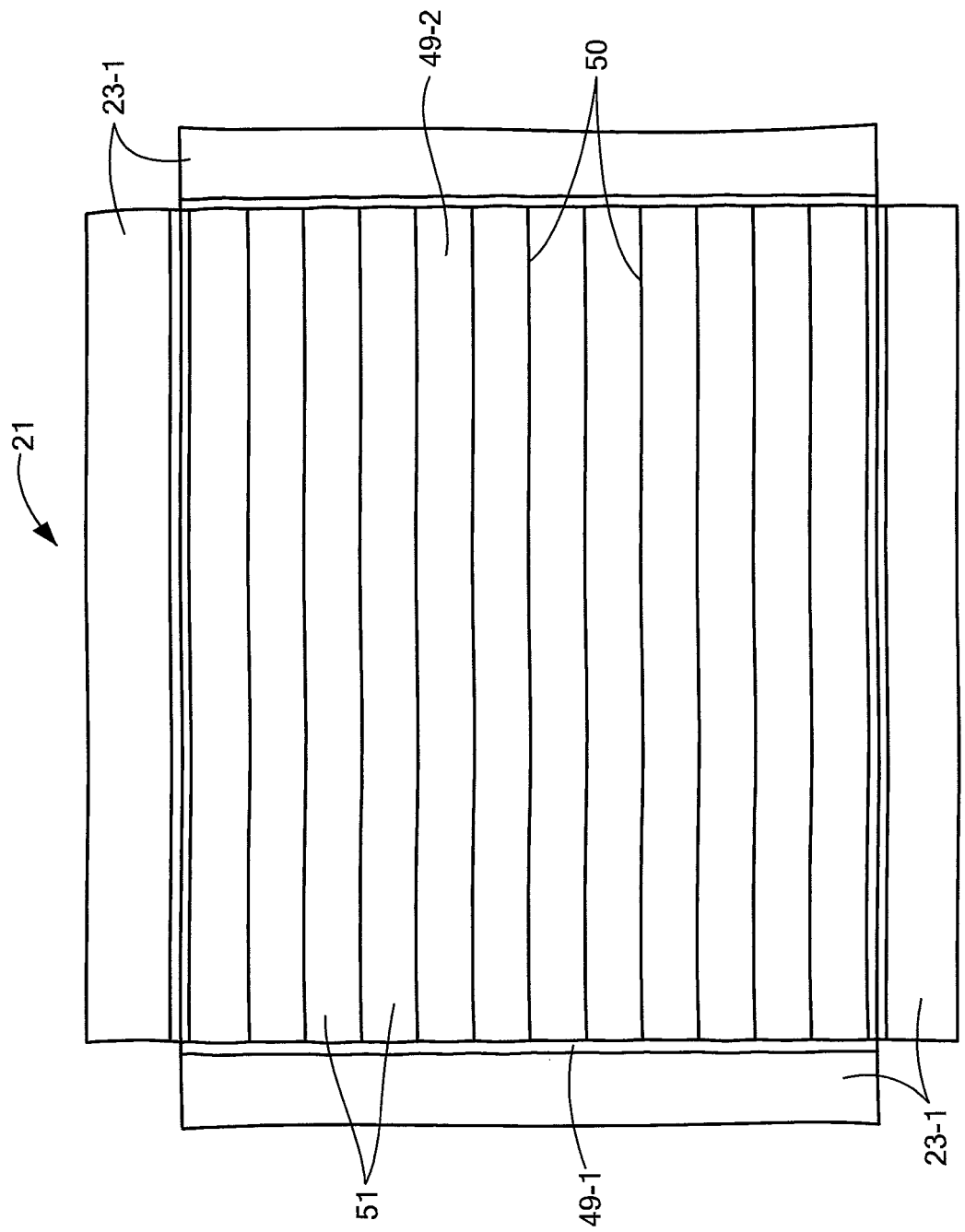
FIGS. 5(a) through 5(d) are enlarged top, enlarged bottom, enlarged end, and enlarged partly exploded top views, respectively, of the top wall of the pallet cover shown in FIGS. 1(a) through 1(c), the top wall being shown in FIG. 5(c) with the ends of the inner fabric sheet slightly bent.
Figure 5B:
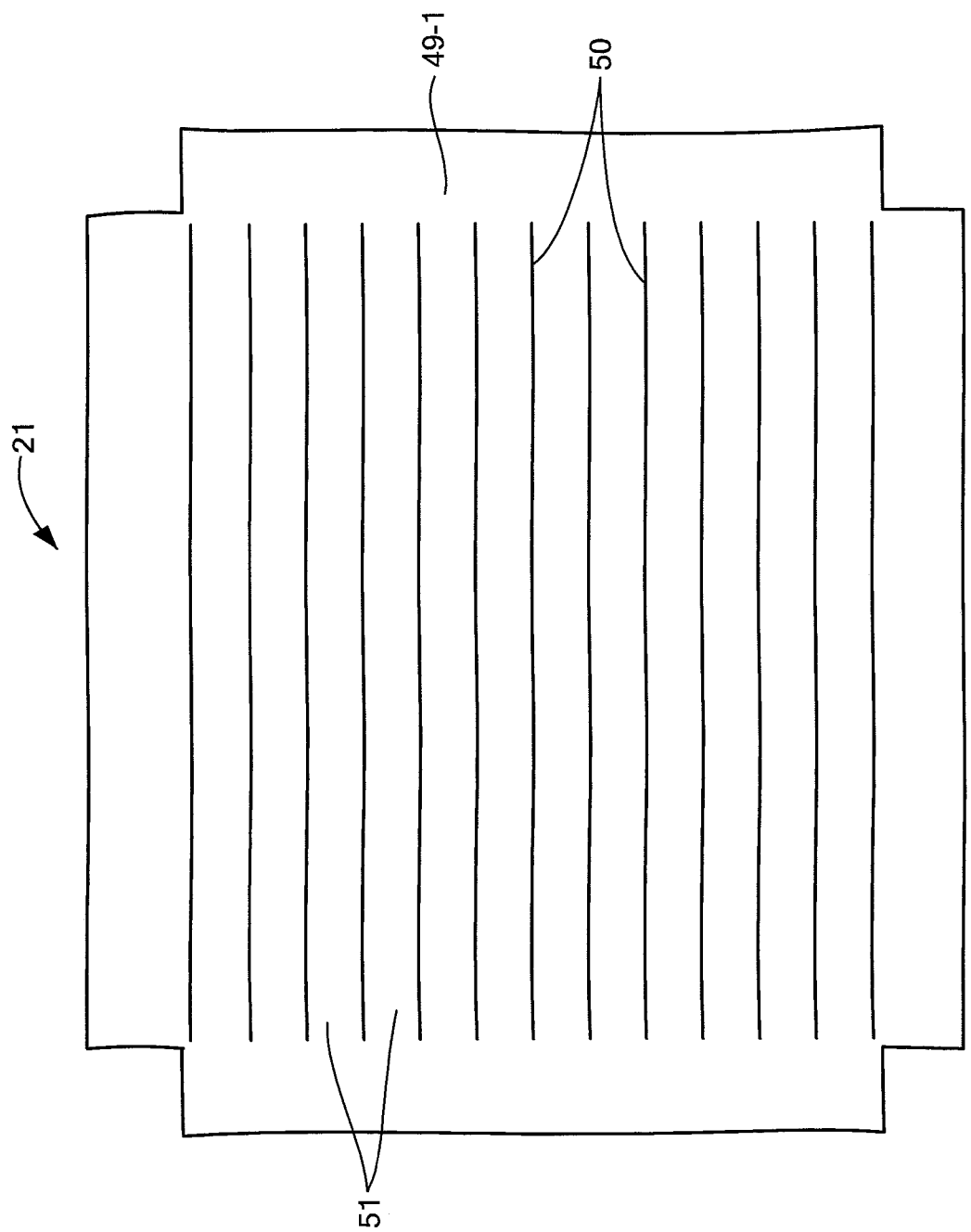
Figure 5C:
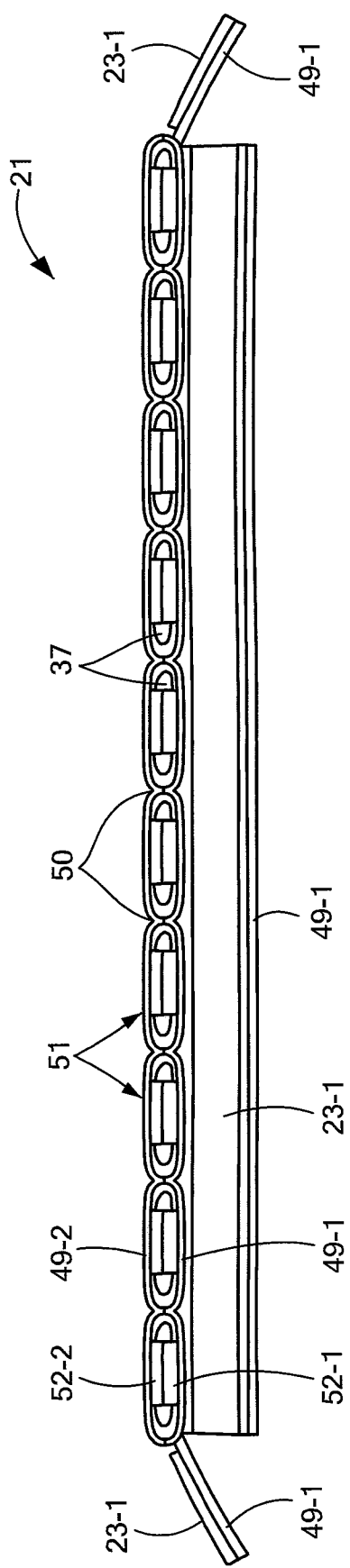
Figure 5D:
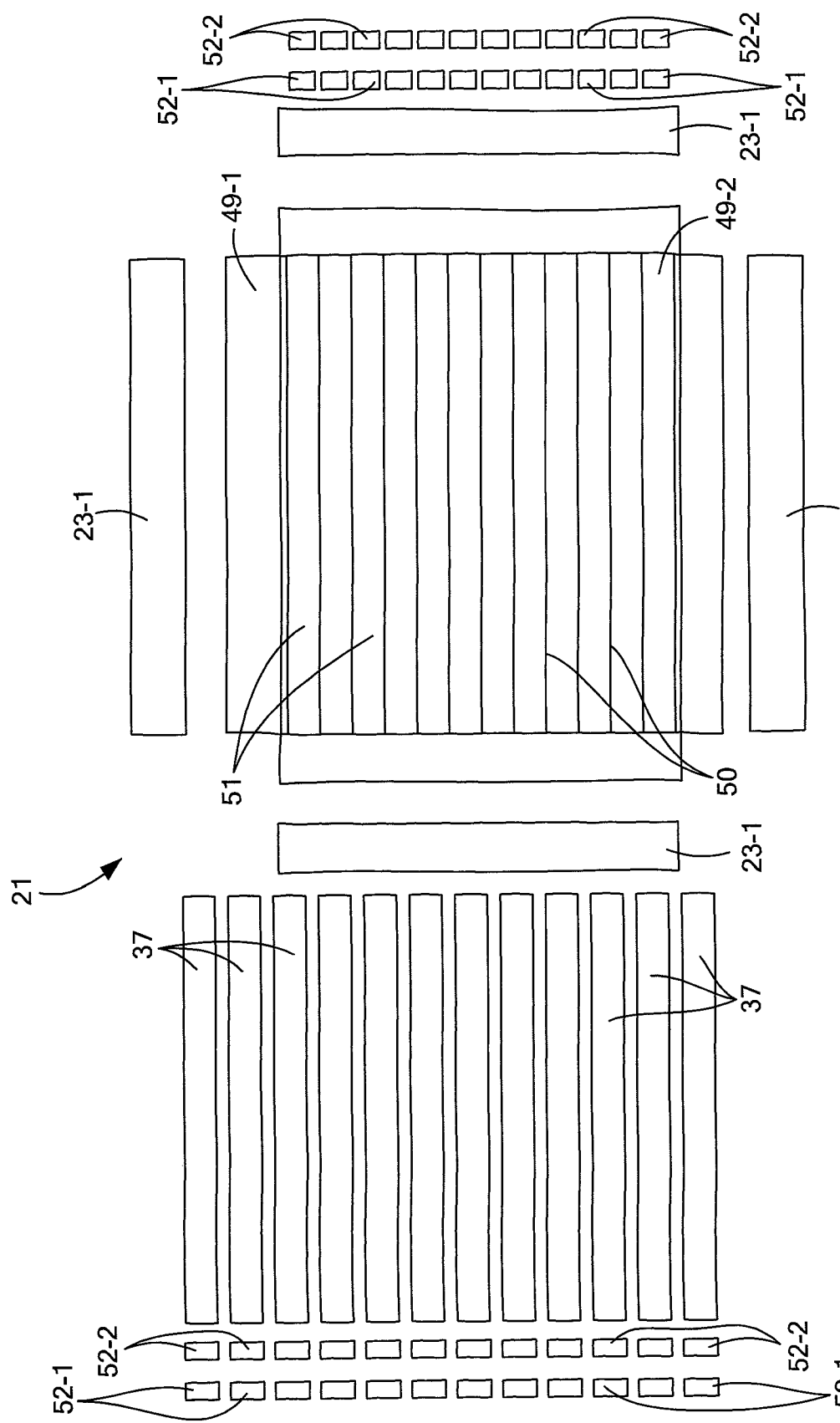

Front wall 13 may further comprise a plurality of temperature-control members 37, which members 37 are shown in a simplified manner in FIGS. 2(a), 2(e), 2(f) and 2(g). Each temperature-control member 37, which is also shown separately in FIGS. 3(a) and 3(b), may be appropriately dimensioned to occupy a portion of or substantially the entirety of one of pockets 35. Temperature-control member 37 may take a variety of different forms and may comprise one or more refrigerant packs of the type disclosed in U.S. Pat. No. 9,598,622 B2, inventors Formato et al., issued Mar. 21, 2017, and U.S. Patent Application Publication No. US 2018/0093816 A1, inventors Longley et al., published Apr. 5, 2018, both of which are incorporated herein by reference. More specifically, according to one embodiment, temperature-control members 37 may be in the form of flexible mats having a plurality of discrete sealed pouches, each pouch containing a quantity of a phase-change material (PCM). The phase-change material may be any phase-change material including any water-based or organic phase-change material. For example, if the phase-change material is water-based, the phase-change material may be water, a mixture of water and a thickener (e.g., a polysaccharide thickener) to produce a gelled water mixture, or a water/salt solution with an optional thickener (such as a 500-ST series KOOLIT® gel pack or saddlebag from Cold Chain Technologies, Inc. (Franklin, Mass.)). Temperature-control member 37 may also take other forms and may comprise one or more conventional ice packs or gel packs.

According to one embodiment, temperature-control member 37 may be in the form of one or more flexible mats, each of which may comprise a pair of flexible polymer films 38-1 and 38-2. Film 38-1, which may be flat, may comprise, for example, a laminate or co-extrusion comprising polyethylene, ethylene vinyl alcohol, and NYLON™ polyamide layers, the laminate or co-extrusion having an overall thickness of about 4 mils, with the film being oriented so that the bottom layer is polyethylene. Film 38-2, which may be shaped, for example, by thermoforming (or plug-assist thermoforming) to include a plurality of troughs, may comprise, for example, a laminate or co-extrusion comprising polyethylene, ethylene vinyl alcohol, and NYLON™ polyamide layers, the laminate or co-extrusion having an overall thickness of about 6-7 mils, with the film being oriented so that the top layer is polyethylene. Films 38-1 and 38-2 may be joined to one another, for example, by heat-sealing the opposing polyethylene layers along the respective peripheries of films 38-1 and 38-2 to define a peripheral seam 39-1 and also in the areas corresponding to the spaces between adjacent troughs to define a plurality of inner seams 39-2 through 39-5, thereby defining a mat comprising a plurality of sealed pouches 40-1 through 40-5 (pouches 40-1 through 40-5 being impermeable to the contents contained therewithin). It is to be understood that, instead of being polyethylene, the sealant material for films 38-1 and 38-2 could be a plastomer or ionomer. Solely for purposes of illustration and without being limited to any particular dimensions, each of pouches 40-1 through 40-5 may have a length of approximately 7-7¼ inches, a width of approximately 3½-3¾ inches, and a depth of approximately ¼ inch to approximately 1¼ inches.

As can also readily be appreciated, the thermoforming of film 38-2 and the joining of films 38-1 and 38-2 to one another may be performed as part of a continuous process, which may be partially or completely automated. It is to be understood that the number and shape of pouches 40-1 through 40-5 that are shown in FIG. 3(*a*) are merely illustrative and that the number and shape of pouches 40-1 through 40-5 may be varied while still coming within the scope of the present invention. (For example, although five pouches are shown in temperature-control member 37, there may be as few as one pouch per temperature-control member 37 or as many as six or more pouches per temperature-control member 37).

A quantity of a phase-change material (PCM) 41 may be positioned within each of the troughs of film 38-2 prior to the joining together of films 38-1 and 38-2. According to one embodiment, films 38-1 and 38-2 and phase-change material 41 may have a combined weight of approximately 27.5 ounces. (If temperature-control member 37 were modified to have two pouches, its combined weight would be approximately 11 ounces, and if temperature-control member 37 were modified to have six pouches, its combined weight would be approximately 33 ounces.) Phase-change material 41 may be any phase-change material including any water-based or organic phase-change material. Solely for purposes of illustration, phase-change material 41 may comprise, in a particular embodiment, a gelled organic phase-change material, examples of which are disclosed in U.S. Patent Application Publication No. US 2014/0290285 A1, inventors Formato et al., published Oct. 2, 2014, the disclosure of which is incorporated herein by reference. More specifically, a suitable gelled phase-change material may comprise one or more n-alkanes, such as n-tetradecane (C14), n-pentadecane (C15), n-hexadecane (C16), n-heptadecane (C17), and n-octadecane (C18), together with a gelling agent in the form of a styrene-ethylene-butylene-styrene triblock copolymer or a styrene-ethylene-propylene-styrene triblock copolymer. Preferably, the gelling agent constitutes less than 10% of the gelled phase-change material, with the remainder of the gelled phase-change material constituting the one or more n-alkanes. Notwithstanding the above, a nominal amount of a wax-compatible dye (e.g., less than about 0.01% by weight) may also be included in the gelled phase-change material to give the gelled phase-change material a desired and/or distinctive color. In this manner, for example, gels that possess different phase-change temperatures may each be dyed a different color. Examples of suitable dyes include, for example, the family of EVO dyes commercially available from The Candlewic Company of Doylestown, Pa.

Illustrative examples of combinations of n-alkanes may include, but are not limited to, mixtures of n-tetradecane and n-hexadecane, mixtures of n-tetradecane and n-pentadecane, and mixtures of n-hexadecane and n-octadecane. Examples of the aforementioned gelling agent may include one or more of Kraton™ G1651 copolymer (a high molecular weight SEBS tri-block copolymer with a styrene:rubber ratio of 30:70% by weight), Kraton™ G1654 copolymer (a high molecular weight SEBS tri-block copolymer with a styrene:rubber ratio of 33:67% by weight), or Kraton™ G1660 copolymer (an SEBS tri-block copolymer with a styrene:rubber ratio of 31:69% by weight), or an SEPS copolymer, such as, but not limited to, SEPTON™ S2005 copolymer (a high molecular weight SEPS tri-block copolymer with a styrene:rubber ratio of 20:80% by weight).

To prepare the gelled phase-change material, the above-described one or more n-alkanes and the above-described gelling agent may be mixed at a first temperature at which the at least one n-alkane is in a liquid state and which is below the flashpoint of the at least one n-alkane and at which the mixture is not a viscoelastic liquid, whereby a non-homogeneous mixture is produced. In most instances, if the phase-change material is a liquid at room temperature, i.e., at a temperature in the range of about 15° C. to about 30° C. or, more specifically, at a temperature in the range of about 19° C. to about 25° C., the aforementioned mixing step may take place at room temperature. The aforementioned mixing of the one or more n-alkanes with the gelling agent may be performed, for example, by dispensing the gelling agent and the one or more n-alkanes into a receptacle, such as a trough of film 38-2. For purposes of illustration, approximately 12-18 g of a gelling agent, such as Kraton™ G1654 copolymer, and approximately 150-200 g of one or more n-alkanes, may be added to each receptacle. Next, the receptacle may be sealed, such as with film 38-1 (after, optionally, vacuuming substantially all of the air from within the receptacle). Thereafter, the receptacle may be vibrated for about 5 to 60 seconds at ambient temperature so that the gelling agent is substantially completely wetted by the one or more n-alkanes.

Next, after the above-described mixing step has been performed, the non-homogenous mixture that is produced may then be heated to a second temperature that is below the flashpoint of the at least one n-alkane and at which a viscoelastic liquid is formed. The temperature at which the viscoelastic liquid may be formed may be between about 40° C. and about 80° C., preferably between about 45° C. and about 60° C. or between about 45° C. and about 55° C., depending on the formulation used, and the heating step may comprise heating the mixture to a corresponding temperature of between about 40° C. and about 80° C., preferably between about 45° C. and about 60° C. or between about 45° C. and about 55° C., depending on the formulation used. For example, the non-homogeneous mixture may be heated to a temperature of about 50° C. or to a temperature of about 60° C., depending on the formulation used. The step of heating the non-homogeneous mixture may include a ramp phase during which the temperature of the non-homogeneous mixture may be raised from the first temperature to the second temperature and a constant (or soak) phase during which the temperature of the non-homogeneous mixture may be maintained at the second temperature. The aforementioned ramp phase may have a duration of about 0.75 to 2.0 hours and may range from a minimum ramp rate of about 0.025° C./minute to a maximum ramp rate of about 2.5° C./minute, with a preferred ramp rate being in the range of about 0.15° C./minute to about 0.75° C./minute, such as 0.45° C./minute. The aforementioned constant (or soak) phase may range from a minimum of about 0.5 hours to a maximum of about 20 hours, with a preferred range of about 1.5 hours to about 3.0 hours. The step of cooling the viscoelastic liquid to room temperature may take place simply by allowing the viscoelastic liquid to cool passively at room temperature or may take place using cooling materials and/or equipment. The cooling step may involve a ramping down of temperature of the viscoelastic liquid at a rate complementary to that described above for the ramp phase of the heating step and/or may take about 1 to 4 hours. In other words, the ramping down of temperature of the viscoelastic liquid during the cooling step may range from a minimum ramp down rate of about 0.025° C./minute to a maximum ramp down rate of about 2.5° C./minute, with a preferred ramp down rate being in the range of about 0.10° C./minute to about 0.55° C./minute. For example, the ramp down rate could be 0.15° C./minute. After the mixing step and prior to the heating step, the non-homogenous mixture may rest for a period of time, during which the gelling agent may swell. This resting period may be, for example, as short as about 5 to 15 minutes or may be as long as several hours up to about 72 hours. The above-described ramp rates, as well as the soak and rest times, may vary depending on the thickness of the mixture, as well as the equipment being used.

The gelling agent and the one or more n-alkanes may be dispensed sequentially or simultaneously into the troughs of film 38-2. According to a preferred embodiment, the gelling agent may first be dispensed into the receptacle, and the one or more n-alkanes may then be dispensed on top of the gelling agent. The mixing, heating, and cooling of the gelling agent and the one or more n-alkanes may take place while the gelling agent and the one or more n-alkanes are present within the troughs of film 38-2; alternatively, one or more of the mixing, heating and cooling steps may be performed prior to dispensing the mixture into the troughs of film 38-2. As can be appreciated, the fabrication of pouches 40-1 through 40-5, as well as the preparation of the phase-change material disposed therewithin, may be performed in an automated or semi-automated fashion.

Examples of gelled organic phase-change materials that may be suitable for use as phase-change material 41 may include the materials provided below in Table I, as well as those disclosed in U.S. Patent Application Publication No. US 2014/0290285 A1:

TABLE 1

| Example No. | Approximate Phase-Change Temperature | % N-Alkane | Composition of N-Alkane(s) | % and Name of Gelling Agent | Thermal Cycle (Ramp up, Soak, Cool Down); RT = Room Temp. |
|---|---|---|---|---|---|
| 1 | 3° C. | 92.6% | 98.5% C14 and 1.5% C16 | 7.4% Kraton ™ G1654 Powder | Ramp RT to 50 C. in < 1 hr, Soak @ 50 C. for 1.5 hrs, Cool to RT in Ambient |
| 2a | 5° C. | 92.6% | 100% C14 | 7.4% Kraton ™ G1654 Powder | Ramp RT to 50 C. in < 1 hr, Soak @ 50 C. for 1.5 hrs, Cool to RT in Ambient |
| 2b | 5° C. | 91.7% | 100% C14 | 8.3% Kraton ™ G1654 Powder | Ramp RT to 50 C. in < 1 hr, Soak @ 50 C. for 2.5 hrs, Cool to RT in Ambient |
| 3a | 7° C. | 92.6% | 38.2% C14 and 61.8% C16 | 7.4% Kraton ™ G1654 Powder | Ramp RT to 60 C. in 1 hr, Soak @ 60 C. for 3.0 hrs, Cool to RT in Ambient |
| 3b | 7° C. | 92.6% | 16% C14 and 84% C15 | 7.4% Kraton ™ G1654 Powder | Ramp RT to 50 C. in < 1 hr, Soak @ 50 C. for 1.5 hrs, Cool to RT in Ambient |
| 4 | 17° C. | 92.6% | 100% C16 | 7.4% Kraton ™ G1654 Powder | Ramp RT to 50 C. in < 1 hr, Soak @ 50 C. for 1.5 hrs, Cool to RT in Ambient |
| 5 | 24° C. | 91.7% | 11.5% C16 and 88.5% C18 | 8.3% Kraton ™ G1654 Powder | Ramp 30 C. to 60 C. in 1 hr, Soak @ 60 C. for 2.0 hrs, Cool to RT in Ambient |

With the exception of above Example Nos. 2b, 3a, and 5, the gelled phase-change materials were prepared by placing the above-described mixtures in a pre-heated oven operating at 50° C. for a period of approximately 2.5 hours and then removing the mixtures from the oven and allowing the mixtures to cool passively to room temperature in the ambient environment. The gelled phase-change material of Example No. 5 was made using a "room temperature" of 30° C. to prevent freezing of the phase-change material prior to thermal cure, and the soak temperature used therefor was 60° C. for 2 hours.

Some of the properties of temperature-control members including the gelled PCMs of Table 1 are presented below in Table 2. The temperature-control members were subjected to phase-change temperature testing, syneresis testing and compressive modulus (stiffness) testing. Specifically, the phase change temperature of the gelled PCM inside each type of temperature-control member was measured by placing a pair of packaged products back-to-back, with a thermocouple inserted between them at the geometric center, and measuring the thermocouple temperature response as the gelled PCM froze and thawed over one cycle, with a controlled change in the environment surrounding the sample. Syneresis testing involved suspending the temperature-control members vertically (longest dimension in direction of gravity) and subjecting the temperature-control members to multiple freeze/thaw studies to determine if the samples met the requirement of less than 0.5% syneresis (syneresis defined herein as free-standing liquid PCM in the thermal exchange implement container) after being subjected to 12 freeze/thaw cycles. Note: one cycle is defined as 4 hours at −20° C., followed by 4 hours at +40° C. (cycle time needs to be increased if part thickness is increased). Strength (stiffness) of the gelled PCM samples was measured by removing each gelled PCM from its container, measuring the compressive modulus (psi) of the gelled sample at three distinct locations (left, center, right) using a texture analyzer, and averaging these values. The sample thickness was also measured (ultrasonically) at that time.

TABLE 2

| Example No. | Avg. Thickness (inches) | Measured THAW Phase-Change Temp (Deg C.) | Measured FREEZE Phase-Change Temp (Deg C.) | 12 Freeze/Thaw Cycle Syneresis (% weight) | Compressive Modulus (psi) |
|---|---|---|---|---|---|
| 1 | 0.485 | 4.55 | 3.12 | 0.0 | 3.67 |
| 2a | 0.528 | 5.29 | 4.08 | <0.5 | 3.68 |
| 2b | 0.753 | 5.19 | 3.94 | <0.0 | 4.42 |
| 3a | 0.350 | 6.52 | 7.46 | 0.0 | 4.70 |
| 3b | 0.526 | 7.35 | 7.11 | 0.0 | 3.87 |
| 4 | 0.484 | 17.43 | 16.86 | <0.5 | 3.63 |
| 5 | 0.541 | 24.48 | 23.94 | 0.0 | 4.92 |

Gelled organic phase-change materials of the type described above possess many desirable attributes. For example, such gelled materials are capable of conforming to virtually any shaped pouch or other receptacle therefor while, at the same time, being less susceptible to leaking than liquid phase-change materials. In addition, such gelled materials possess good shock absorption and, therefore, provide physical protection to a payload covered thereby. Additionally, such gelled materials are capable of surviving many freeze/thaw cycles while maintaining good performance as a phase-change material. Moreover, such gelled materials possess excellent compression strength—even when placed under a payload (as in certain embodiments discussed below). Furthermore, the above-described gelled phase-change materials tend to cover more surface area of a product load than do an equivalent amount of a liquid phase-change material, especially when the phase-change material is oriented vertically. This is because liquid phase-change materials tend to flow to the bottom of the receptacle containing the liquid phase-change material. Consequently, orienting the receptacle vertically tends to cause a significant portion of the liquid phase-change material to pool at the bottom of the receptacle. (This problem may persist, albeit to a lesser extent, even if the receptacle is oriented horizontally.) By contrast, the subject gelled materials tend not to flow much, if at all, to the bottom of a receptacle therefor.

In a preferred embodiment, a quantity of phase-change material 41 may be contained within each of pouches 40-1 through 40-5, the contents of pouches 40-1 through 40-5 being sealed from one another. Preferably, each of pouches 40-1 through 40-5 contains approximately the same quantity of the same type of phase-change material 41. Notwithstanding the above, it is to be understood that different pouches 40-1 through 40-5 of a given temperature-control member 37 may contain different types and/or quantities of phase-change material and/or that certain pouches 40-1 through 40-5 of a given temperature-control member 37 may contain phase-change material whereas other pouches 40-1 through 40-5 of the same temperature-control member 37 may be devoid of phase-change material. It is also to be understood that different temperature-control members 37 employed in front wall 13 may contain different types and/or quantities of phase-change material and/or that different walls may contain different types and/or quantities of phase-change material. Also, it is to be understood that certain pockets 35 of front wall 13 may be entirely devoid of a temperature-control member 37 or of any other contents whereas other pockets 35 of front wall 13 may contain one or more temperature-control members 37. Consequently, if desired, one may have phase-change material 41 positioned across a substantial portion of the surface area of front wall 13 (although phase-change material 41 is not present in those areas corresponding to the seams 39-1 through 39-5 of temperature-control members 37 or in those areas corresponding to the seams between pockets 35). Alternatively, if desired, one may have a more uneven distribution of phase-change material 41 across the surface area of front wall 13, such as by positioning greater amounts of phase-change material in the corner regions of front wall 13 and lesser or no amounts of phase-change material in the central regions of front wall 13 or by positioning greater amounts of phase-change material in the upper portion of front wall 13 and lesser or no amounts of phase-change material in the lower portion of front wall 13.

Referring back now to FIGS. 1(a) through 1(c), front wall 13 may further comprise along its bottom edge one or more closure devices 43, such as straps, clips, hooks, or the like, that may be used to secure front wall 13 to a pallet P. Pallet P may be a conventional wooden or plastic pallet. Alternatively, pallet P may be a thermally insulated pallet, such as an AIRDEX pallet, which is commercially available from Foam Fabricators, Modesto, Calif. An AIRDEX pallet typically contains 2+ inches of expanded polystyrene insulation. The use of a thermally insulated pallet may obviate the desirability, in certain cases, of positioning an insulating material and/or a phase-change material below the payload.

Referring now to FIGS. 4(a) through 4(g), left wall 17 is shown in greater detail. (Although left wall 17 may include along its bottom edge one or more closure devices 43 like those of front wall 13, such closure devices 43 are not shown in FIGS. 4(a) through 4(g) for ease of illustration. Other features of left wall 17 not critical to the invention may not be shown in one or more of FIGS. 4(a) through 4(g) or may be shown therein in a simplified manner.) As can be seen, left wall 17 may be an assembly of components and may comprise an inner (i.e., proximate to the payload) sheet 45-1 and an outer (i.e., distal to the payload) sheet 45-2. Inner sheet 45-1 and outer sheet 45-2 may be generally rectangular sheets of generally similar size, with inner sheet 45-1 preferably being slightly undersized relative to outer sheet 45-2 so that small portions of the left and right sides of outer sheet 45-2 extend beyond and are uncovered by inner sheet 45-1. Each of inner sheet 45-1 and outer sheet 45-2 may be made from a suitable material and may be made of the same types of materials as sheets 25 and 27, respectively, of front wall 13.

Inner sheet 45-1 and outer sheet 45-2 may be joined to one another along the top and bottom edges of fabric sheets 45-1 and 45-2 by a pair of parallel outer seams 46-1 and may additionally be joined to one another along a plurality of generally parallel inner seams 46-2. Seams 46-1 and 46-2, which may be parallel to each other, may be formed by sewing, heat-sealing, or other suitable means. Seams 46-1 and 46-2 may define a series of parallel pockets 47 that may extend generally horizontally across substantially the entire width of fabric sheet 45-1. Pockets 47 may be formed to have a pair of open ends 47-1 and 47-2; however, pockets 47 may be reversibly opened and closed using strips of complementary hook and loop fasteners 48-1 and 48-2 located on opposing faces of sheets 45-1 and 45-2 at each of ends 47-1 and 47-2. For example, fastener 48-1 may be secured, for example, by stitching, to the outer face of sheet 45-1 at each of ends 47-1 and 47-2, and fastener 48-2 may be secured, for example, by stitching, to the inner face of sheet 45-2 at each of ends 47-1 and 47-2. Alternatively, other types of non-permanent fasteners (e.g., snaps, buttons, zippers, ties, cinches, resealable adhesives, etc.) may be used instead of complementary hook and loop fasteners. As will become apparent below, by using non-permanent fasteners to reversibly close ends 47-1 and 47-2, temperature-control members may be removably and securely disposed within pockets 47. However, it is to be understood that, in another embodiment, one of ends 47-1 and 47-2 may be permanently closed or sealed, for example, by stitching or heat-sealing, whereas the other of ends 47-1 and 47-2 may be non-permanently closed or sealed using one or more non-permanent fasteners of the type described above. Moreover, in yet another embodiment, both of ends 47-1 and 47-2 may be permanently closed or sealed, for example, by stitching or heat-sealing. Furthermore, although left wall 17 is constructed so that ends 47-1 and 47-2 of pockets 47 are disposed on the inward-facing side of left wall 17 (i.e., facing towards a payload), it is to be understood that left wall 17 could be constructed so that ends 47-1 and 47-2 of pockets 47 are disposed on the outward-facing side of left wall 17 (i.e., facing away from a payload).

As noted above, left wall 17 and top wall 21 may be detachably joined to one another using complementary fasteners 23-1 and 23-2. More specifically, fastener 23-2 may be secured, for example, by stitching, to the inner face of sheet 45-1 along its top edge, and fastener 23-1 may be provided as a part of top wall 21 (see FIG. 1(*c*)). In addition, left wall 17 may be detachably joined to each of front wall 13 and rear wall 15 using complementary fasteners 24-1 and 24-2. More specifically, strips of fasteners 24-2 may be secured, for example, by stitching, to the outer face of sheet 45-2 along its left and right edges, and strips of fasteners 24-1 may be provided as parts of front wall 13 and rear wall 15 (see FIG. 1(*c*)). (As can be appreciated, instead of securing fastener 23-2 to the inner face of sheet 45-1 and securing fastener 24-2 to the outer face of sheet 45-2, one could alternatively secure fastener 23-2 to the outer face of sheet 45-2 and/or secure fastener 24-2 to the inner face of sheet 45-2.) Preferably, fasteners 23-1 and 23-2 and fasteners 24-1 and 24-2 are appropriately positioned on their respective walls so that, when such walls are joined together thereby, the pockets of one wall come into close proximity with the pockets of the wall joined thereto. In this manner, as will be apparent from the discussion below, it is possible for the contents of the pockets in neighboring walls to be brought into close proximity to one another, thereby minimizing the gap between temperature-control members of neighboring walls.

Left wall 17 may further comprise a plurality of temperature-control members 37, which members 37 are shown in a simplified manner in FIGS. 4(*a*), 4(*e*), 4(*f*) and 4(*g*). According to one embodiment, an identical temperature-control member 37 may be disposed within each of pockets 47. However, as described above in connection with front wall 13, different pouches 40-1 through 40-5 of a given temperature-control member 37 may contain different types and/or quantities of phase-change material and/or certain pouches 40-1 through 40-5 of a given temperature-control member 37 may contain phase-change material whereas other pouches 40-1 through 40-5 of the same temperature-control member 37 may be devoid of phase-change material. Moreover, different temperature-control members 37 employed in left wall 17 may contain different types and/or quantities of phase-change material, and certain pockets 47 of left wall 17 may be entirely devoid of a temperature-control member 37 or of any other contents whereas other pockets 47 of left wall 17 may contain one or more temperature-control members 37. Consequently, if desired, one may have phase-change material 41 positioned across a substantial portion of the surface area of left wall 17 (although phase-change material 41 is not present in those areas corresponding to the seams 39-1 through 39-5 of temperature-control members 37 or in those areas corresponding to the seams between pockets 47 or in the areas beyond the left and right sides of sheet 45-1). Alternatively, if desired, one may have a more uneven distribution of phase-change material 41 across the surface area of left wall 17, such as by positioning greater amounts of phase-change material in the corner regions of left wall 17 and lesser or no amounts of phase-change material in the central regions of left wall 17 or by positioning greater amounts of phase-change material in the upper portion of left wall 17 and lesser or no amounts of phase-change material in the lower portion of left wall 17.

Referring now to FIGS. 5(*a*) through 5(*d*), top wall 21 is shown in greater detail. (Certain features of top wall 21 not critical to the invention may not be shown in one or more of FIGS. 5(*a*) through 5(*d*) or may be shown therein in a simplified manner.) As can be seen, top wall 21 may be an assembly of components and may comprise an inner (i.e., proximate to the payload) sheet 49-1 and an outer (i.e., distal to the payload) sheet 49-2. Inner sheet 49-1 and outer sheet 49-2 may be generally rectangular sheets of generally similar size, with outer sheet 49-2 preferably being slightly undersized relative to inner sheet 49-1 so that small portions of the four ends of inner sheet 49-1 extend beyond and are uncovered by outer sheet 49-2. Each of inner sheet 49-1 and outer sheet 49-2 may be made from a suitable material and may be made of the same types of materials as sheets 25 and 27, respectively, of front wall 13.

Inner sheet 49-1 and outer sheet 49-2 may be joined to one another along a plurality of parallel seams 50, which may be formed by sewing, heat-sealing or other suitable means. Seams 50 may define a series of parallel pockets 51 that may extend across substantially the entire width of sheet 49-2. Pockets 51 may be formed to have a pair of open ends; however, pockets 51 may be reversibly opened and closed using strips of complementary hook and loop fasteners 52-1 and 52-2 located on opposing faces of sheets 49-1 and 49-2 at each of the open ends. For example, fastener 52-1 may be secured, for example, by stitching, to the outer face of sheet 49-1 at each of the open ends, and fastener 52-2 may be secured, for example, by stitching, to the inner face of sheet 49-2 at each of the open ends. Alternatively, other types of non-permanent fasteners (e.g., snaps, buttons, zippers, ties, cinches, resealable adhesives, etc.) may be used instead of complementary hook and loop fasteners. As will become apparent below, by using non-permanent fasteners to reversibly close the ends of pockets 51, temperature-control members may be removably and securely disposed within pockets 51. However, it is to be understood that, in another embodiment, one of the ends of pockets 51 may be permanently closed or sealed, for example, by stitching or heat-sealing, whereas the other of the ends of pockets 51 may be non-permanently closed or sealed using one or more non-permanent fasteners of the type described above. Moreover, in yet another embodiment, both of the ends of pockets 51 may be permanently closed or sealed, for example, by stitching or heat-sealing. Furthermore, although top wall 21 is constructed so that the ends of pockets 51 are disposed on the outwardly-facing side of top wall 21 (i.e., facing away from a payload), it is to be understood that top wall 21 could be constructed so that the ends of pockets 51 are disposed on the inwardly-facing side of top wall 21 (i.e., facing towards a payload).

As alluded to above, fasteners 23-1 may be secured, for example, by stitching, to the outwardly-facing side of each of the four exposed ends of inner sheet 49-1. Such fasteners 23-1 are adapted for detachable joining to complementary fasteners 23-2 provided as parts of front wall 13, rear wall 15, left wall 17, and right wall 19 (see FIG. 1(*c*)) so that top wall 21 may be detachably joined to each of front wall 13, rear wall 15, left wall 17 and right wall 19.

Top wall 21 may further comprise a plurality of temperature-control members 37, which members 37 are shown in a simplified manner in FIGS. 5(*c*) and 5(*d*). According to one embodiment, an identical temperature-control member 37 may be disposed within each of pockets 51. However, as described above in connection with front wall 13, different pouches 40-1 through 40-5 of a given temperature-control member 37 may contain different types and/or quantities of phase-change material and/or certain pouches 40-1 through 40-5 of a given temperature-control member 37 may contain phase-change material whereas other pouches 40-1 through 40-5 of the same temperature-control member 37 may be devoid of phase-change material. Moreover, different temperature-control members 37 employed in top wall 21 may contain different types and/or quantities of phase-change material, and certain pockets 51 of top wall 21 may be entirely devoid of a temperature-control member 37 or of any other contents whereas other pockets 51 of top wall 21 may contain one or more temperature-control members 37. Consequently, if desired, one may have phase-change material 41 positioned across a substantial portion of the surface area of top wall 21 (although phase-change material 41 is not present in those areas corresponding to the seams 39-1 through 39-5 of temperature-control members 37 or in those areas corresponding to the seams between pockets 51 or in the areas beyond sheet 49-2). Alternatively, if desired, one may have a more uneven distribution of phase-change material 41 across the surface area of top wall 21, such as by positioning greater amounts of phase-change material in the corner regions of top wall 21 and lesser or no amounts of phase-change material in the central regions of top wall 21.

Rear wall 15 may have a construction similar to that of front wall 13, and right wall 19 may have a construction similar to that of left wall 17. Each of front wall 13, rear wall 15, left wall 17, right wall 19, and top wall 21 (as well as the alternative embodiments of top wall 21) may possess any of the variations of the types described above, and each of front wall 13, rear wall 15, left wall 17, right wall 19, and top wall 21 (as well as the alternative embodiments of top wall 21) may possess any such variations independently of one another.

As alluded to above, pallet cover 11 may additionally comprise a bottom wall for placement under the payload. Said bottom wall may comprise a layer of insulation and/or a phase-change material. If a phase-change material is used, such a phase-change material is preferably a gelled organic phase-change material of the type described above.

Figure 6:
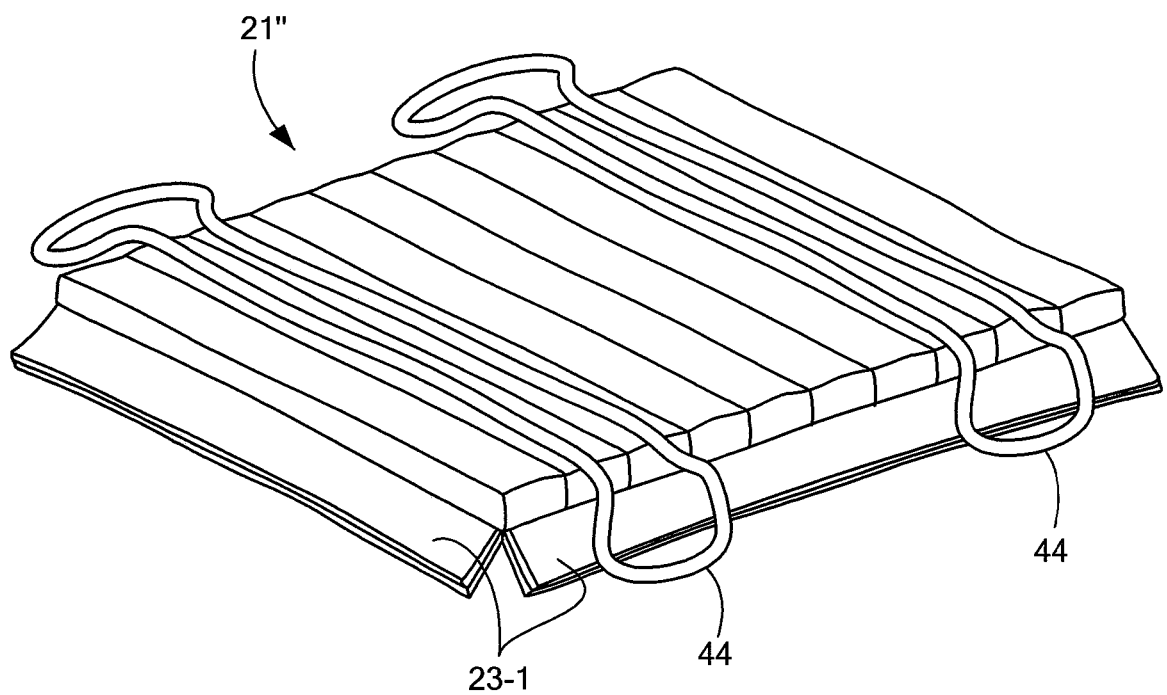
FIG. 6 is a simplified perspective view of a second alternative top wall for use in the pallet cover of FIG. 1.

As can be seen in FIG. 6, there is shown another alternative embodiment of top wall 21, namely, top wall 21". Top wall 21" is similar to top wall 21 but includes one or more looped handles 44 to facilitate the lifting and movement of top wall 21".

Figure 7:
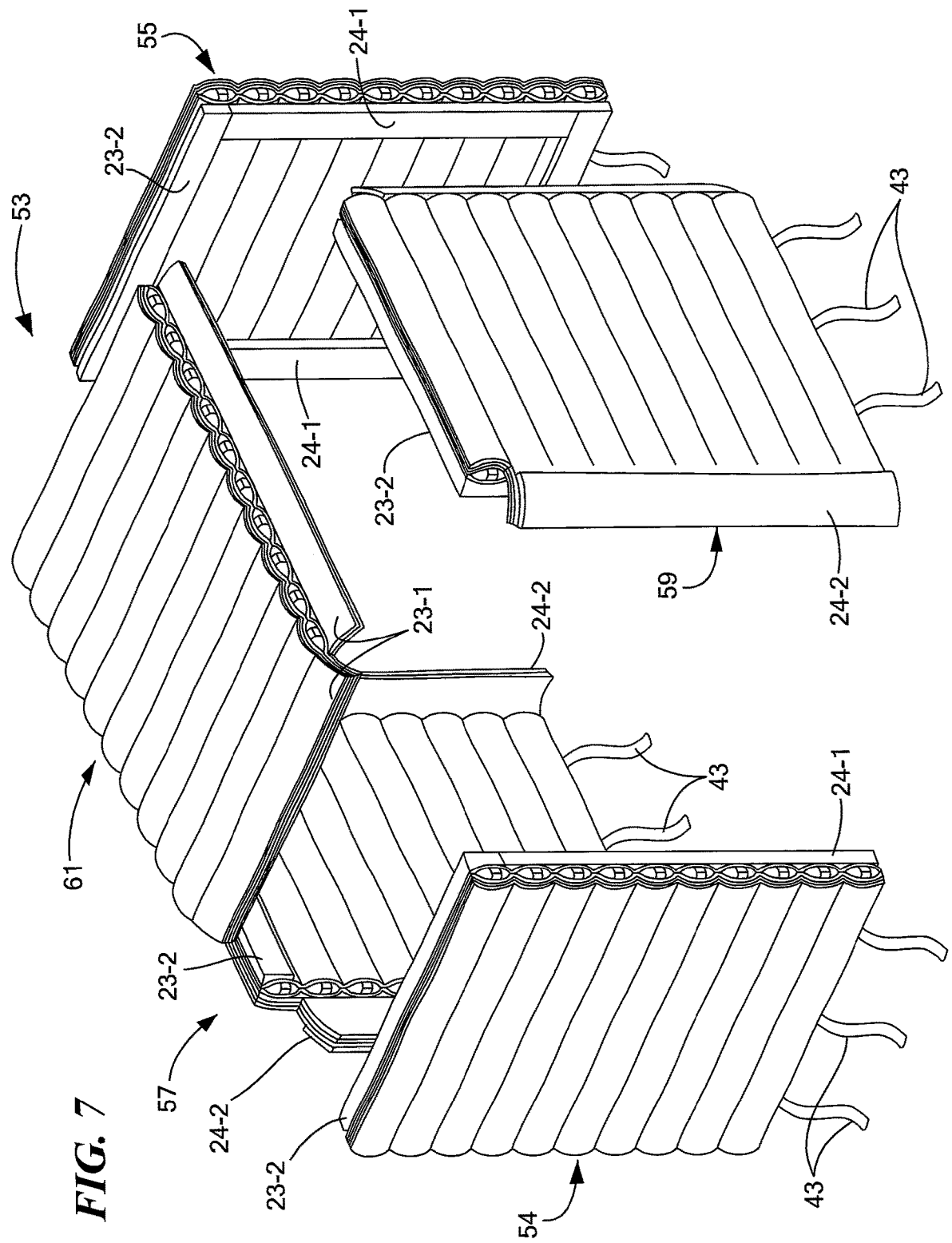
FIG. 7 is a partly exploded perspective view of a second embodiment of a pallet cover constructed according to the teachings of the present invention.

Referring now to FIG. 7, there is shown is a partly exploded perspective view of a second embodiment of a pallet cover constructed according to the teachings of the present invention, the pallet cover being represented generally by reference numeral 53.

Pallet cover 53 may be similar in most respects to pallet cover 11, the principal difference between the two pallet covers being that, whereas pallet cover 11 may include front wall 13, rear wall 15, left wall 17, right wall 19, and top wall 21, pallet cover 53 may comprise a front wall 54, a rear wall 55, a left wall 57, a right wall 59, and a top wall 61. As seen best in FIG. 8, front wall 54 of pallet cover 53 may differ principally from front wall 13 of pallet cover 11 in that front wall 54 may further comprise an outer layer of thermal insulation 63 and a third sheet 65. Third sheet 65 may be a fabric sheet and may be similar in composition to sheets 25 and 27. Outer layer of insulation 63, which may be any suitable thermally-insulating material, such as, but not limited to, a metalized polyester or a bubble wrap with a metalized polyethylene terephthalate layer applied thereto, may be positioned on the outer face of sheet 27, and third sheet 65 may be positioned on the outer face of insulation 63. If desired, third sheet 65 may be sewn or otherwise secured to sheets 25 and 27 along seams 31 and 33. In another embodiment (not shown), insulation 63, may be positioned between temperature-control members 37 and outer sheet 27, and third sheet 65 may be omitted.

Rear wall 55, left wall 57, right wall 59, and top wall 61 may have a construction generally similar to that of rear wall 15, left wall 17, right wall 19, and top wall 21, respectively, of pallet cover 11, except that one or more of rear wall 55, left wall 57, right wall 59, and top wall 61 may additionally include structure corresponding to outer layer of thermal insulation 63 and third sheet 65 of front wall 54.

Figure 9:
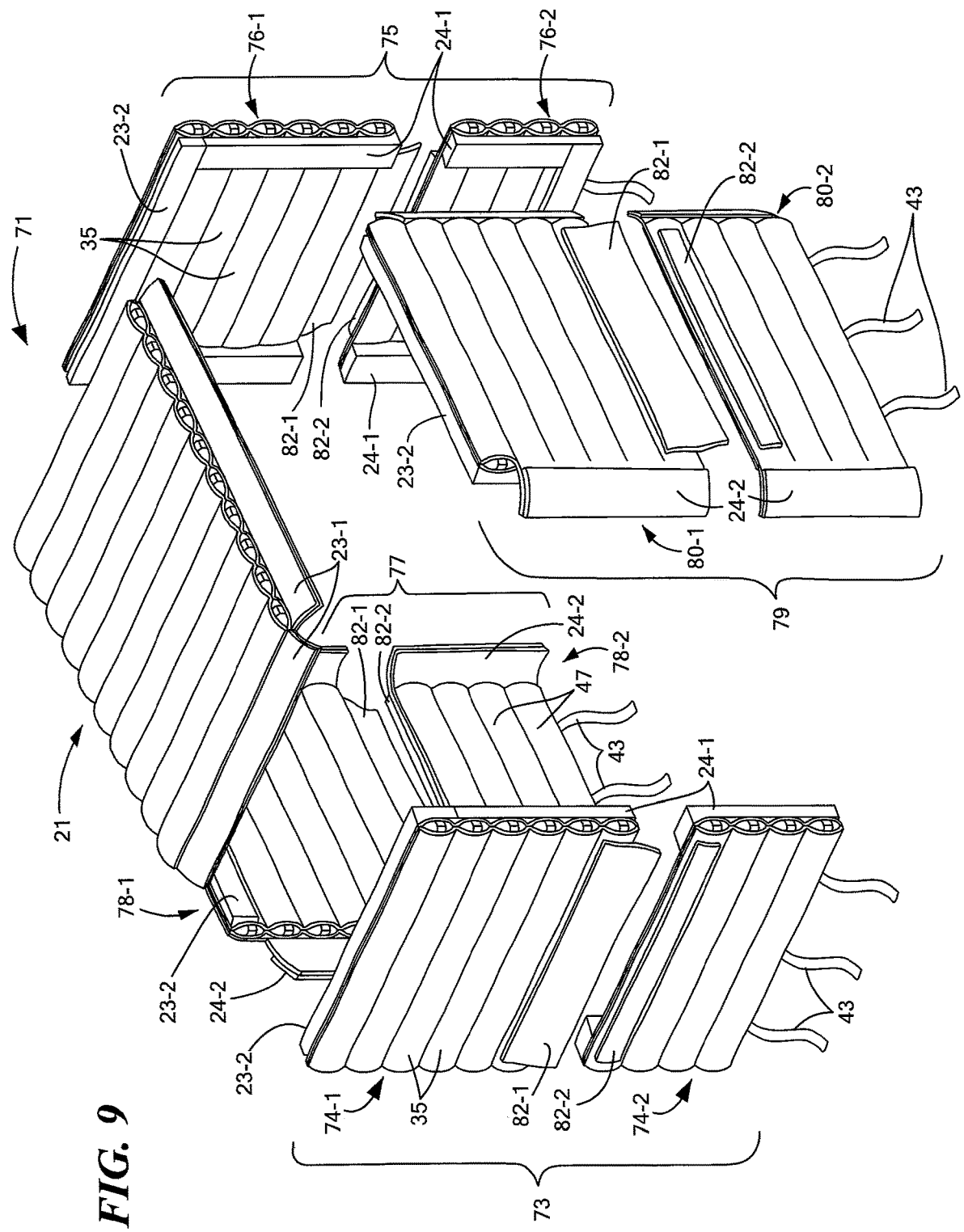
FIG. 9 is a partly exploded perspective view of a third embodiment of a pallet cover constructed according to the teachings of the present invention.

Referring now to FIG. 9, there is shown a partly exploded perspective view of a third embodiment of a pallet cover constructed according to the teachings of the present invention, the pallet cover being represented generally by reference numeral 71. (Certain features of pallet cover 71 not critical to the invention may not be shown in FIG. 9 or may be shown therein in a simplified manner.)

Pallet cover 71 may be similar in most respects to pallet cover 11, the principal difference between the two pallet covers being that, whereas each of front wall 13, rear wall 15, left wall 17, and right wall 19 of pallet cover 11 may be constructed as a unitary structure, pallet cover 71 may comprise a front wall 73, a rear wall 75, a left wall 77, and a right wall 79, each of which may be constructed as a multi-piece structure that may be detachably joined together, for example, using complementary strips of VELCRO hook and loop fasteners or another type of releasable fastener. Consequently, front wall 73 may comprise a first portion 74-1 and a second portion 74-2, rear wall 75 may comprise a first portion 76-1 and a second portion 76-2, left wall 77 may comprise a first portion 78-1 and a second portion 78-2, and right wall 79 may comprise a first portion 80-1 and a second portion 80-2. In the embodiment of FIG. 9, first portions 74-1, 76-1, 78-1 and 80-1 may be detachably joined to top wall 21 using, for example, complementary strips of hook and loop fasteners 23-1 and 23-2 or another type of releasable fastener, and second portions 74-2, 76-2, 78-2 and 80-2 may be detachably joined to first portions 74-1, 76-1, 78-1 and 80-1 using complementary strips of hook and loop fasteners 82-1 and 82-2 or another type of releasable fastener. In a similar fashion, walls 73, 75, 77 and 79 may be detachably joined to one another using complementary strips of hook and loop fasteners 24-1 and 24-2 or another type of releasable fastener.

As can readily be appreciated, the positions of first portions 74-1, 76-1, 78-1 and 80-1 and second portions 74-2, 76-2, 78-2 and 80-2, respectively, may be switched so that second portions 74-2, 76-2, 78-2 and 80-2 are detachably joined directly to top wall 21 (provided that second portions 74-2, 76-2, 78-2 and 80-2 are equipped with the appropriate complementary fastener for joining to top wall 21), with first portions 74-1, 76-1, 78-1 and 80-1 being detachably joined to second portions 74-2, 76-2, 78-2 and 80-2, at a location distal to top wall 21. As can also be appreciated, first portions 74-1, 76-1, 78-1 and 80-1 may be detachably joined directly to top wall 21, without joining second portions 74-2, 76-2, 78-2 and 80-2 to top wall 21 or to first portions 74-1, 76-1, 78-1 and 80-1, respectively, so as to form corresponding walls of reduced length. In an analogous fashion, second portions 74-2, 76-2, 78-2 and 80-2 may be detachably joined directly to top wall 21, without joining first portions 74-1, 76-1, 78-1 and 80-1 to top wall 21 or to second portions 74-2, 76-2, 78-2 and 80-2, respectively, so as to form corresponding walls of reduced length. If both first portions 74-1, 76-1, 78-1 and 80-1 and second portions 74-2, 76-2, 78-2 and 80-2 are joined to top wall 21, regardless of whether first portions 74-1, 76-1, 78-1 and 80-1 are directly joined to top wall 21 or second portions 74-2, 76-2, 78-2 and 80-2 are directly joined to top wall 21, both sets of portions may be partially or fully equipped with temperature-control members 37; alternatively, the portions more distal to top wall 21 may be completely devoid of temperature-control members 37 whereas the portions more proximal to top wall 21 may be partially or fully equipped with temperature-control members 37.

Pallet cover 71 may be modified by incorporating a layer of thermal insulation into one or more of top wall 21, front wall 73, rear wall 75, left wall 77, and right wall 79 in a manner similar to that described above in connection with pallet cover 53.

Figure 10:
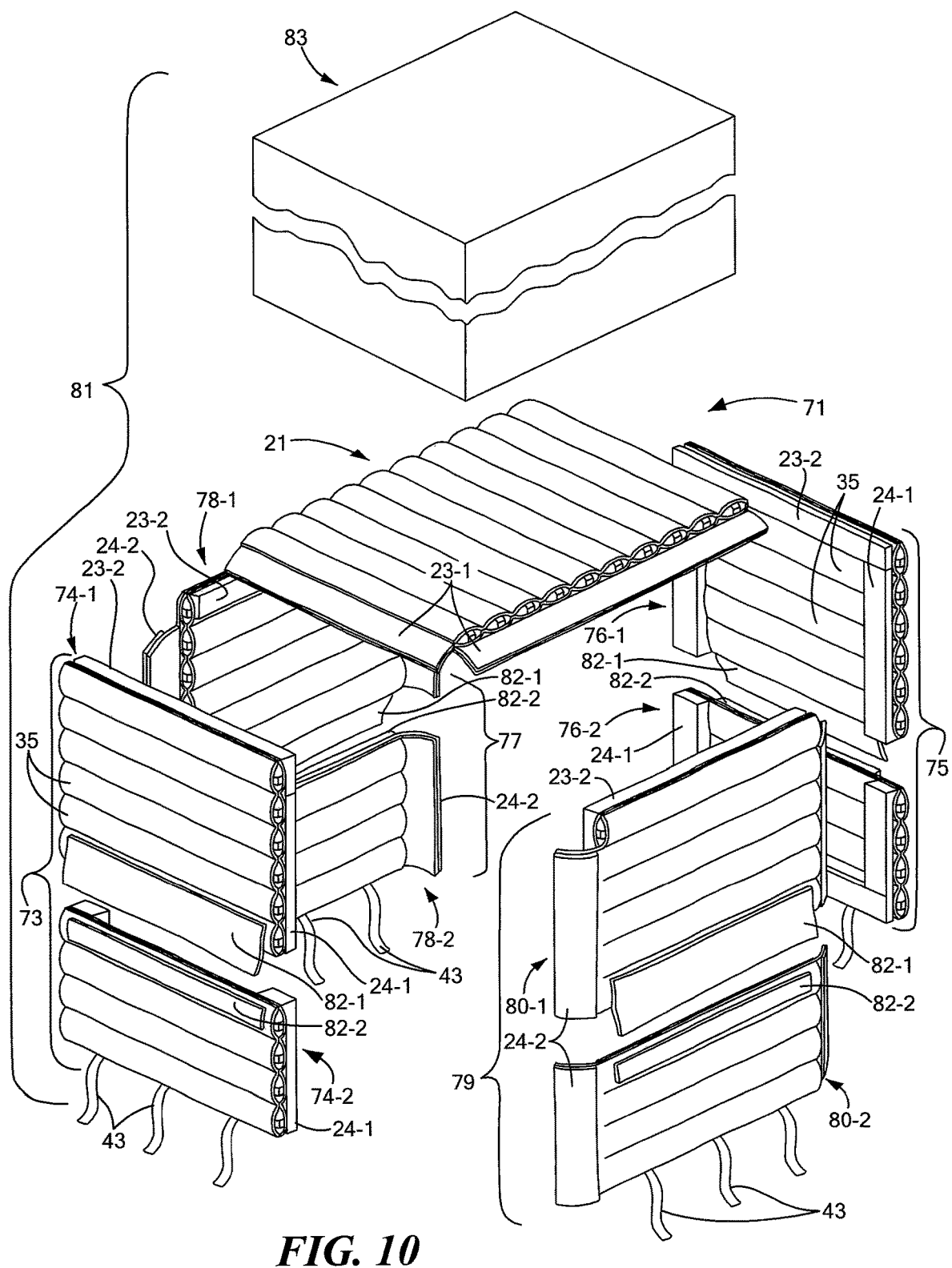
FIG. 10 is a partly exploded perspective view of a fourth embodiment of a pallet cover constructed according to the teachings of the present invention.

Referring now to FIG. 10, there is shown a perspective view of a fourth embodiment of a pallet cover constructed according to the teachings of the present invention, the pallet cover being represented generally by reference numeral 81.

Pallet cover 81 may be similar in many respects to pallet cover 71, the principal difference between the two pallet covers being that pallet cover 81 may comprise, in addition to pallet cover 71, a thermal insulation wrap 83 that may be removably inserted over pallet cover 71. Wrap 83, which may be shaped to cover the top, front, rear, left side and right side of pallet cover 71 while having an open bottom, may be a laminated structure and may comprise, for example, one or more layers of metalized plastic. An example of a suitable material for use as wrap 83 may include a laminate comprising a polyethylene terephthalate layer, a polypropylene layer, and an aluminum layer, such a laminate being commercially available from Trip & Co. (Nieuw-Vennep, The Netherlands) as GoodCape Extreme. Other suitable laminates may include combinations of polyethylene, aluminum and airbubble foil layers (e.g., GoodCape Standard, Trip & Co.) and combinations of aluminum, nonwoven, and polypropylene layers (e.g., GoodCape Light, Trip & Co.).

Thermal insulation wrap 83 may also be used in combination with pallet cover 11, pallet cover 53 and any of the variations thereto discussed herein.

As noted above, it may be desirable in certain situations to have a non-uniform distribution of phase-change material along one or more faces of the payload. In particular, it may be desirable to have greater quantities of phase-change material along the edges of each face of the payload since these areas are often the most vulnerable to temperature excursions. One example of such an approach is discussed below.

Figure 11:
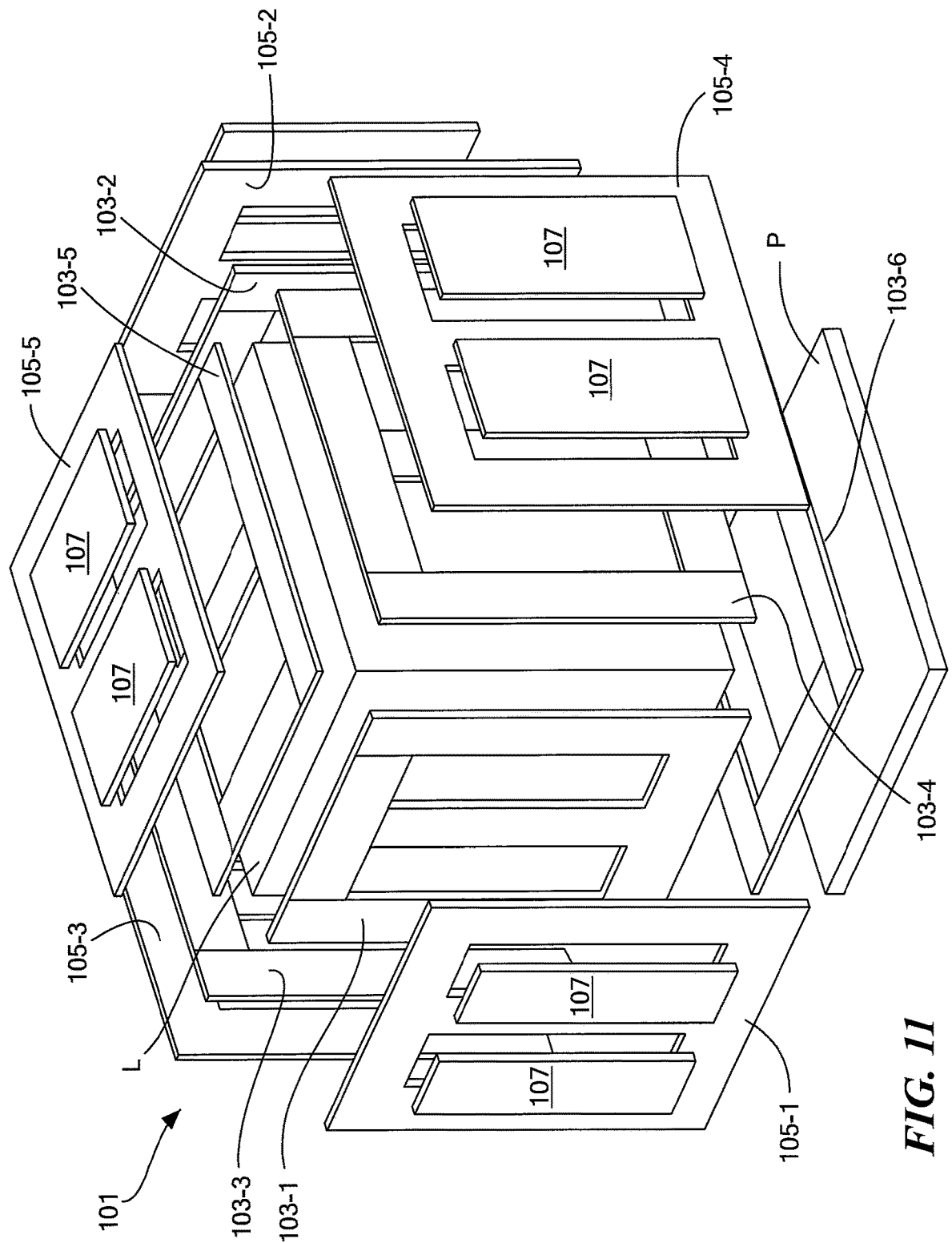
FIG. 11 is a partly exploded perspective view of a fifth embodiment of a pallet cover constructed according to the teachings of the present invention, the fabric sheets of the pallet cover not being shown to reveal the internal components of the pallet cover, the pallet cover being shown in combination with a payload on a pallet.

Referring now to FIG. 11, there is shown a partly exploded perspective view of a fifth embodiment of a pallet cover constructed according to the teachings of the present invention, the pallet cover being represented generally by reference numeral 101. It should be noted that, in FIG. 11, the sheets (typically of fabric) of pallet cover 101 are not shown in order to reveal certain internal components of pallet cover 101. It should also be noted that pallet cover 101 is shown in FIG. 11 in combination with a payload L, such as a 40 inch by 48 inch payload, on a pallet P.

Pallet cover 101 may comprise a plurality of temperature-control assemblies 103-1 through 103-5 that may be positioned along the front, rear, left side, right side, and top surfaces, respectively, of the payload L. Each of temperature-control assemblies 103-1 through 103-5 may comprise a plurality of temperature-control members, each of which may be generally similar in structure to temperature-control member 37. A plurality of temperature-control members of each of assemblies 103-1 through 103-5 may be arranged to form a bifurcated windowpane structure that may be aligned generally with the top, left side, right side and bottom edges of its respective payload surface, with an additional temperature-control member extending from the top temperature-control member to the bottom temperature-control member at their respective midpoints. The above-described construction of assemblies 103-1 through 103-5 provides optimal protection to the areas of payload L most vulnerable to temperature excursions.

Pallet cover 101 may additionally comprise a temperature-control assembly 103-6 to be positioned below payload L. Temperature-control assembly 103-6 may differ from temperature-control assembly 103-1 through 103-5 in that temperature-control assembly 103-6 may omit the temperature-control member that corresponds to the temperature-control member extending from the top temperature-control member to the bottom temperature-control member at their respective midpoints. Alternatively, temperature-control assembly 103-6 may include such a structure.

It is to be understood that each of temperature-control assemblies 103-1 through 103-6 may comprise, independently of one another, a single type of temperature-control member or may comprise a plurality of different types of temperature-control members that may vary from one another in phase-change material composition, quantity and/or dimensions.

Pallet cover 101 may further comprise a plurality of thermal insulation members 105-1 through 105-5. Insulation members 105-1 through 105-5, which may be made of bubblewrap or any other similarly suitable insulating material, may be aligned with and placed in contact with the outwardly-facing surfaces of temperature-control assemblies 103-1 through 103-5, respectively.

Pallet cover 101 may further comprise a plurality of thermal insulation members 107. Insulation members 107, which may be made of a flexible polyurethane foam, may be positioned in the spaces within temperature-control assemblies 103 and insulation members 105. Preferably, the combined thickness of each set of temperature-control assembly 103 and insulation member 105 is approximately equal to the thickness of insulation members 107.

Without wishing to be limited to any particular dimensions, the temperature-control members used to form temperature-control assemblies 103-1 through 103-5 may be approximately 7 inches wide and approximately ½ inch thick, insulation members 105-1 through 105-5 may be approximately ½ inch thick, and insulation members 107 may be approximately 1 inch thick.

In another embodiment (not shown), insulation members 105-1 through 105-5 of pallet cover 101 may be replaced with additional temperature-control assemblies that may be the same as or different from temperature-control assemblies 103-1 through 103-5. Moreover, in such an alternative embodiment, the two layers of temperature-control assemblies may not have a windowpane configuration, but rather, may simply be a solid rectangular shape, and insulating members 107 may be omitted.

In yet another embodiment (not shown), pallet cover 101 may include a sixth thermal insulation member, which may be configured like insulation members 105-1 through 105-5. Said sixth thermal insulation member may be positioned below or in place of temperature-control assembly 103-6. In addition, said embodiment may further include a pair of insulating members 107 positioned within said sixth thermal insulation member.

It is to be understood that thermal insulation wrap 83 could also be removably inserted over pallet cover 101 or the variations thereto discussed herein.

Figure 12:
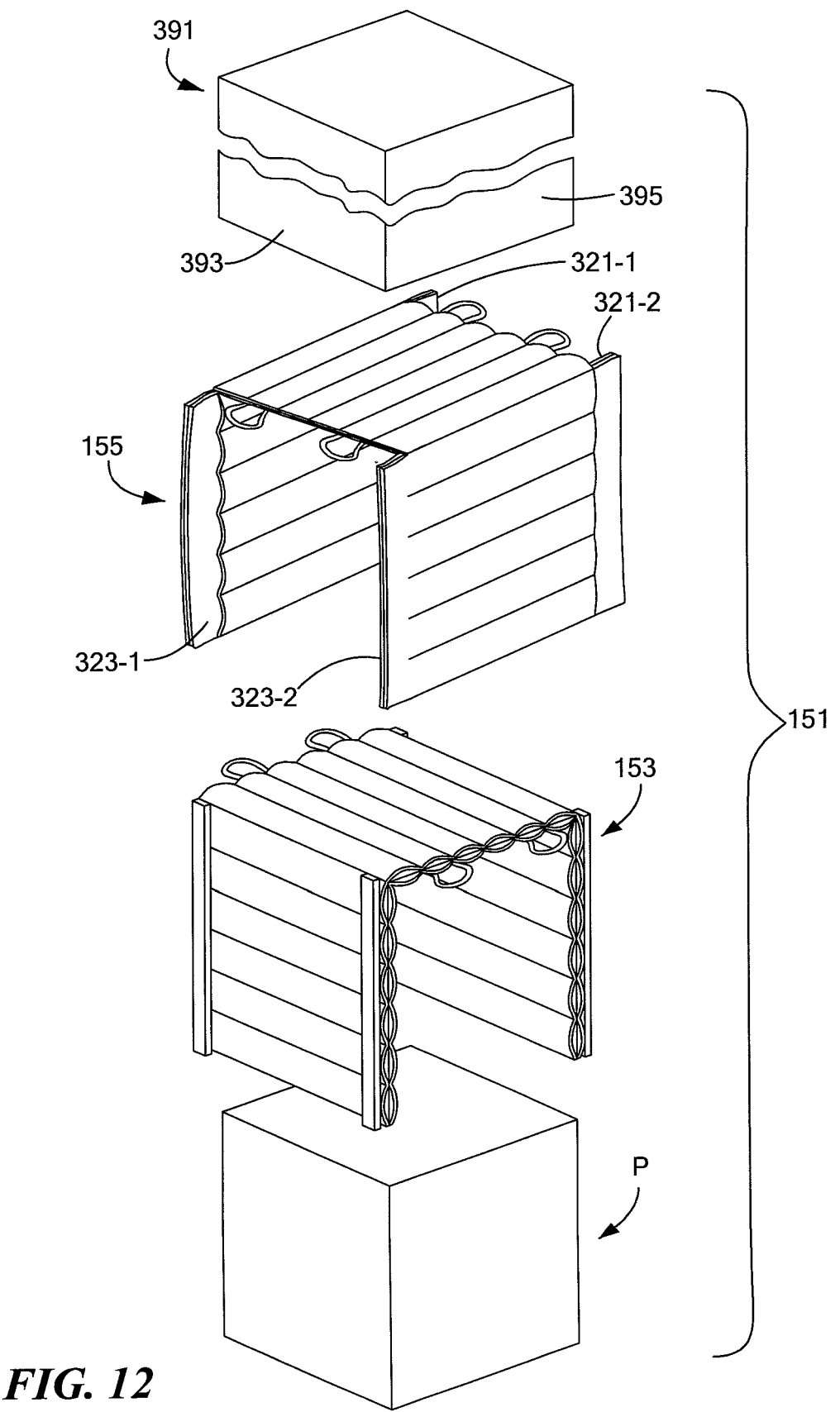
FIG. 12 is a partly exploded perspective view of a sixth embodiment of a pallet cover constructed according to the teachings of the present invention.
Figure 13A:
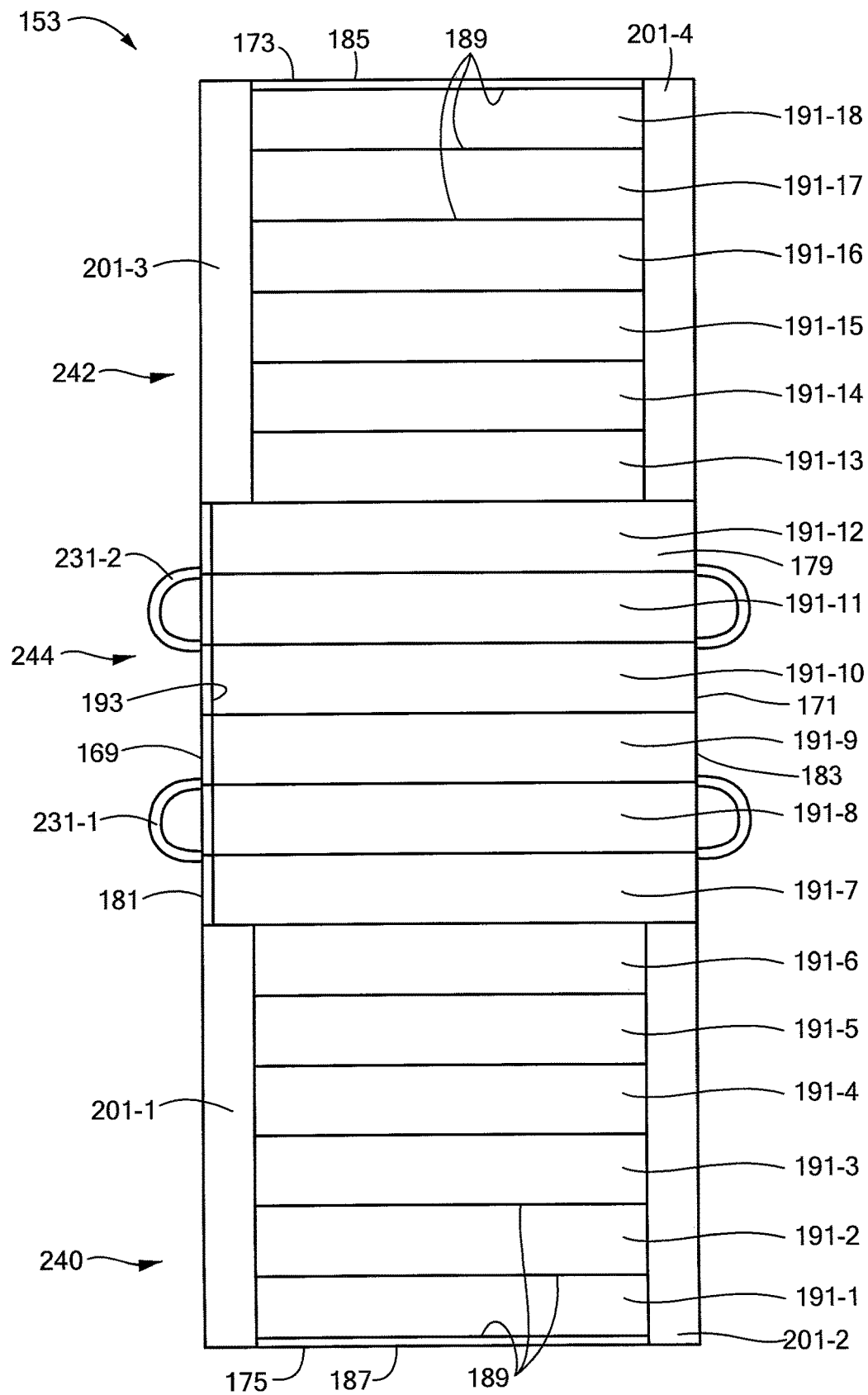
FIGS. 13(*a*) through 13(*e*) are enlarged top, enlarged bottom, partly exploded perspective, partly exploded side, and partly exploded end views, respectively, of the first assembly of FIG. 12, wherein FIGS. 13(*a*) and 13(*b*) show the first assembly in an unfolded state and wherein FIGS. 13(*c*) through 13(*e*) show various components of the first assembly prior to their assembly.
Figure 13B:
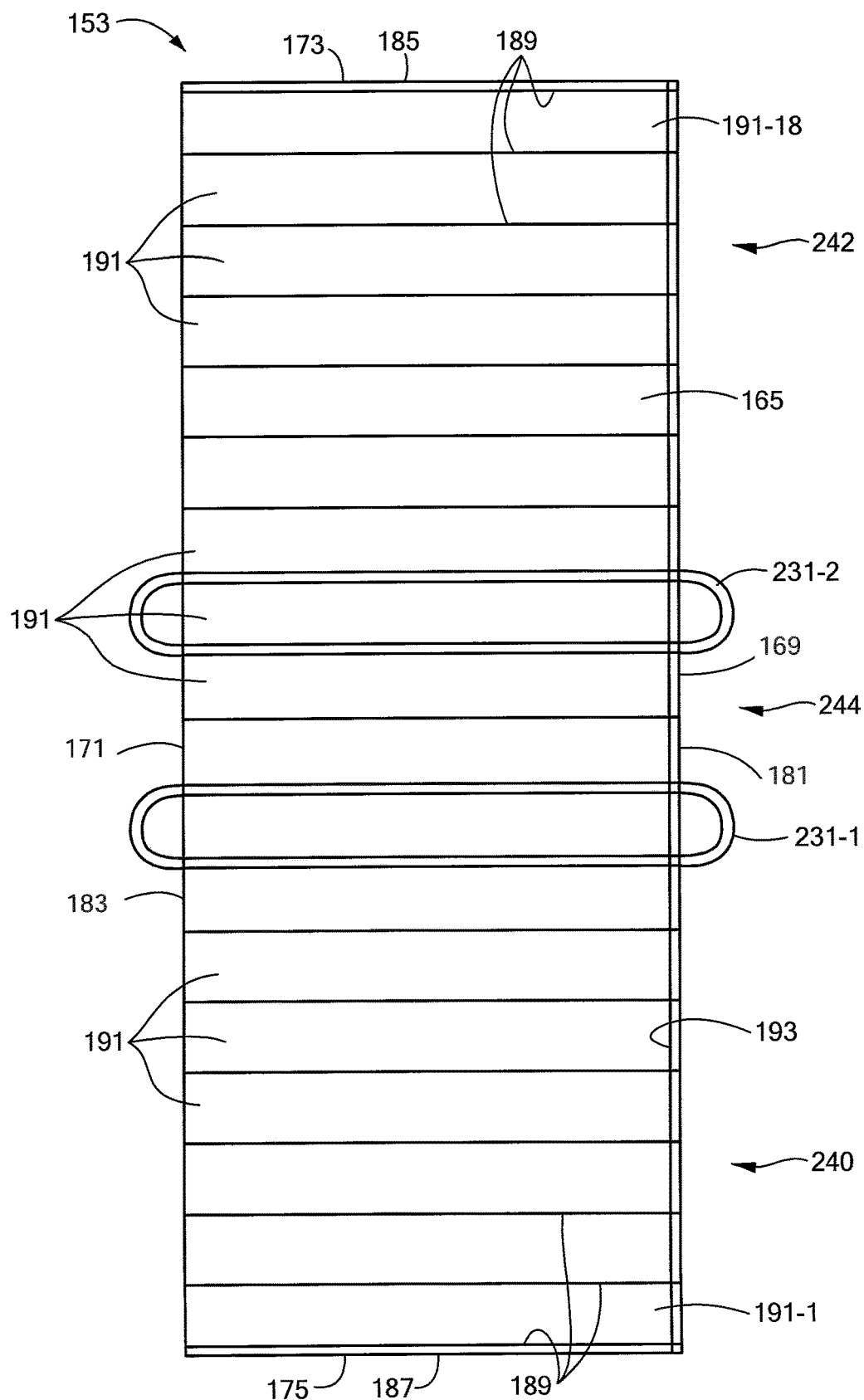
Figure 13C:
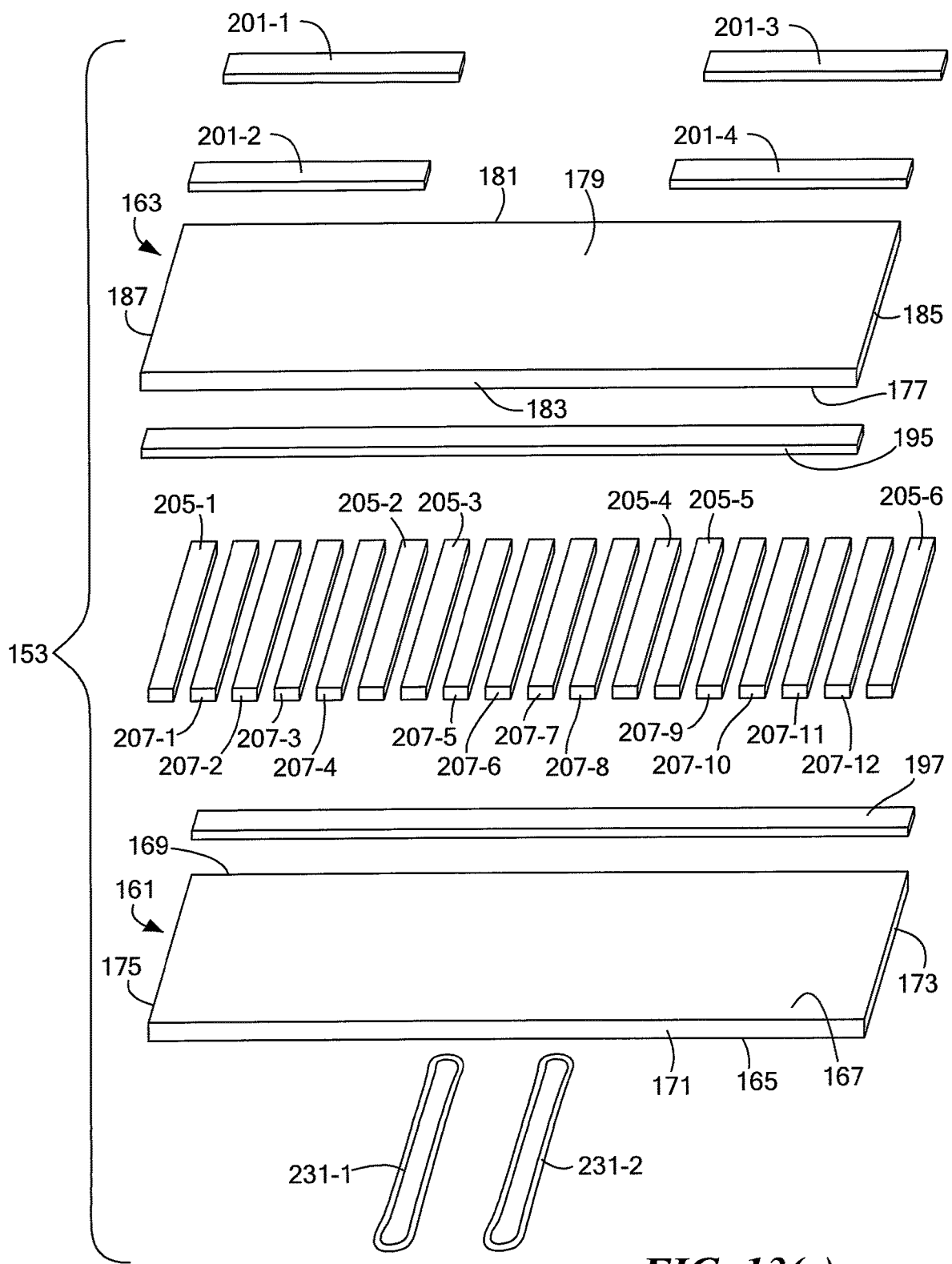
Figure 13D:
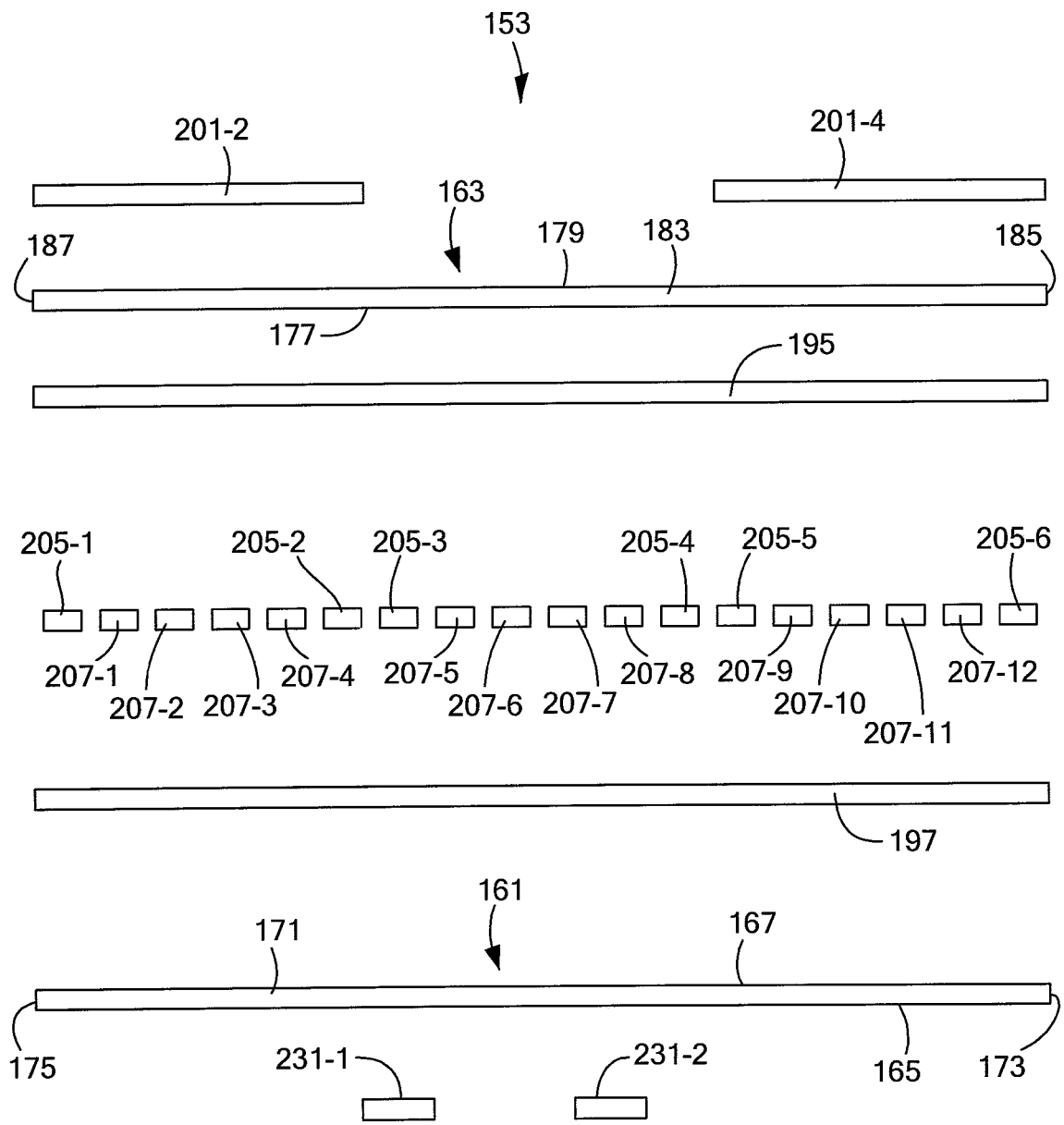
Figure 13E:
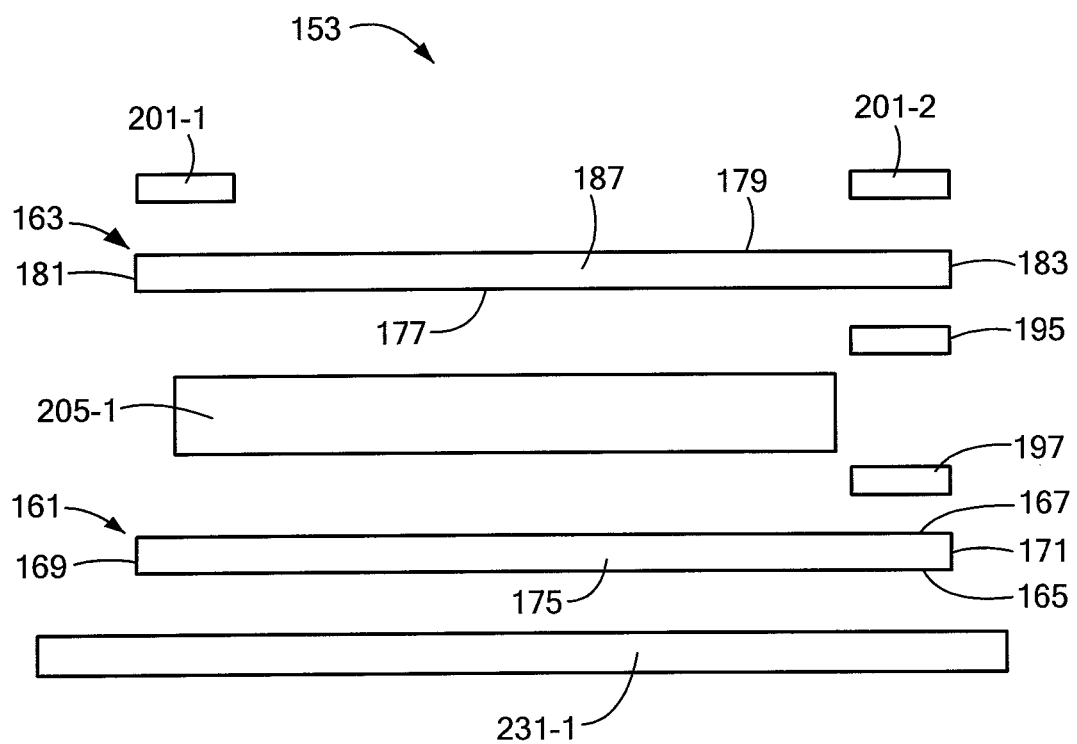

Referring now to FIG. 12, there is shown a partly exploded perspective view of a sixth embodiment of a pallet cover constructed according to the teachings of the present invention, the pallet cover being represented generally by reference numeral 151. (Certain features of pallet cover 151 not critical to the invention may not be shown in FIG. 12 or may be shown therein in a simplified manner.) Pallet cover 151 is shown in FIG. 12 in combination with a payload P, which may be, for example, a 48 inch (long)×40 inch (wide)×45 inch payload (high).

Pallet cover 151 may comprise a first assembly 153 and a second assembly 155. First assembly 153, which is also shown separately in FIGS. 13(*a*) through 13(*e*), may comprise an inner (i.e., proximate to the payload) sheet 161 and an outer (i.e., distal to the payload) sheet 163. Inner sheet 161 and outer sheet 163, which may be similar in material composition to sheets 25 and 27 of pallet cover 11, may be generally rectangular sheets of substantially matching dimensions. Sheet 161 may include an inner face 165, an outer face 167, a first long side 169, a second long side 171, a first short side 173, and a second short side 175. Sheet 163 may include an inner face 177, an outer face 179, a first long side 181, a second long side 183, a first short side 185, and a second short side 187. Sheets 161 and 163, which may be arranged with their respective long and short sides in alignment with one another, may be joined to one another, for example, using stitching or another suitable technique, to define a plurality of seams. For example, sheets 161 and 163 may be stitched together in such a way as to define a plurality of lateral seams 189 that may extend from sides 169 and 181 of sheets 161 and 163, respectively, to sides 171 and 183 of sheets 161 and 163, respectively (or that may extend nearly the entirety of said distance). One of lateral seams 189 may be positioned parallel to and proximate to sides 173 and 185 of sheets 161 and 163, respectively, another of lateral seams 189 may be positioned parallel to and proximate to sides 175 and 187 of sheets 161 and 163, respectively, and the remainder of lateral seams 189 may be evenly spaced therebetween and parallel to one another. In this manner, lateral seams 189 may help to define a plurality of pockets 191 of substantially equal size that may be parallel to one another and that may extend laterally between the respective long sides of sheets 161 and 163.

In addition to being joined together along lateral seams 189, sheets 161 and 163 may also be joined to one another, by stitching or another suitable technique, to define a longitudinal seam 193. Longitudinal seam 193 may extend from sides 173 and 185 of sheets 161 and 163, respectively, to sides 175 and 187 of sheets 161 and 163, respectively, or may extend nearly the entirety of said distance, and may be positioned proximate to sides 169 and 181 of sheets 161 and 163, respectively. In this manner, the end of each pocket 191 proximate to sides 169 and 181 of sheets 161 and 163, respectively, may be permanently closed by longitudinal seam 193.

First assembly 153 may further comprise a releasable fastening mechanism to enable the reversible opening and closing of the end of each pocket 191 that is proximate to sides 171 and 183 of sheets 161 and 163, respectively. Such a releasable fastening mechanism may comprise, for example, strips of complementary hook and loop fasteners. For example, a narrow strip of hook fasteners 195 may be stitched or otherwise secured to the inner face 177 of outer sheet 163 substantially flush with side 183, said strip of hook fasteners 195 extending substantially the entire distance between sides 185 and 187. In addition, a narrow strip of loop fasteners 197 may be stitched or otherwise secured to the outer face 167 of inner sheet 161 substantially flush with side 171, said strip of loop fasteners 197 extending substantially the entire distance between sides 173 and 175 and being appropriately positioned for engagement with said strip of hook fasteners 195. If desired, lateral seams 189 may extend through strips of hook fasteners 195 and loop fasteners 197, thereby permanently joining together portions of the strips of hook fasteners 195 and loop fasteners 197 between sheets 161 and 163. To facilitate the detaching of hook fasteners 195 from loop fasteners 197 in the areas defining the selectively openable/closable ends of pockets 191, one or more fabric tabs (not shown) may be sewn over one or more small portions of hook fasteners 195 and/or loop fasteners 197.

To summarize, sheets 161 and 163 may be joined together to define a plurality of parallel, laterally-extending pockets 191, each of said pockets 191 having a permanently closed end and an open end. The open ends may be reversibly opened and closed with complementary hook and loop fasteners 195 and 197. In the present embodiment, sheets 161 and 163 may be dimensioned and seams 189 and 193 may be positioned so as to define 18 substantially equally-sized, laterally-extending, parallel pockets 191 (which pockets may be individually identified in certain figures or discussed herein as pockets 191-1 through 191-18), each of pockets 191 having a width of approximately 7.5 inches and a length of approximately 39.5 inches. (It is to be understood that the number of pockets 191 and the dimensions thereof are merely illustrative and that variations in the number and/or dimensions of pockets 191 may be made while still coming within the scope of the present invention.)

It is to be understood that, although, in the present embodiment, sheets 161 and 163 are fabricated as two separate pieces, sheets 161 and 163 could be fabricated as a unitary (i.e., one-piece) structure that may be folded or otherwise divided into two sections and thereafter stitched or otherwise secured to one another in substantially the manner described above.

First assembly 153 may further comprise a mechanism for use in detachably coupling first assembly 153 to second assembly 155. For example, such a mechanism may comprise complementary hook and loop fasteners. More specifically, in the present embodiment, first assembly 153 may comprise hook fasteners, and second assembly 155 may comprise complementary loop fasteners. Such hook fasteners may comprise strips of hook fasteners 201-1 through 201-4, which may be stitched or otherwise secured to the outer face 179 of sheet 163. For example, hook fastener strip 201-1 may be positioned substantially flush with side 181 and may extend over portions of pockets 191-1 through pocket 191-6, hook fastener strip 201-2 may be positioned substantially flush with side 183 and may extend over portions of pockets 191-1 through 191-6, hook fastener strip 201-3 may be positioned substantially flush with side 181 and may extend over portions of pockets 191-13 through 191-18, and hook fastener strip 201-4 may be positioned substantially flush with side 183 and may extend over portions of pockets 191-13 through 191-18.

Figure 14A:
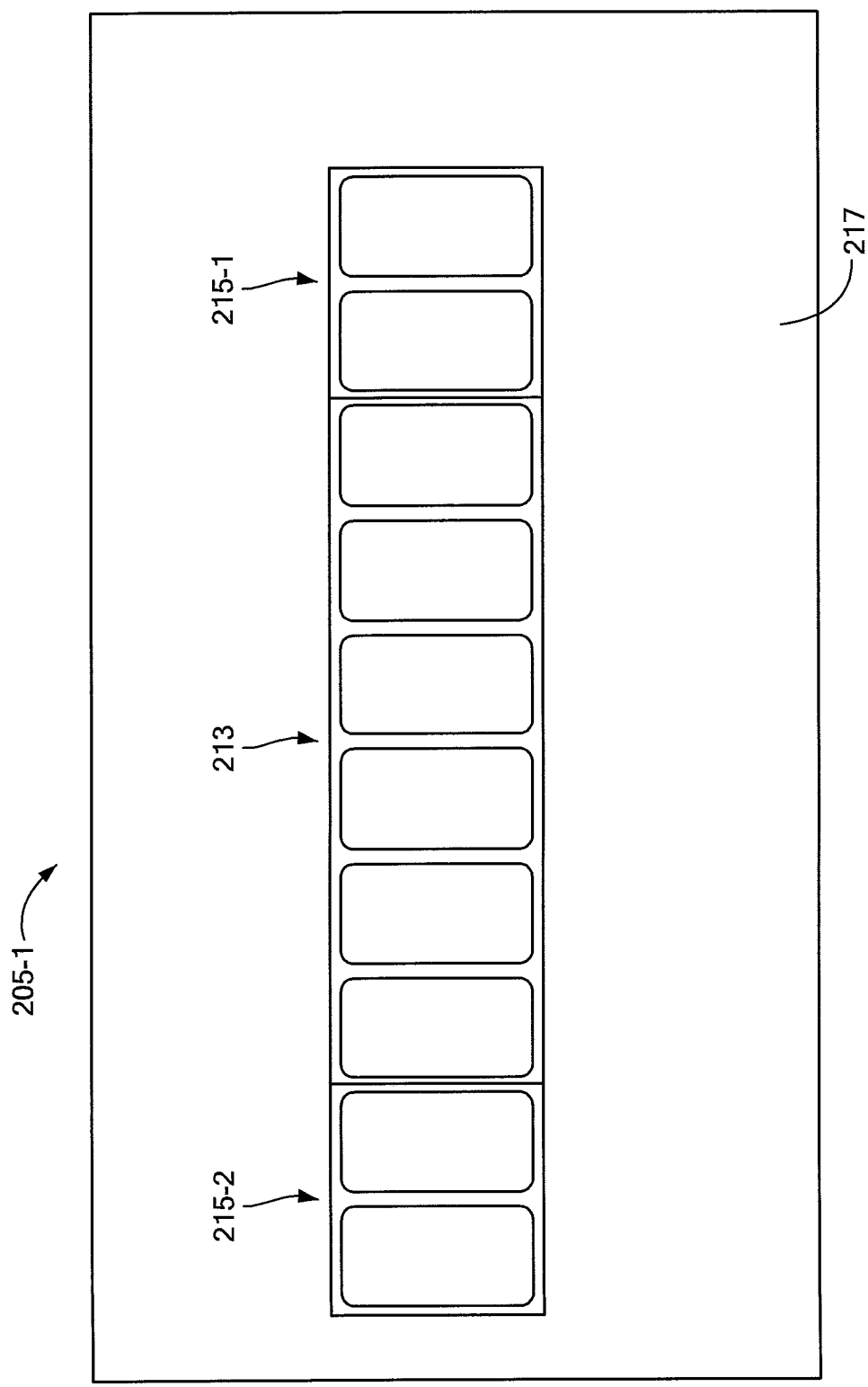
FIGS. 14(*a*) and 14(*b*) are enlarged partly exploded top and side views, respectively, of one of the first plurality of temperature-control members shown in FIG. 13(*c*)
Figure 14B:
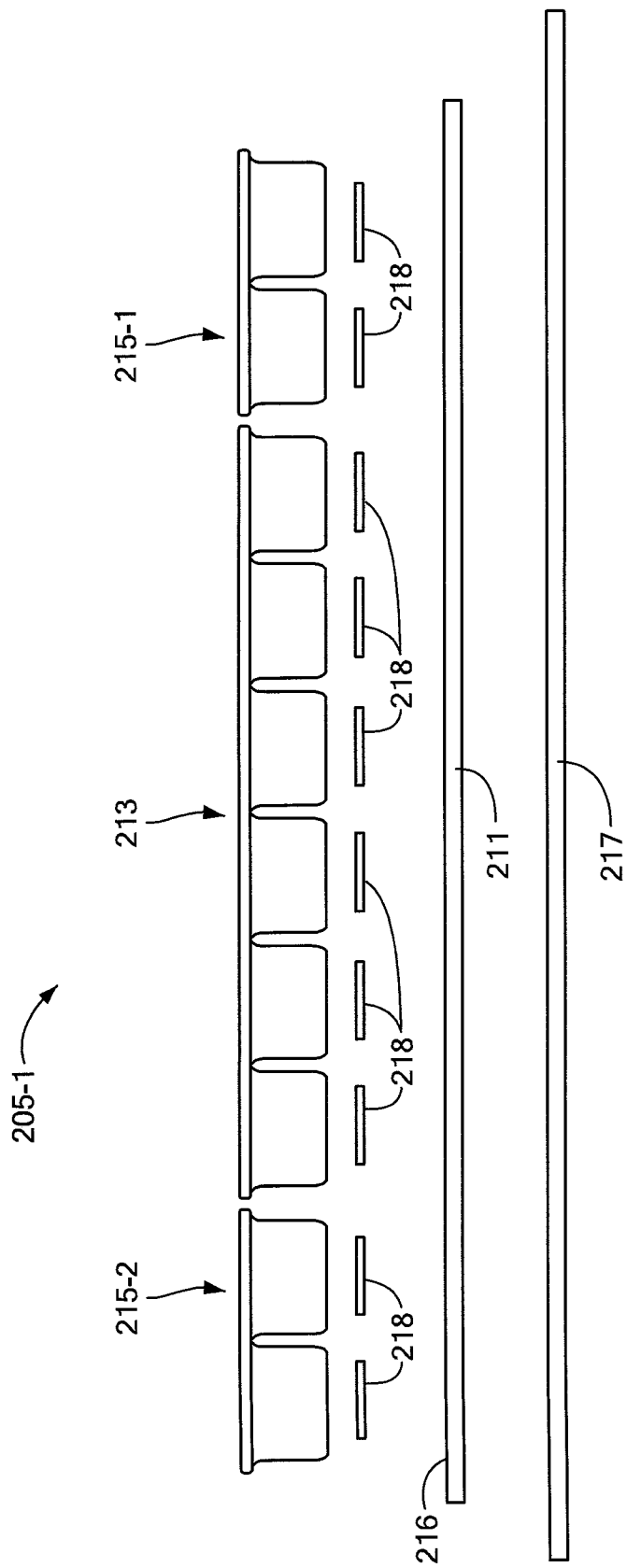

First assembly 153 may further comprise a first plurality of temperature-control members 205-1 through 205-6 and a second plurality of temperature-control members 207-1 through 207-12. Members 205-1 through 205-6 may be identical to one another (but need not be), and a representative such member, namely, member 205-1, is shown separately in FIGS. 14(a) and 14(b). As can be seen best in FIGS. 14(a) and 14(b), member 205-1 may comprise a support 211, one 6-pouch PCM-mat 213, two 2-pouch PCM-mats 215-1 and 215-2, and a sheet of wrapping material 217. Support 211, which may be used to provide structural reinforcement to member 205-1, may be made of a lightweight but rigid material. An example of a suitable material for use as support 211 may include corrugated cardboard. Support 211 may be fashioned as a unitary (i.e., one-piece) structure and may be dimensioned to extend nearly the full length and width of a pocket 191.

PCM-mat 213 and PCM-mats 215-1 and 215-2 may be similar in structure and composition to one another and to temperature-control member 37 (but need not be), the only difference being in the number of pouches of the respective mats. PCM-mat 213, which may have a width similar to that of support 211, may be centered along the length of support 211 and may be secured to a top surface 216 of support 211 with double-sided tape 218. PCM-mats 215-1 and 215-2, each of which may have a width similar to that of support 211, may be positioned at opposite ends of PCM-mat 213 and may be secured to top surface 216 of support 211 with double-sided tape 218. Collectively PCM-mats 213, 215-1 and 215-2 may approximate the length of support 211. (In the present embodiment, PCM-mats 213, 215-1 and 215-2 may have a collective length that is slightly greater than support 211, but said mats may be mounted on support 211 in a slightly overlapping manner to approximate the length of support 211.) It is to be understood that, although PCM-mats 213, 215-1 and 215-2 may be constructed as three separate mats in the present embodiment, such mats could be constructed as a single continuous mat. As can be appreciated, any of the phase-change materials discussed in this patent application may be used in any of PCM-mats 213, 215-1 and 215-2. Moreover, one or more of PCM-mats 213, 215-1 and 215-2 may be replaced with conventional ice packs, conventional gel packs, conventional salt water packs, or other conventional refrigerant structures.

Wrapping material 217, which may be, for example, a sheet of shrink-wrap material, may be shrink-wrapped around mats 213, 215-1 and 215-2 and support 211 to help keep mats 213, 215-1 and 215-2 stationary on support 211.

Figure 15A:
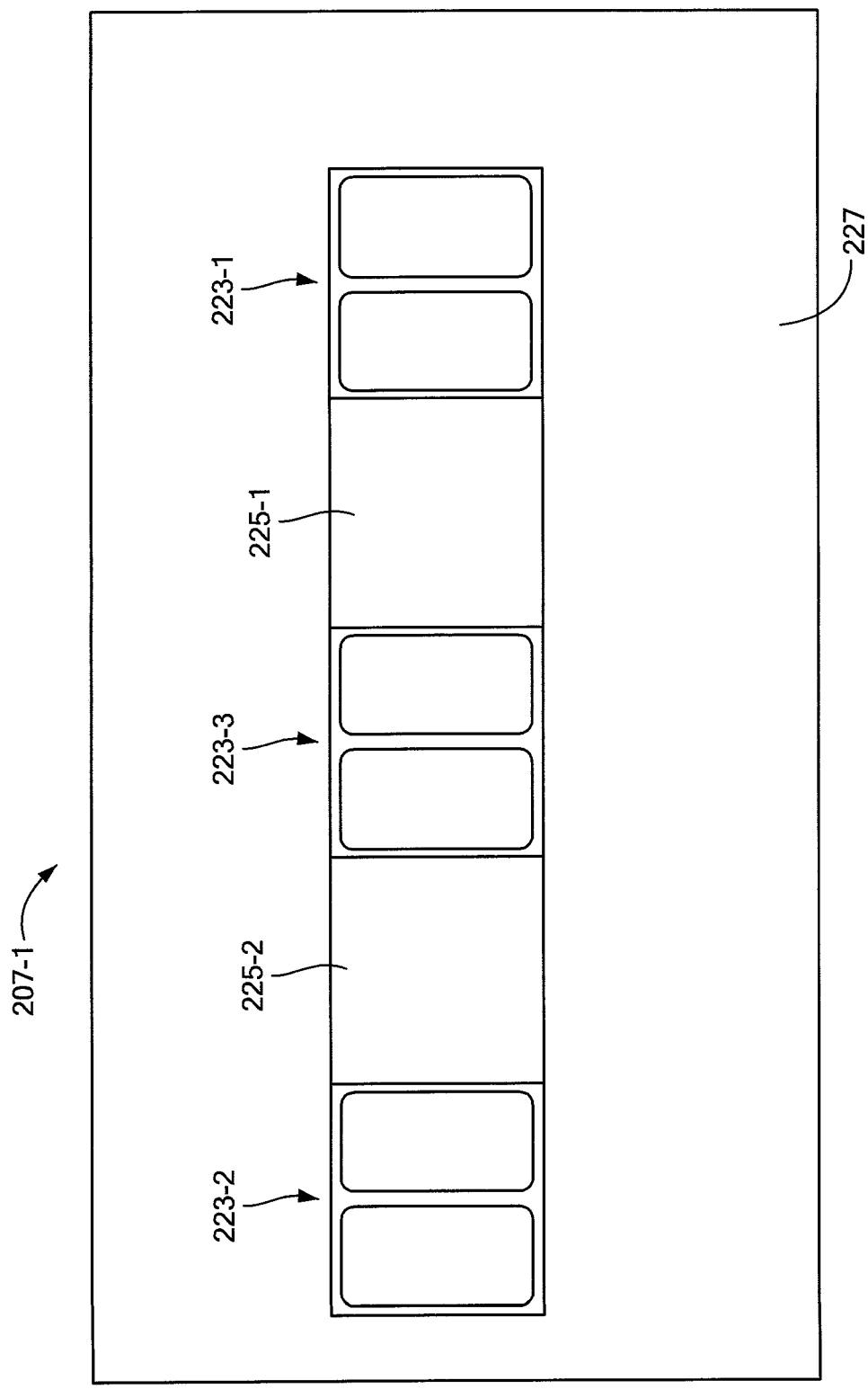
FIGS. 15(*a*) and 15(*b*) are enlarged partly exploded top and side views, respectively, of one of the second plurality of temperature-control members shown in FIG. 13(*c*)
Figure 15B:
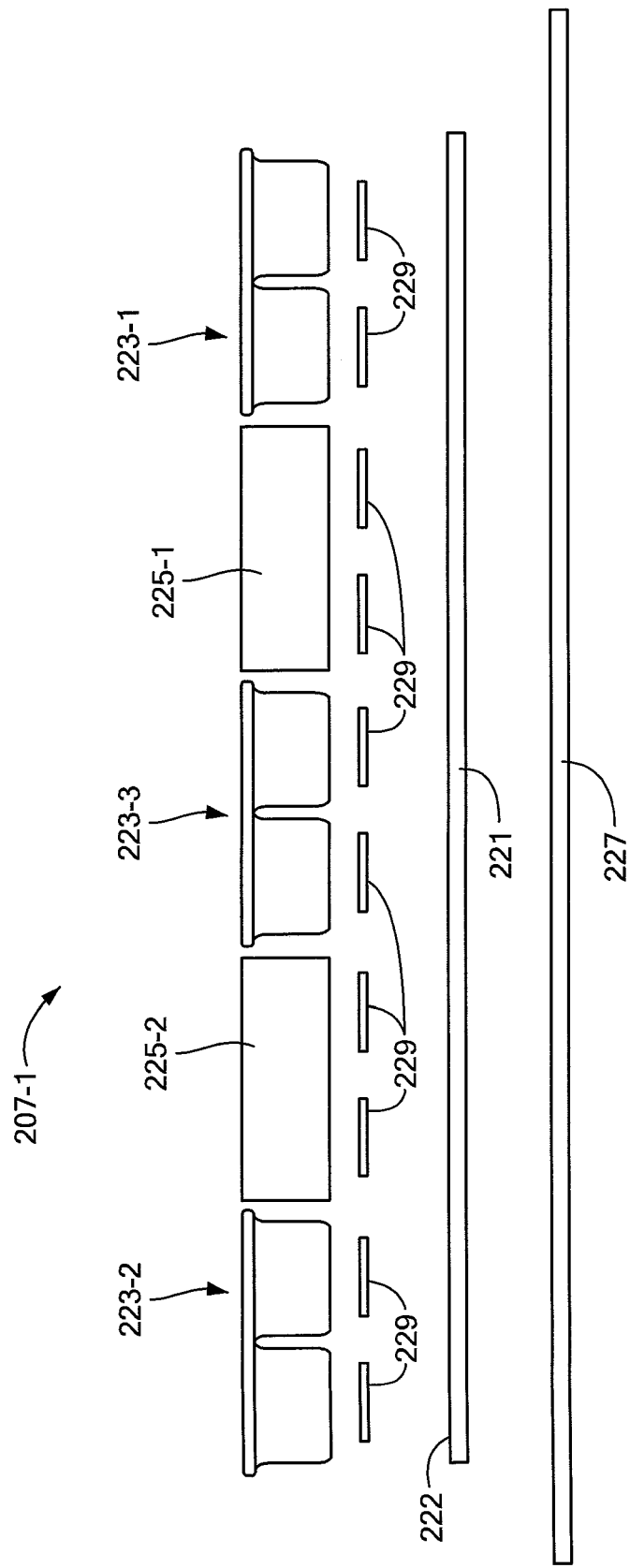
Figure 17A:
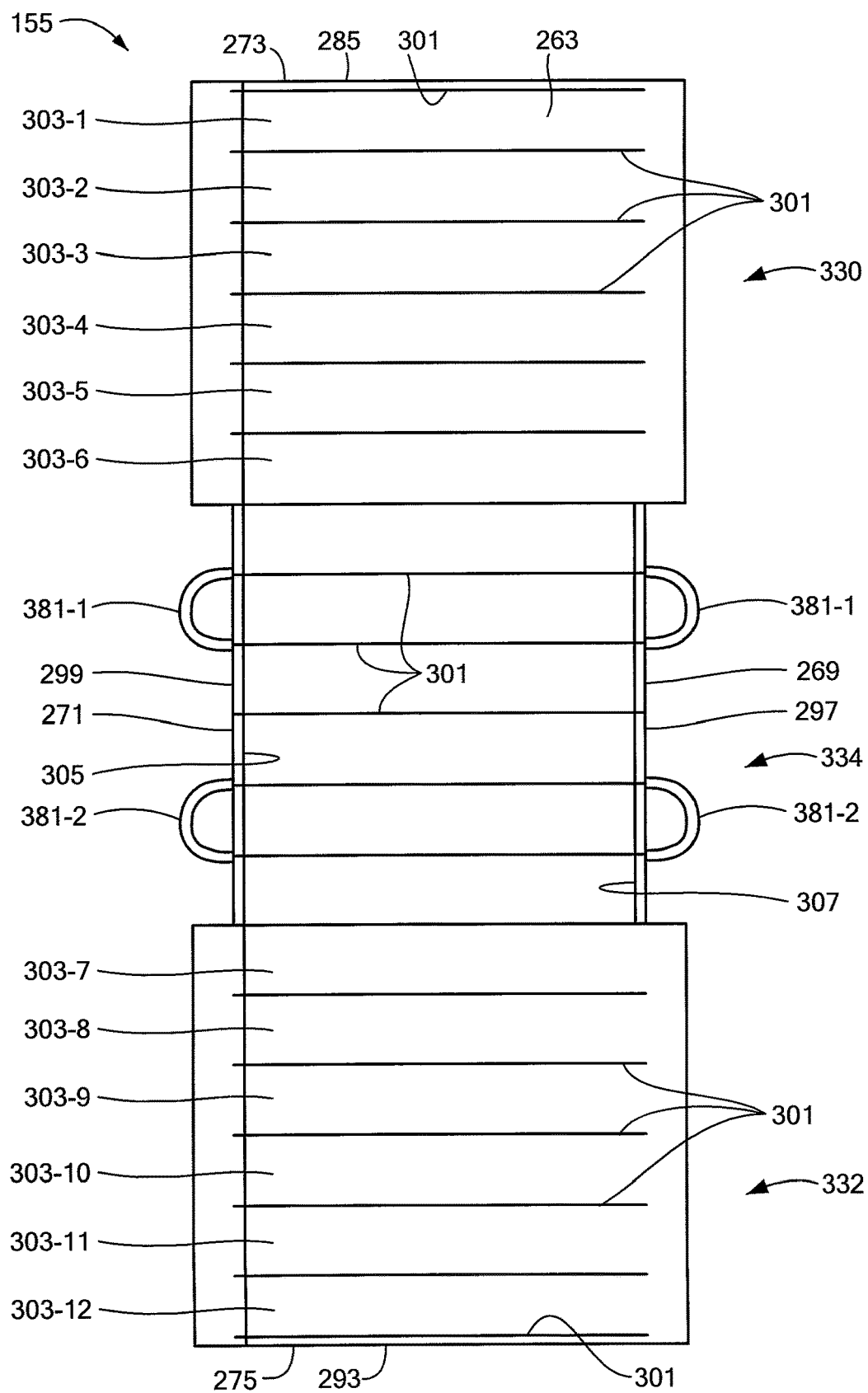
FIGS. 17(*a*) through 17(*e*) are enlarged top, enlarged bottom, partly exploded perspective, partly exploded side, and partly exploded end views, respectively, of the second assembly of FIG. 12, wherein FIGS. 17(*a*) and 17(*b*) show the second assembly in an unfolded state and wherein FIGS. 17(*c*) through 17(*e*) show various components of the second assembly prior to their assembly.
Figure 17B:
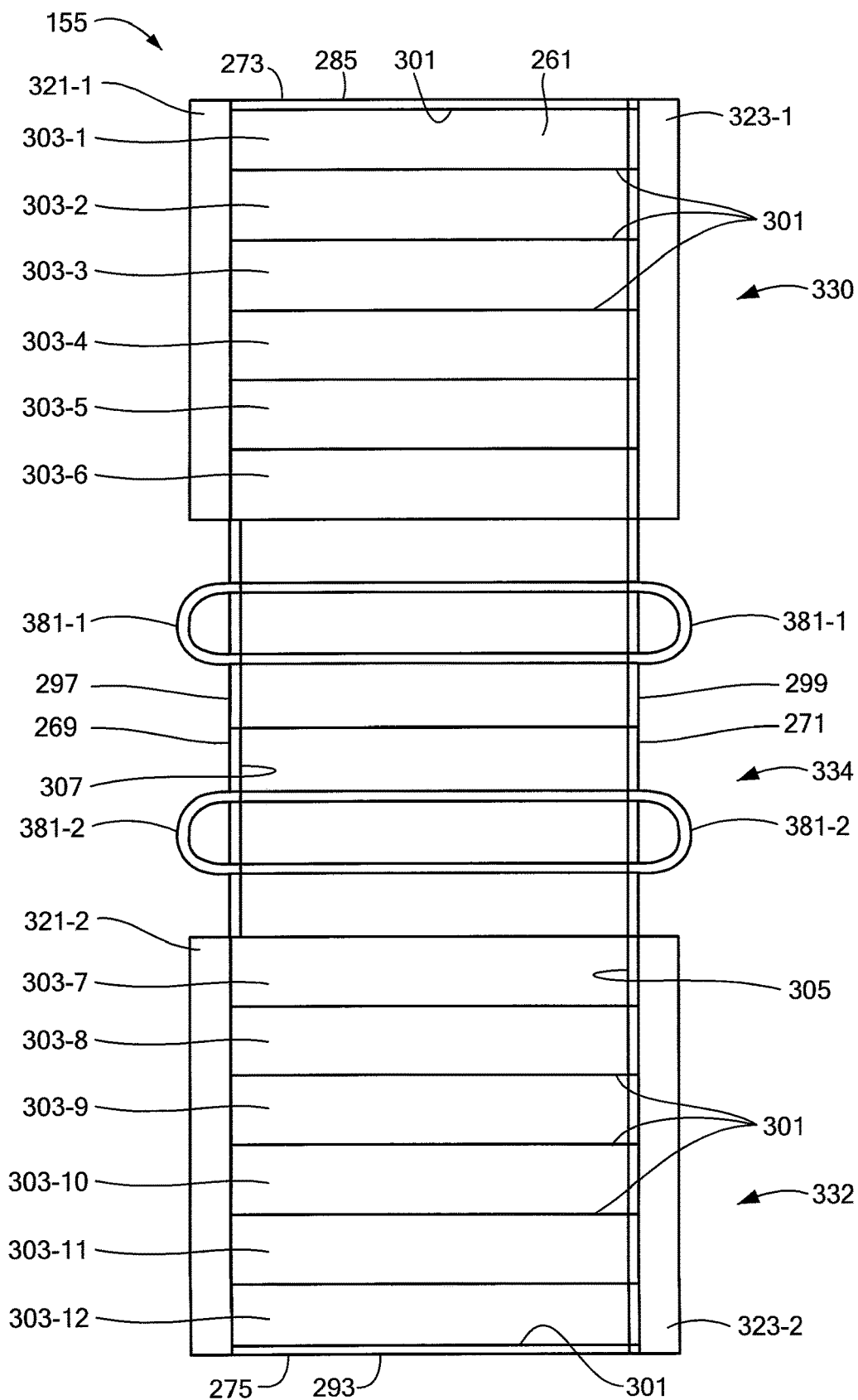
Figure 17C:
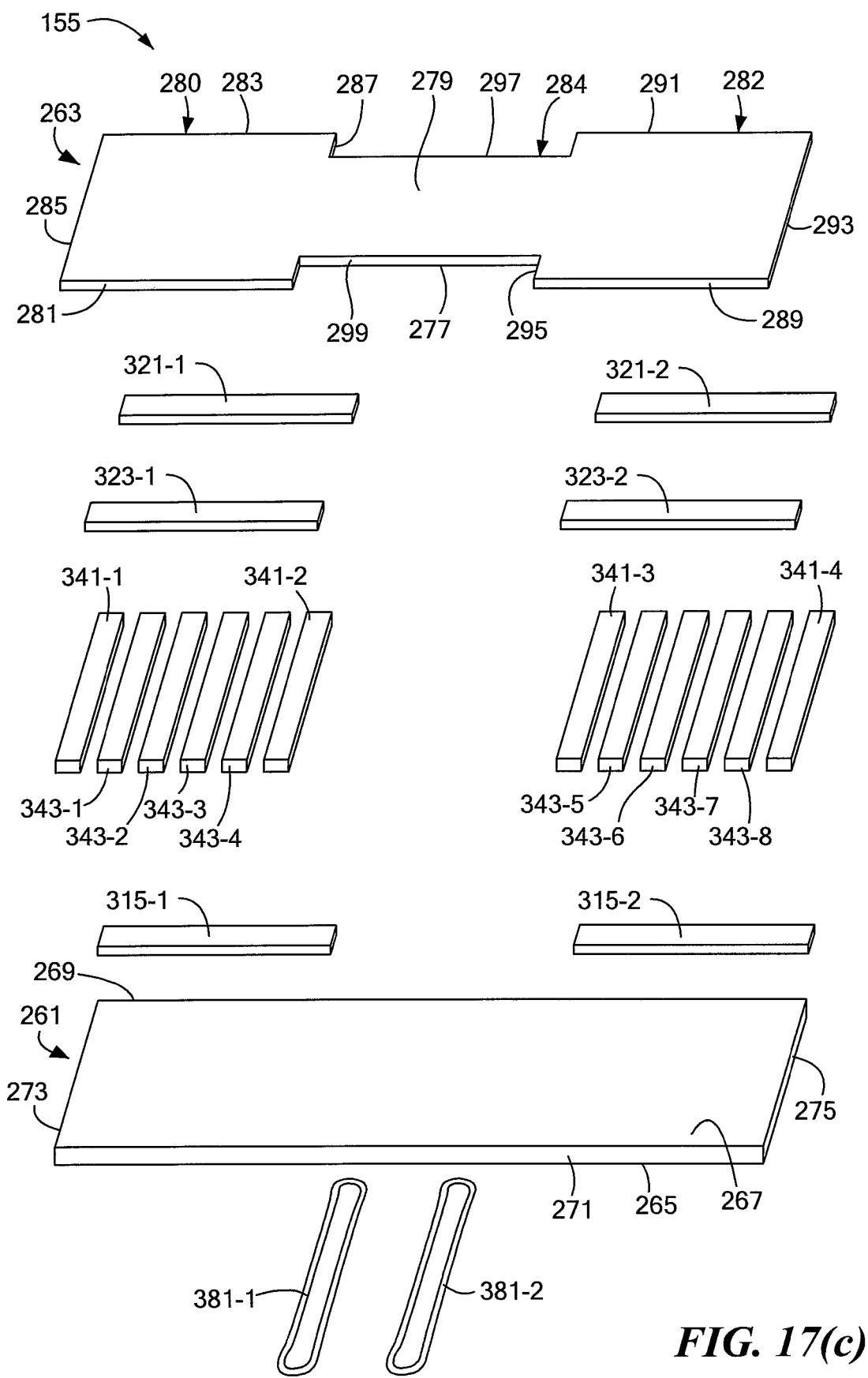
Figure 17D:
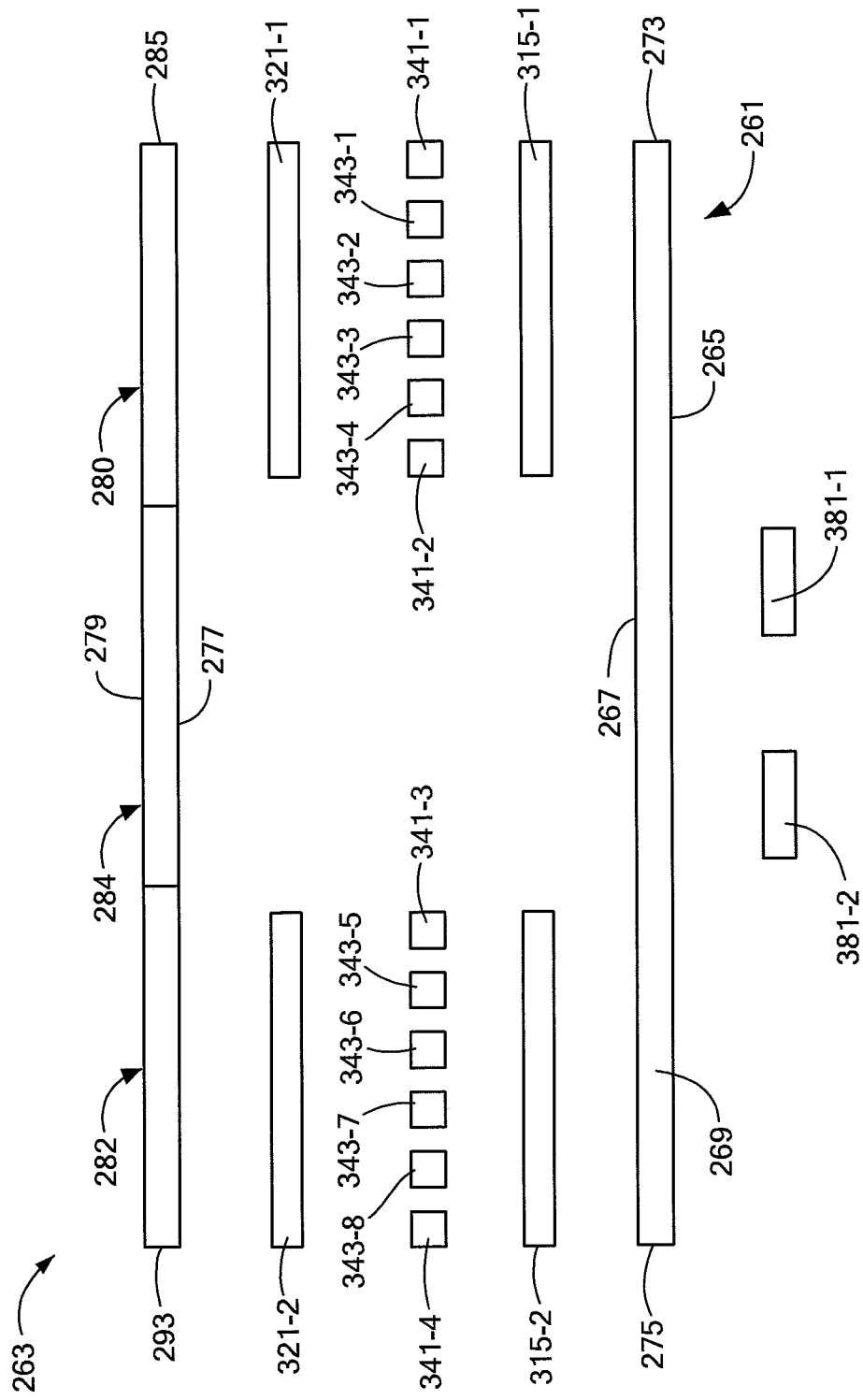
Figure 17E:
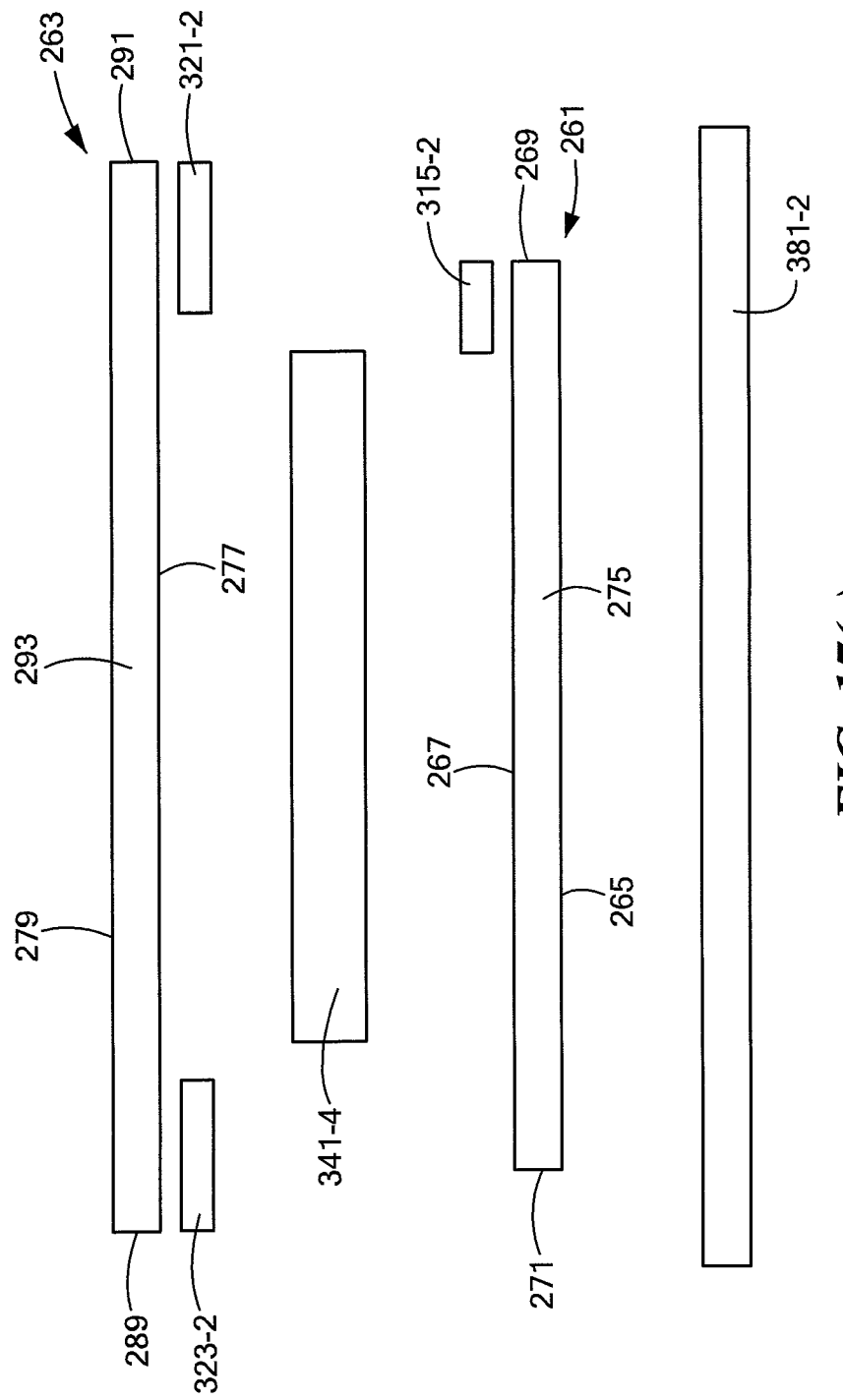

Members 207-1 through 207-12 may be identical to one another (but need not be), and a representative such member, namely, member 207-1, is shown separately in FIGS. 15(a) and 15(b). As can be seen best in FIGS. 15(a) and 15(b), member 207-1 may comprise a support 221, three 2-pouch PCM-mats 223-1, 223-2 and 223-3, two insulation members 225-1 and 225-2, and a sheet of wrapping material 227. Support 221 may be identical to support 211 of member 205-1 and may be similarly dimensioned to extend nearly the full length and width of a pocket 191. PCM-mats 223-1 through 223-3 may be identical to PCM-mats 215-1 and 215-2 of temperature-control member 205-1 (but need not be), with PCM-mat 223-1 being positioned on a top surface 222 of support 221 at one end thereof, PCM-mat 223-2 being positioned on top surface 222 of support 221 at the opposite end thereof, and PCM-mat 223-3 being positioned on top surface 222 of support 221 approximately equidistantly between PCM-mats 223-1 and 223-2. PCM-mats 223-1 through 223-3 may be securely mounted on top surface 222 of support 221 with strips of double-sided adhesive tape 229. Insulation members 225-1 and 225-2 may be identical to one another and may be made of a suitable thermal insulating material, such as a pad of an open-cell polyurethane foam. Insulation member 225-1 may be positioned on top surface 222 of support 221 and may be appropriately sized to substantially fill the space between PCM-mats 223-1 and 223-3, and insulation member 225-2 may be positioned on top surface 222 of support 221 and may be appropriately sized to substantially fill the space between PCM-mats 223-2 and 223-3. Insulation members 225-1 and 225-2 may be securely mounted on top surface 222 of support 221 with strips of double-sided adhesive tape 229. As can be appreciated, any of the phase-change materials discussed in this patent application may be used in any of PCM-mats 223-1, 223-2 and 223-3. Moreover, one or more of PCM-mats 223-1, 223-2, and 223-3 may be replaced with conventional ice packs, conventional gel packs, conventional salt water packs, or other conventional refrigerant structures.

Wrapping material 227, which may be identical to wrapping material 217 of temperature-control member 205-1, may be shrink-wrapped around mats 223-1, 223-2 and 223-3, insulation members 225-1 and 225-2, and support 211 to help keep mats 223-1, 223-2, 223-3 and insulation members 225-1 and 225-2 stationary on support 221.

Figure 16:
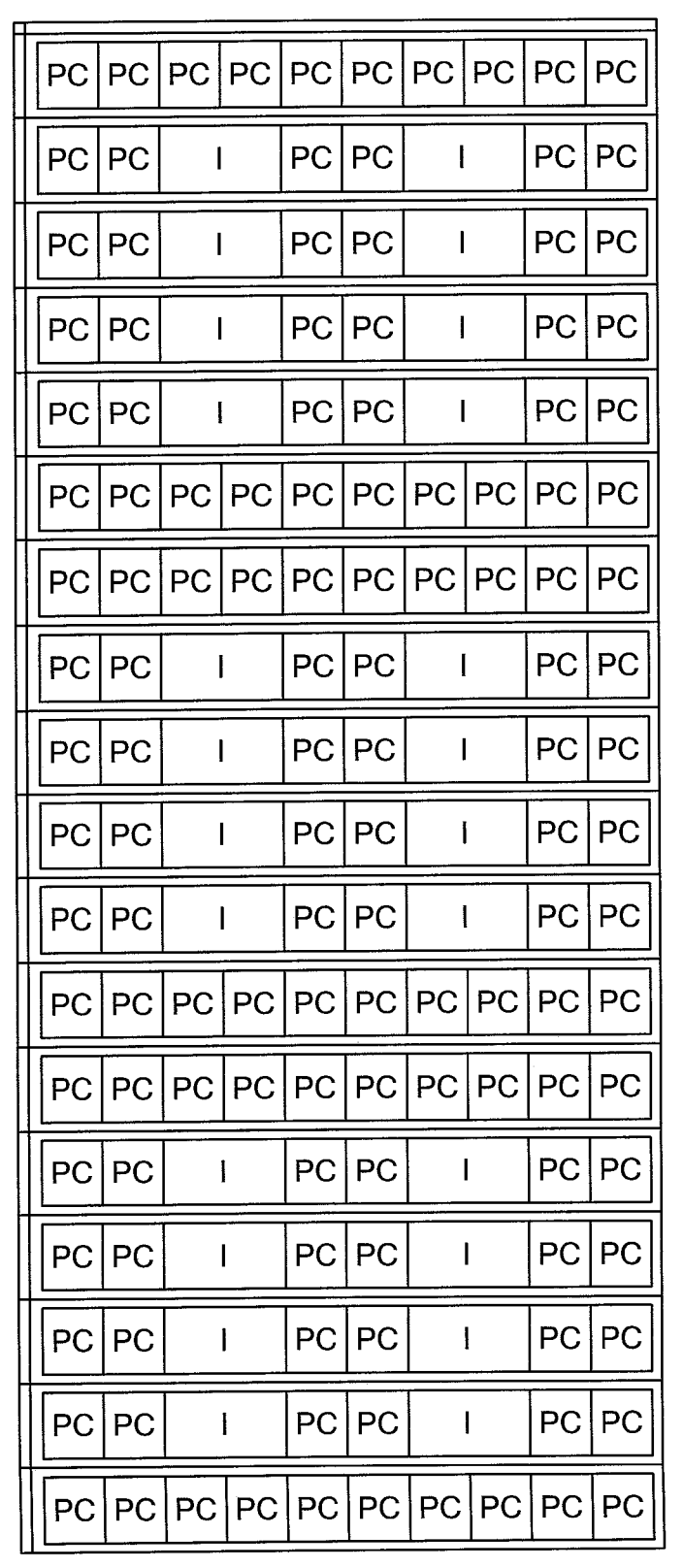

Members 205-1 through 205-6 may be removably loaded in pockets 191-1, 191-6, 191-7, 191-12, 191-13 and 191-18, respectively, and members 207-1 through 207-12 may be removably loaded in pockets 191-2, 191-3, 191-4, 191-5, 191-8, 191-9, 191-10, 191-11, 191-14, 191-15, 191-16 and 191-17, respectively. When loaded in this manner, members 205-1 through 205-6 and members 207-1 through 207-12 may form a pattern of phase-change material PC and insulation I that is schematically shown in FIG. 16. As will become apparent below, when first assembly 153 is in use on a payload, such a pattern resembles a bisected windowpane on the top and two opposing sides of a payload. Such an arrangement places phase-change material predominantly in the peripheral areas of the payload, where thermal protection is needed most, while minimizing the weight and cost of the assembly. In the present embodiment, the same type and quantity of phase-change material is used for each location of phase-change material PC (and the phase-change material may be a gelled phase-change material of the type described above—but need not be); however, it should be understood that the type and/or quantity of phase-change material need not be the same for each location of phase-change material PC. For example, phase-change materials having different phase-change temperatures may be positioned at different locations of phase-change material PC. Moreover, it should be understood that other patterns of phase-change material may be used, such as, but not limited to, the replacement of some or all insulation with phase-change material or vice versa.

First assembly 153 may further comprise a pair of handles 231-1 and 231-2. Each of handles 231-1 and 231-2 may comprise a strip of material that may be similar in composition to that of sheet 161 and/or sheet 163 and that may be formed into a loop and secured, for example, by stitching, to inner face 165 of sheet 161. Handle 231-1 may be secured to sheet 161 along the seam between pockets 191-7 and 191-8 and along the seam between pockets 191-8 and 191-9, with the ends of handle 231-1 extending short distances laterally beyond sides 169 and 171. Handle 231-2 may be secured to sheet 161 along the seam between pockets 191-10 and 191-11 and along the same between pockets 191-11 and 191-12, with the ends of handle 231-2 extending short distances laterally beyond sides 169 and 171.

First assembly 153 may be regarded as being divided into a first end section 240, a second end section 242, and an intermediate section 244, first end section 240 including pockets 191-1 through 191-6, second end section 242 including pockets 191-7 through 191-12, and intermediate section including pockets 191-13 through 191-18. As can be seen in FIG. 12, when pallet cover 151 is in use, first end section 240 may be positioned along one side of a payload, second end section 242 may be positioned along an opposite side of a payload, and intermediate section 242 may be positioned over the payload.

Second assembly 155, which is also shown separately in FIGS. 17(a) through 17(e), may comprise an inner (i.e., proximate to the payload) sheet 261 and an outer (i.e., distal to the payload) sheet 263. Inner sheet 261 and outer sheet 263 may be similar in material composition to sheets 161 and 163. Inner sheet 261 may be generally rectangular and may include an inner face 265, an outer face 267, a first long side 269, a second long side 271, a first short side 273, and a second short side 275. Sheet 263, which may include an inner face 277 and an outer face 279, may be an I-shaped structure that may include a first end section 280, a second end section 282, and an intermediate section 284. First end section 280 and second end section 282 may be dimensioned to have equal lengths to one another and to have equal widths to one another whereas intermediate section 284 may have a reduced length and a reduced width as compared to first end section 280 and second end section 282. First end section 280 may include a first side 281, a second side 283, a first end 285, and a second end 287, second end section 282 may include a first side 289, a second side 291, a first end 293, and a second end 295, and intermediate section 284 may include a first side 297 and a second side 299.

Sheets 261 and 263 may be appropriately dimensioned relative to one another so that sides 273 and 275 of sheet 261 may be aligned with ends 285 and 293, respectively, of sheet 263 and so that sides 269 and 271 of sheet 261 may be aligned with sides 297 and 299, respectively, of sheet 263. With sheets 261 and 263 thus aligned, sides 281 and 283 of end portion 280 and sides 289 and 291 of end portion 282 may extend laterally for short distances beyond sides 269 and 271 of sheet 261. Sheets 261 and 263 may be joined to one another, for example, using stitching or another suitable technique, to define a plurality of seams. For example, sheets 261 and 263 may be stitched together in such a way as to define a plurality of lateral seams 301 that may extend from side 269 of sheet 261 to side 271 of sheet 261 (or that may extend nearly the entirety of said distance), as well as over the corresponding portions of sheet 263. One of lateral seams 301 may be positioned parallel to and proximate to side 273 of sheet 261 and end 285 of sheet 263, another of lateral seams 301 may be positioned parallel to and proximate to side 275 of sheet 261 and end 293 of sheet 263, respectively, and the remainder of lateral seams 301 may be positioned therebetween and parallel to one another. In this manner, lateral seams 301 may help to define a plurality of pockets 303 that may be parallel to one another and that may extend laterally between the sides 269 and 271 of sheet 261. Some of these pockets 303 (which may be individually identified in certain figures or discussed herein as pockets 303-1 through 303-6) may be formed by the joinder of end portion 280 to sheet 261, and other of these pockets 303 (which may be individually identified in certain figures or discussed herein as pockets 303-7 through 303-12) may be formed by the joinder of end portion 282 to sheet 261.

In addition to being joined together along lateral seams 301, sheets 261 and 263 may also be joined to one another, by stitching or another suitable technique, to define a first longitudinal seam 305 and a second longitudinal seam 307. First longitudinal seam 305 may extend from side 273 of sheet 261 and end 285 of sheet 263 to side 275 of sheet 261 and end 293 of sheet 263, respectively, or may extend nearly the entirety of said distance, and may be positioned proximate to sides 271 and 299 of sheet 261 and 263, respectively. In this manner, the end of each pocket 303 proximate to sides 271 and 299 of sheets 261 and 263, respectively, may be permanently closed by longitudinal seam 305. Second longitudinal seam 307 may extend from a location corresponding to end 287 of sheet 263 to a location corresponding to end 295 of sheet 263, or may extend nearly the entirety of said distance, and may be positioned proximate to sides 269 and 297 of sheets 261 and 263, respectively. In this manner, the portion of sheet 261 that is joined to intermediate portion 284 may be permanently closed on all four sides. As will be apparent below, the foregoing portion of sheet 261 that is joined to intermediate portion 284 may be devoid of any temperature-control members.

Second assembly 155 may further comprise a releasable fastening mechanism to enable the reversible opening and closing of the end of each pocket 303 that is proximate to side 269 of sheet 261. Such a releasable fastening mechanism may comprise, for example, strips of complementary hook and loop fasteners. For example, a first strip of hook fasteners 315-1 may be stitched or otherwise secured to outer face 267 of inner sheet 261 substantially flush with side 269, said first strip of hook fasteners 315-1 corresponding generally in length to the length of side 283 of end portion 280 and being aligned with end portion 280 of sheet 263. In addition, a second strip of hook fasteners 315-2 may be stitched or otherwise secured to outer face 267 of inner sheet 261 substantially flush with side 269, said second strip of hook fasteners 315-2 corresponding generally in length to the length of side 291 of end portion 282 and being aligned with end portion 282 of sheet 263. Moreover, a first strip of loop fasteners 321-1 may be stitched or otherwise secured to the inner face 277 of outer sheet 263 substantially flush with side 283 of end portion 280, and a second strip of loop fasteners 321-2 may be stitched or otherwise secured to inner face 277 of outer sheet 263 substantially flush with side 291 of end portion 282. Strips of loop fasteners 321-1 and 321-2 may correspond in length to strips of hook fasteners 315-1 and 315-2; however, strips of loop fasteners 321-1 and 321-2 may be wider than strips of hook fasteners 315-1 and 315-2. In this manner, loop fasteners 321-1 and 321-2 may be used not only to mate with hook fasteners 315-1 and 315-2, respectively, to reversibly open and close pockets 303 but also to mate with nearby hook fasteners 201 of first assembly 153 when second assembly 155 is positioned over first assembly 153 (after appropriately bending the respective lateral sides of end portions 280 and 282), thereby enabling first assembly 153 and second assembly 155 to be reversibly joined to one another. In a similar fashion, a first strip of loop fasteners 323-1 may be stitched or otherwise secured to the inner face 277 of outer sheet 263 substantially flush with side 281 of end portion 280, and a second strip of loop fasteners 323-2 may be stitched or otherwise secured to the inner face 277 of outer sheet 263 substantially flush with side 289 of end portion 282. Strips of loop fasteners 323-1 and 323-2 may be sufficiently wide so as to be secured to outer sheet 263 by longitudinal seam 305 and to mate with nearby hook fasteners 201 of first assembly 153 when second assembly 155 is positioned over first assembly 153 (after appropriately bending the respective lateral sides of end portions 280 and 282).

It is to be understood that, although, in the present embodiment, sheet 263 is wider than sheet 261, sheets 261 and 263 could have matching dimensions, with strips of loop fasteners 321-1, 321-2, 323-1 and 323-2 extending laterally beyond the sides of sheets 261 and 263.

If desired, lateral seams 301 may extend through strips of hook fasteners 315-1 and 315-2 and loop fasteners 321-1 and 321-2, thereby permanently joining together portions of the strips of hook fasteners 315-1 and 315-2 and loop fasteners 321-1 and 321-2 between sheets 261 and 263. (Lateral seams 301 may also extend through strips of loop fasteners 323-1 and 323-2.) To facilitate the detaching of hook fasteners 315-1 and 315-2 from loop fasteners 321-1 and 321-2 in the areas defining the selectively openable/closable ends of pockets 303, one or more fabric tabs (not shown) may be sewn over one or more small portions of hook fasteners 315-1 and 315-2 and/or loop fasteners 321-1 and 321-2.

To summarize, sheets 261 and 263 may be joined together to define a first end section 330 comprising a plurality of parallel, laterally-extending pockets 303-1 through 303-6, a second end section 332 comprising a plurality of parallel, laterally-extending pockets 303-7 through 303-12, and a central section 334 of narrowed length and width interconnecting end sections 330 and 332. Each of pockets 303-1 through 303-12 may have a permanently closed end and an open end. The open ends may be reversibly opened and closed with complementary hook and loop fasteners 315-1 and 315-2 and 321-1 and 321-2. The loop fasteners 321-1 and 321-2 not only may be used to mate with the hook fasteners 315-1 and 315-2 to reversibly open and close pockets 303 but also may be used to mate with hook fasteners 201 on first assembly 153 to detachably couple first assembly 153 to second assembly 155. Additional loop fasteners 323-1 and 323-2 positioned proximate to the permanently closed ends of pockets 303 may also be used to mate with other hook fasteners 201 on first assembly 153 to detachably couple first assembly 153 to second assembly 155. In the present embodiment, each of pockets 303-1 through 303-12 may have a width of approximately 7.5 inches and a length of approximately 47 inches. (It is to be understood that the number of pockets 303 and the dimensions thereof are merely illustrative and that variations in the number and/or dimensions of pockets 303 may be made while still coming within the scope of the present invention.) As can be seen in FIG. 12, when pallet cover 151 is in use, second assembly 155 may be offset relative to first assembly 153, with first end section 330 positioned along a side of the payload P uncovered by first assembly 153, second end section 332 positioned along an opposite side of the payload P uncovered by first assembly 153, and intermediate section 334 positioned over the payload P.

It is to be understood that, although, in the present embodiment, sheets 261 and 263 are fabricated as two separate pieces, sheets 261 and 263 could be fabricated as a unitary (i.e., one-piece) structure that may be folded or otherwise divided into two sections and thereafter stitched or otherwise secured to one another in substantially the manner described above.

Figure 18A:
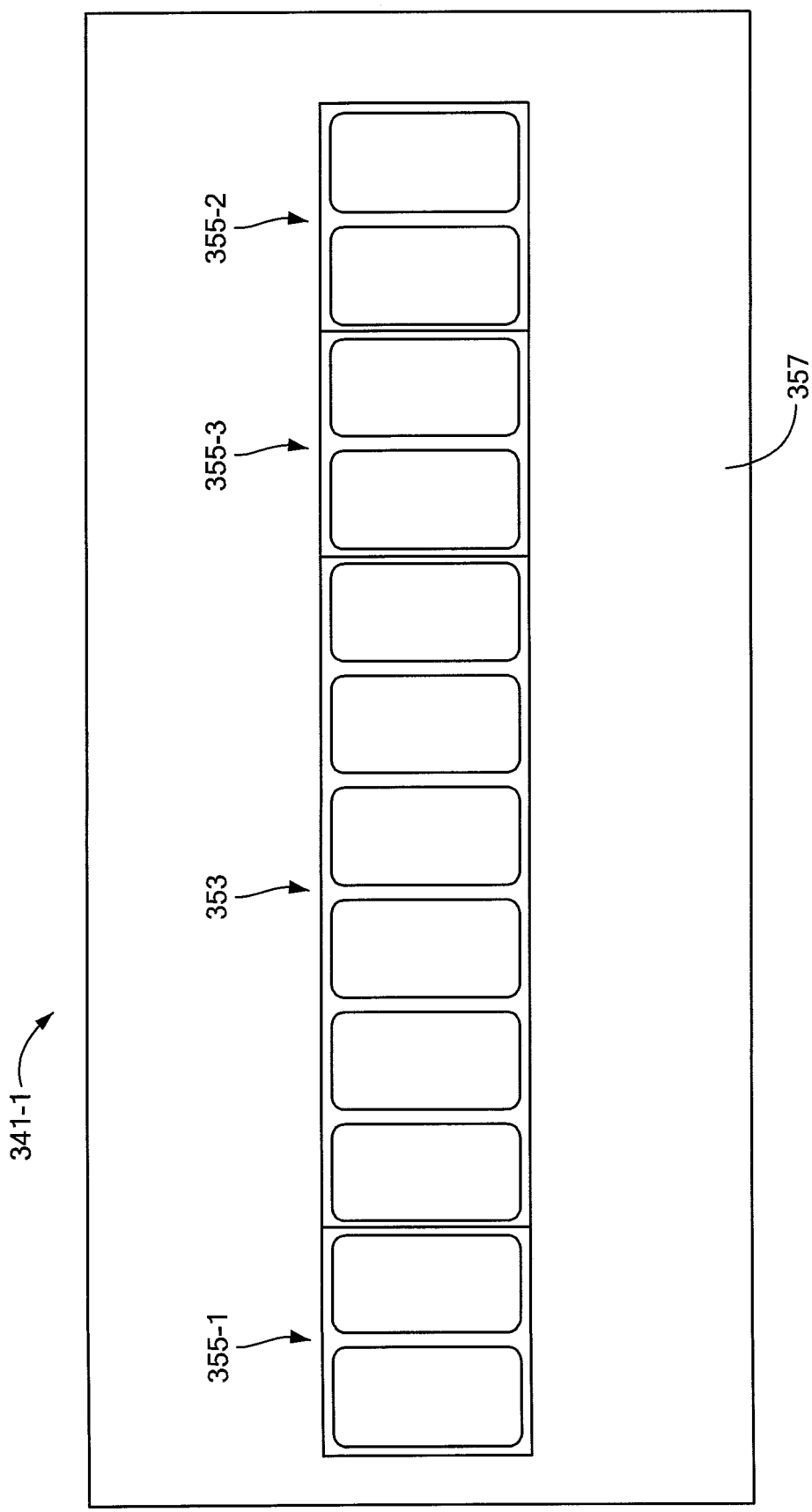
FIGS. 18(*a*) and 18(*b*) are enlarged partly exploded top and side views, respectively, of one of the first plurality of temperature-control members shown in FIG. 17(*c*)
Figure 18B:
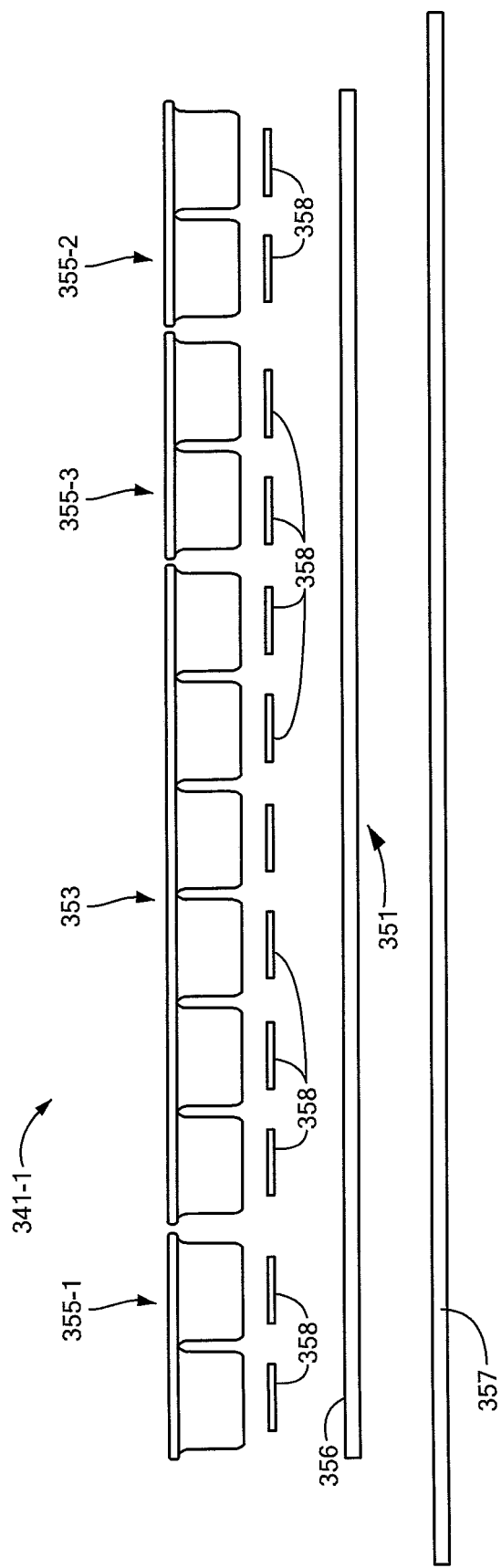

Second assembly 155 may further comprise a first plurality of temperature-control members 341-1 through 341-4 and a second plurality of temperature-control members 343-1 through 343-8. Members 341-1 through 341-4 may be identical to one another (but need not be), and a representative such member, namely, member 341-1, is shown separately in FIGS. 18(a) and 18(b). As can be seen best in FIGS. 18(a) and 18(b), member 341-1 may comprise a support 351, one 6-pouch PCM-mat 353, three 2-pouch PCM-mats 355-1 through 355-3, and a sheet of wrapping material 357. Support 351, which may be used to provide structural reinforcement to member 341-1, may be made of a lightweight but rigid material. An example of a suitable material for use as support 351 may include corrugated cardboard. Support 351 may be fashioned as a unitary (i.e., one-piece) structure and may be dimensioned to extend nearly the full length and width of a pocket 303.

PCM-mat 353 may be identical to PCM-mat 213 (but need not be), and PCM-mats 355-1 through 355-3 may be identical to PCM-mats 215-1 and 215-2 (but need not be). PCM-mats 355-1 and 355-2, each of which may have a width similar to that of support 351, may be positioned at opposite ends of support 351 and may be secured to a top surface 356 of support 351 with double-sided tape 358. PCM-mats 353 and 355-3, each of which may have a width similar to that of support 351, may be positioned on support 351 between PCM-mats 355-1 and 355-2 and may be secured to a top surface 356 of support 351 with double-sided tape 358. Collectively PCM-mats 353 and 355-1 through 355-3 may approximate the length of support 351. (In the present embodiment, PCM-mats 353 and 355-1 through 355-3 may have a collective length that is slightly greater than that of support 351, but they may be mounted on support 351 in a slightly overlapping manner to approximate the length of support 351.) It is to be understood that, although PCM-mats 353 and 355-1 through 355-3 may be constructed as four separate mats in the present embodiment, such mats could be constructed as a single continuous mat. As can be appreciated, any of the phase-change materials discussed in this patent application may be used in any of PCM-mats 353, 355-1, 355-2 and 355-3. Moreover, one or more of PCM-mats 353, 355-1, 355-2 and 355-3 may be replaced with conventional ice packs, conventional gel packs, conventional salt water packs, or other conventional refrigerant structures.

Wrapping material 357, which may be, for example, a sheet of shrink-wrap material, may be shrink-wrapped around mats 353, 355-1, 355-2 and 355-3 and support 351 to help keep mats 353, 355-1, 355-2, and 355-3 stationary on support 351.

Figure 19A:
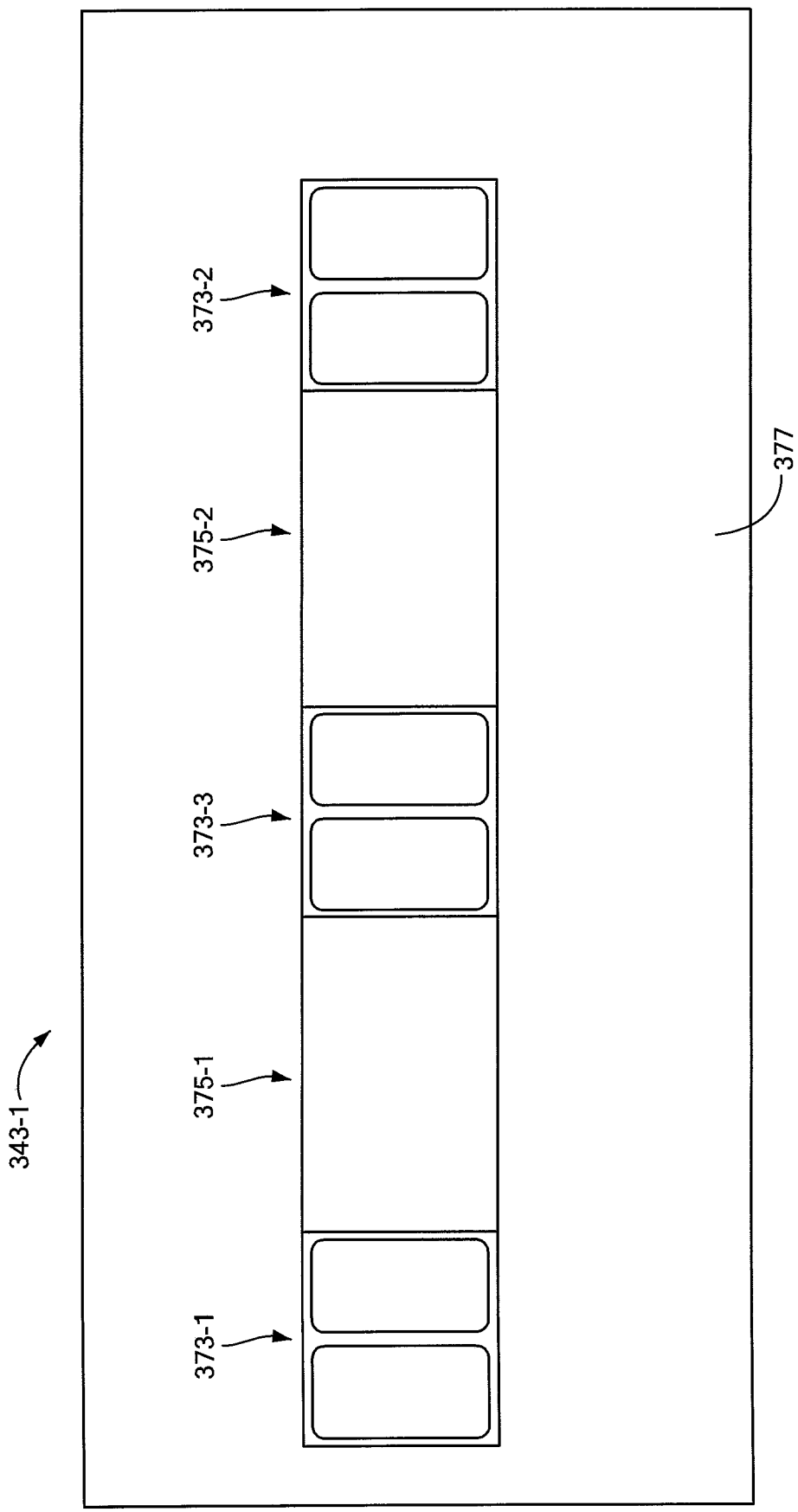
FIGS. 19(*a*) and 19(*b*) are enlarged partly exploded top and side views, respectively, of one of the second plurality of temperature-control members shown in FIG. 17(*c*)
Figure 19B:
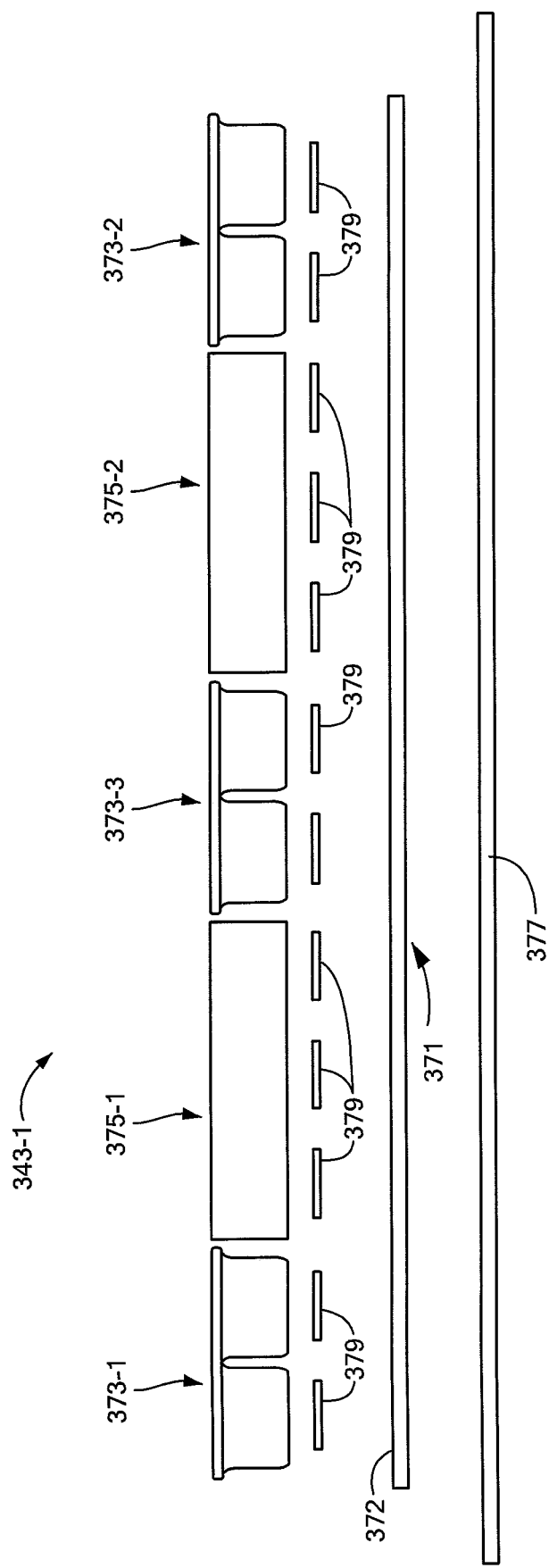

Members 343-1 through 343-8 may be identical to one another (but need not be), and a representative such member, namely, member 343-1, is shown separately in FIGS. 19(a) and 19(b). As can be seen best in FIGS. 19(a) and 19(b), member 343-1 may comprise a support 371, three 2-pouch PCM-mats 373-1, 373-2 and 373-3, two insulation members 375-1 and 375-2, and a sheet of wrapping material 377. Support 371 may be identical to support 351 of member 341-1 and may be similarly dimensioned to extend nearly the full length and width of a pocket 303. PCM-mats 373-1 through 373-3 may be identical to PCM-mats 355-1 through 355-3 of temperature-control member 341-1 (but need not be), with PCM-mat 373-1 being positioned on a top surface 372 of support 371 at one end thereof, PCM-mat 373-2 being positioned on top surface 372 of support 371 at the opposite end thereof, and PCM-mat 373-3 being positioned on top surface 372 of support 371 approximately equidistantly between PCM-mats 373-1 and 373-2. PCM-mats 373-1 through 373-3 may be securely mounted on top surface 372 of support 371 with strips of double-sided adhesive tape 379. Insulation members 375-1 and 375-2 may be identical to one another and may be made of a suitable thermal insulating material, such as a pad of an open-cell polyurethane foam. Insulation member 375-1 may be positioned on top surface 372 of support 371 and may be appropriately sized to substantially fill the space between PCM-mats 373-1 and 373-3, and insulation member 375-2 may be positioned on top surface 372 of support 371 and may be appropriately sized to substantially fill the space between PCM-mats 373-2 and 373-3. Insulation members 375-1 and 375-2 may be securely mounted on top surface 372 of support 371 with strips of double-sided adhesive tape 379. As can be appreciated, any of the phase-change materials discussed in this patent application may be used in any of PCM-mats 373-1, 373-2 and 373-3. Moreover, one or more of PCM-mats 373-1, 373-2 and 373-3 may be replaced with conventional ice packs, conventional gel packs, conventional salt water packs, or other conventional refrigerant structures.

Wrapping material 377, which may be identical to wrapping material 357 of temperature-control member 341-1, may be shrink-wrapped around mats 373-1, 373-2 and 373-3, insulation members 375-1 and 375-2, and support 371 to help keep mats 373-1, 373-2, 373-3 and insulation members 375-1 and 375-2 stationary on support 371.

Figure 20:
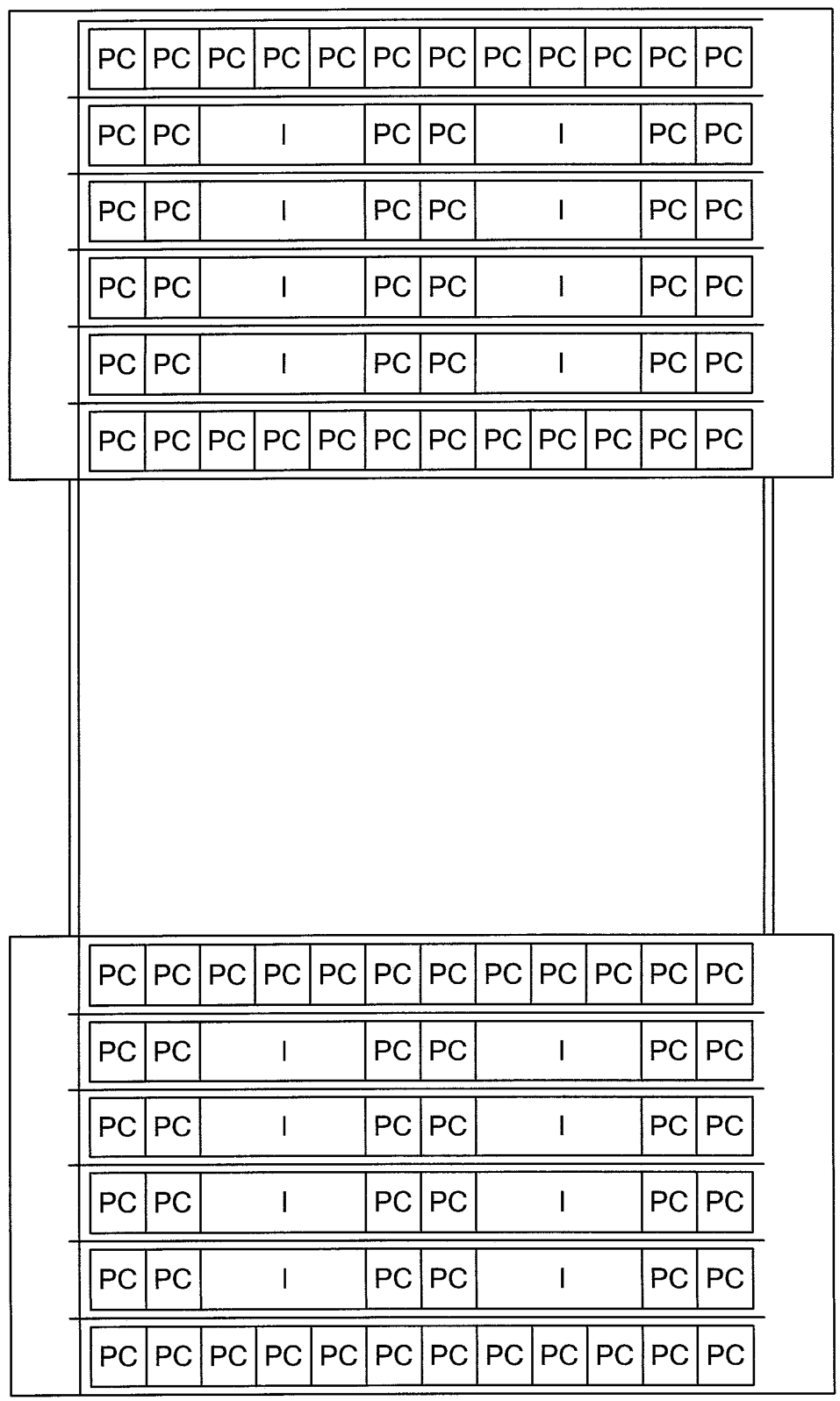
FIG. 20 is a schematic diagram illustrating the placement of phase-change material and insulation in the second assembly of FIG. 12, the second assembly being shown in an unfolded state.

Members 341-1 through 341-4 may be loaded in pockets 303-1, 303-6, 303-7 and 303-12, respectively, and members 343-1 through 343-8 may be loaded in pockets 303-2, 303-3, 303-4, 303-5, 303-8, 303-9, 303-10, and 303-11, respectively. In this manner, members 341-1 through 341-4 and members 343-1 through 343-8 may form a pattern of phase-change material PC and insulation I that is schematically shown in FIG. 20. As will become apparent below, when second assembly 155 is in use on a payload, such a pattern resembles a bifurcated windowpane on two opposing sides of a payload (second assembly 155 not positioning any temperature-control members over the payload). Such an arrangement places phase-change material predominantly in the peripheral areas of the payload, where thermal protection is needed most, while minimizing the weight and cost of the assembly. In the present embodiment, the same type and quantity of phase-change material is used for each location of phase-change material PC within second assembly 155—but need not be. Moreover, the same type and quantity of phase-change material is preferably used in both first assembly 153 and second assembly 155; however, it should be understood that the type and/or quantity of phase-change material need not be the same for each location of phase-change material PC and/or need not be the same for both first assembly 153 and second assembly 155. For example, different types and/or quantities of phase-change materials may be present in different pouches or different containers within the same pocket and/or different types and/or quantities of phase-change materials may be present in different pockets within the same assembly 153 or assembly 155 and/or different types and/or quantities of phase-change materials may be present in assemblies 153 and 155. This may be done, for example, to provide increased thermal protection in selected areas, such as along the peripheries of one or more of the walls. Moreover, it should be understood that other patterns of phase-change material may be used, such as, but not limited to, the replacement of some or all insulation with a phase-change material, which may be the same or different than that in the phase-change material PC locations, or vice versa. As an example of the foregoing, one could replace the locations containing insulation with a phase-change material having a different (e.g., higher) phase-change temperature than the phase-change material in the locations currently containing phase-change material. Consequently, the insulation or alternative phase-change material may function as a spacer between the existing phase-change material.

Second assembly 155 may further comprise a pair of handles 381-1 and 381-2. Each of handles 381-1 and 381-2 may comprise a strip of material that may be similar in composition to that of sheet 261 and/or sheet 263 and that may be formed into a loop and secured, for example, by stitching, to inner face 265 of sheet 261. Handles 381-1 and 383-2 may be secured to the portion of sheet 261 positioned below intermediate portion 284 of sheet 263, with the ends of handles 381-1 and 381-2 extending short distances laterally beyond sides 269 and 271. Handles 381-1 and 381-2 may be generally parallel to one another.

Figure 8:
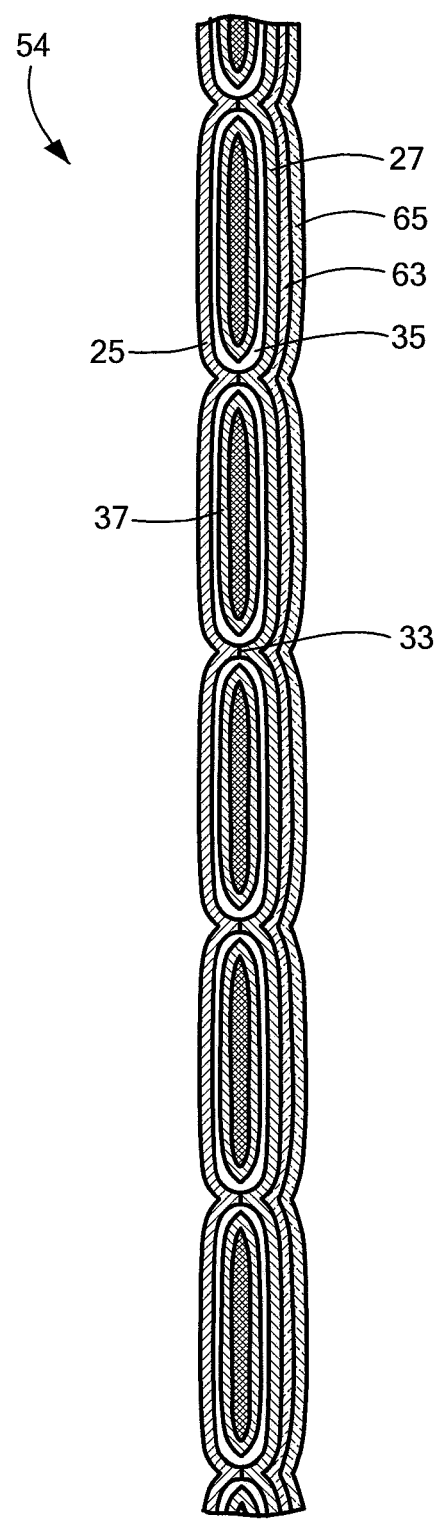
FIG. 8 is an enlarged fragmentary section view of the front wall shown in FIG. 7.

As can be appreciated, one or both of assemblies 153 and 155 may be modified in one or more of the panels thereof to include an insulation layer of the type shown in FIG. 8.

As can also be appreciated, one or both of assemblies 153 and 155 may be modified to further include an additional panel or other structure that may be positioned below the payload. Such a structure may include, but need not include, one or more temperature-control members as described above or other types of temperature-control members including phase-change material. Alternatively, the structure for positioning under the payload may be a physically discrete structure from assemblies 153 and 155. Moreover, the structure may be a pallet assembly comprising phase-change material, such a pallet assembly being disclosed, for example, in U.S. Patent Application Publication No. US 2013/0015191 A1, inventors Seagle et al., published Jan. 17, 2013, and incorporated herein by reference.

Pallet cover 151 may further comprise a wrap 391. Wrap 391 may be similar in composition to wrap 83 of pallet cover 81 and may be appropriately dimensioned to be positioned over substantially the entireties of first assembly 153 and second assembly 155 after first assembly 153 and second assembly 155 have been positioned on a payload P. Wrap 391, which may be a five-sided structure fashioned as a unitary structure, may include a first side 393 and a second side 395 that may be detachably joined to one another with complementary hook and loop fasteners (not shown) to facilitate the mounting and removal of wrap 391 relative to first assembly 153 and second assembly 155.

In use, assembly 153 may be arranged relative to a payload P so that pockets 191-1 through 191-6 are positioned along one of the two shorter sides of the payload P (i.e., one of the 40-inch sides), so that pockets 191-7 through 191-12 are positioned on top of the payload P, and so that pockets 191-13 through 191-18 are positioned along the other of the two shorter sides of the payload P. In this manner, the portion of assembly 153 relating to pockets 191-1 through 191-6, including the temperature-control members associated therewith, may function as a front wall of cover 151, the portion of assembly 153 relating to pockets 191-13 through 191-18, including the temperature-control members associated therewith, may function as a rear wall, and the portion of assembly 153 relating to pockets 191-7 through 191-12, including the temperature-control members associated therewith, may function as a part of a top wall. Next, assembly 155 may be arranged so that pockets 303-1 through 303-6 are positioned along one of the two longer sides of the payload P (i.e., one of the 48-inch sides), so that pockets 303-7 through 303-12 are positioned along the other of the two longer sides of the payload P, and so that the remainder of second assembly 155 is positioned over that portion of first assembly 153 that is positioned over the payload P. In this manner, the portion of assembly 155 relating to pockets 303-1 through 303-6, including the temperature-control members associated therewith, may function as a first side wall, the portions of assembly 155 relating to pockets 303-7 through 303-12, including the temperature-control members associated therewith, may function as a second side wall, and the remaining portion of assembly 155, together with the underlying portion of assembly 153, may function as a top wall. Next, the adjacent walls of assemblies 153 and 155 may be detachably joined to one another by mating strip of hook fasteners 201-2 to strip of loop fasteners 323-2, by mating strip of hook fasteners 201-1 to strip of loop fasteners 323-1, by mating strip of hook fasteners 201-4 to loop fasteners 321-2, and by mating strip of hook fasteners 201-3 to strip of loop fasteners 321-1. Wrap 391 may then be mounted over the combination of first assembly 153 and second assembly 155.

As can readily be appreciated, prior to using assemblies 153 and 155 in the above-described manner, the various temperature-control units may be pretreated (i.e., preconditioned) at a desired temperature and for a desired duration and then loaded into their respective pockets. In some embodiments, all of the temperature-control units may be preconditioned at the same temperature and/or for the same duration whereas, in other embodiments, some temperature-control units may be preconditioned at different temperatures and/or for different durations than other temperature-control units. For example, where a first temperature-control unit employs a different type of phase-change material than that employed by a second temperature-control unit, it may be desirable, in certain cases, to precondition the first temperature-control unit at a different temperature and/or for a different duration than the second temperature-control unit. As an illustration of the above, a first temperature-control unit may employ a first phase-change material having a comparatively lower phase-change temperature, and a second temperature-control unit may employ a second phase-change material having a comparatively higher phase-change temperature. In such a case, the first temperature-control unit may be preconditioned at a comparatively lower temperature such that the first phase-change material is in a solid state, and the second temperature-control unit may be preconditioned at a comparatively higher temperature such that the second phase-change material is in a liquid state. Alternatively, the first temperature-control and the second temperature-control unit may employ the same phase-change material, but the first temperature-control unit may be preconditioned at a temperature such that its phase-change material is in a solid state whereas the second temperature-control unit may be preconditioned at a temperature such that its phase-change material is in a liquid state.

Alternatively, the preconditioning of the temperature-control units may take place after the temperature-control units have been loaded into their respective pockets.

As can be appreciated, because the temperature-control members of cover 151 may be removably mounted within assemblies 153 and 155 and may be replaced with other temperature-control members having different phase-change temperatures therefrom, one may modify cover 151 so that it is particularly well-suited for maintaining a payload within a particular temperature range. For example, one could employ temperature-control members that are designed to maintain a payload within a temperature range of approximately +2° C. to +8° C. or, alternatively, could employ temperature-control members that are designed to maintain a payload within a temperature range of approximately +15° C. to +25° C. or, alternatively, could employ temperature-control members that are designed to maintain a payload within a temperature range of approximately −15° C. to −25° C., or, alternatively, could employ temperature-control members that are designed to maintain a payload within a different temperature range. For example, the phase-change material could have a phase-change temperature of 3° C., 5° C., or 7° C. and could be preconditioned at 3° C., 5° C., or 7° C., respectively, or could have a phase-change temperature of 17° C. and could be preconditioned at about 17° C., or could have a phase-change temperature of about −23° C. or −28° C. and could be preconditioned at about −23° C. or −28° C., respectively.

The lengths of the front, rear and side walls defined by assemblies 153 and 155 may be adjusted by folding and tucking the ends of assemblies 153 and 155 inwardly by one or more pockets. If desired, the temperature-control members of the tucked-in pocket(s) may be removed therefrom and/or the arrangement of remaining temperature-control members may be adjusted to maintain a bisected-window-pane pattern.

In another embodiment (not shown), first assembly 153 and second assembly 155 may be modified so that each of the front, rear, and two side walls may be constructed as a two-piece or multi-piece structure that may be detachably joined together, for example, using complementary strips of VELCRO hook and loop fasteners or another type of releasable fastener.

The embodiments of the present invention described above are intended to be merely exemplary and those skilled in the art shall be able to make numerous variations and modifications to it without departing from the spirit of the present invention. All such variations and modifications are intended to be within the scope of the present invention.

What is claimed is:

1. A pallet cover suitable for use in covering at least a portion of a payload on a pallet, the pallet cover comprising:
    (a) a top wall;
    (b) a front wall;
    (c) a rear wall;
    (d) a left side wall; and
    (e) a right side wall;

(f) wherein at least one of said top wall, said front wall, said rear wall, said left side wall, and said right side wall comprises a plurality of pockets capable of receiving a temperature-control member, wherein at least one of said top wall, said front wall, said rear wall, said left side wall, and said right side wall further comprises a first type of temperature-control member disposed in a first pocket of said plurality of pockets and a second type of temperature-control member disposed in a second pocket of said plurality of pockets, wherein the first type of temperature-control member comprises a first plurality of pouches containing phase-change material, the first plurality of pouches extending substantially across the first pocket, and wherein the second type of temperature-control member comprises a second plurality of pouches containing phase-change material, at least some of the second plurality of pouches being separated from one another within the second pocket by one or more spacers.

2. The pallet cover as claimed in claim 1 wherein the first type of temperature-control member further comprises a first support and a first wrapping material, wherein the first plurality of pouches is positioned on the first support, and wherein the first wrapping material is wrapped around the first plurality of pouches and the first support.

3. The pallet cover as claimed in claim 2 wherein the second type of temperature-control member further comprises a second support and a second wrapping material, wherein the second plurality of pouches and the one or more spacers are positioned on the second support, and wherein the second wrapping material is wrapped around the second plurality of pouches, the one or more spacers and the second support.

4. The pallet cover as claimed in claim 3 wherein the one or more spacers are one or more pieces of insulation.

5. The pallet cover as claimed in claim 3 wherein the one or more spacers are one or more pouches of an alternative phase-change material.

6. The pallet cover as claimed in claim 1 wherein the first type of temperature-control member comprises a single phase-change material, wherein the second type of temperature-control member comprises a single phase-change material, and wherein the first type of temperature-control member and the second type of temperature-control member comprise the same phase-change material.

7. The pallet cover as claimed in claim 1 wherein at least one pouch of the first plurality of pouches and the second plurality of pouches contains a different phase-change material than at least one other pouch of the first plurality of pouches and the second plurality of pouches.

8. The pallet cover as claimed in claim 1 wherein the top wall, the front wall, the rear wall, the left side wall, and the right side wall are formed by the assembly of a first subassembly and a second subassembly, the first subassembly comprising a first central portion, a first end portion disposed at a first end of the first central portion, and a second end portion disposed at a second end of the first central portion, the second subassembly comprising a second central portion, a first end portion disposed at a first end of the second central portion, and a second end portion disposed at a second end of the second central portion, wherein each of said top wall, said front wall, said rear wall, said left side wall, and said right side wall comprises a plurality of pockets, wherein the first type of temperature-control member is removably disposed within at least some of the pockets of each plurality of pockets and the second type of temperature-control member is removably disposed within the remaining pockets of each plurality of pockets, and wherein one end of each pocket is sealed and another end of each pocket is constructed to be reversibly opened and closed.

9. The pallet cover as claimed in claim 1 wherein each of said top wall, said front wall, said rear wall, said left side wall, and said right side wall comprises a plurality of pockets for receiving a temperature-control member, wherein at least one of said top wall, said front wall, said rear wall, said left side wall, and said right side wall further comprises a temperature-control member disposed in at least one of said pockets, wherein at least one of said top wall, said front wall, said rear wall, said left side wall and said right side wall has an adjustable length, wherein each of said front wall, said rear wall, said left side wall and said right side wall comprises a first portion and a second portion, wherein the first portion has a bottom, wherein the second portion has a top, and wherein the top of the second portion is detachably joined to the bottom of the first portion.

10. The pallet cover as claimed in claim 9 wherein the first portion and the second portion have different lengths, wherein the second portion is devoid of a temperature-control member, and wherein each of the front wall, the rear wall, the left side wall and the right side wall is detachably joined to the top wall.

11. The pallet cover as claimed in claim 9 wherein each of the top wall, the front wall, the rear wall, the left side wall, and the right side wall comprises a first fabric sheet and a second fabric sheet, the first fabric sheet and the second fabric sheet being joined to one another to define the plurality of pockets, each of the plurality of pockets being suitable for holding a separate temperature-control member, wherein the pockets have at least one open end, and wherein each of the top wall, the front wall, the rear wall, the left side wall, and the right side wall further includes closures for securely yet removably retaining a temperature-control member in a pocket.

12. The pallet cover as claimed in claim 11 wherein each of the top wall, the front wall, the rear wall, the left side wall, and the right side wall further comprises a layer of insulation, the second fabric sheet being disposed between the first fabric sheet and the layer of insulation, wherein the top wall further comprises at least one looped handle to facilitate transport of the top wall, wherein the temperature-control member comprises a phase-change material and wherein the phase-change material is a gelled organic phase-change material comprising at least one n-alkane and a gelling agent selected from the group consisting of a styrene-ethylene-butylene-styrene triblock copolymer and a styrene-ethylene-propylene-styrene triblock copolymer.

13. The combination of the pallet cover of claim 1 and a thermal insulation wrap, the thermal insulation wrap being removably inserted over the pallet cover.

14. A kit for use in constructing a pallet cover, the pallet cover being suitable for covering at least a portion of a payload on a pallet, the kit comprising:
(a) a top wall;
(b) a front wall, the front wall being detachably joinable to the top wall;
(c) a rear wall, the rear wall being detachably joinable to the top wall;
(d) a left side wall, the left side wall being detachably joinable to each of the top wall, the front wall, and the rear wall;
(e) a right side wall, the right side wall being detachably joinable to each of the top wall, the front wall, and the rear wall; and (f) a plurality of temperature-control members, each of the temperature-control members comprising a container containing phase-change material;

(g) wherein each of said top wall, said front wall, said rear wall, said left side wall, and said right side wall comprises a plurality of pockets, each of the pockets being suitable for removably receiving at least one temperature-control member.

15. The kit as claimed in claim 14 wherein at least one of said front wall, said rear wall, said left side wall, and said right side wall comprises a plurality of detachably joinable portions, wherein each of said top wall, said front wall, said rear wall, said left side wall, and said right side wall comprises a first fabric sheet and a second fabric sheet, the first fabric sheet and the second fabric sheet being joined to one another to define at least some of said pockets, and wherein each of said top wall, said front wall, said rear wall, said left side wall, and said right side wall further comprises a layer of insulation and a third fabric sheet, the layer of insulation being positioned between the second fabric sheet and the third fabric sheet, the second fabric sheet being positioned between the first fabric sheet and the layer of insulation.

16. The kit as claimed in claim 14 further comprising a thermal insulation wrap, the thermal insulation wrap being dimensioned to be removably inserted over the pallet cover.

17. A pallet cover suitable for use in covering at least a portion of a payload on a pallet, the pallet cover comprising:
(a) a top wall;
(b) a front wall;
(c) a rear wall;
(d) a left side wall; and
(e) a right side wall;
(f) wherein at least one of said top wall, said front wall, said rear wall, said left side wall, and said right side wall comprises a first plurality of temperature-control members and at least one insulating member, the first plurality of temperature-control members arranged to circumscribe at least one void, the at least one insulating member being positioned within the at least one void.

18. The pallet cover as claimed in claim 17 wherein each of said top wall, said front wall, said rear wall, said left side wall, and said right side wall comprises a first plurality of temperature-control members, each of the temperature-control members comprising a phase-change material, the temperature-control members of each of said top wall, said front wall, said rear wall, said left side wall and said right wall being arranged to circumscribe two voids, and wherein an insulating member is positioned within each of the two voids, wherein each of said top wall, said front wall, said rear wall, said left side wall and said right side wall further comprises additional insulation members, the additional insulation members being arranged similarly to and in contact with the first plurality of temperature-control members, wherein each of said top wall, said front wall, said rear wall, said left side wall and said right side wall further comprises an inner sheet and an outer sheet, wherein the first plurality of temperature control members and the insulating members are positioned between the inner sheet and the outer sheet, and wherein the phase-change material is a gelled organic phase-change material comprising at least one n-alkane and a gelling agent selected from the group consisting of a styrene-ethylene-butylene-styrene triblock copolymer and a styrene-ethylene-propylene-styrene triblock copolymer.

19. The pallet cover as claimed in claim 18 wherein each of said top wall, said front wall, said rear wall, said left side wall and said right side wall further comprises a second plurality of temperature-control members, the second plurality of temperature-control members being arranged similarly to and in contact with the first plurality of temperature-control members, wherein the second plurality of temperature-control members comprises a phase-change material and wherein the phase-change material of the second plurality of temperature-control members differs from the phase-change material of the first plurality of temperature-control members.

20. The pallet cover as claimed in claim 17 further comprising a bottom wall, the bottom wall comprising a third plurality of temperature-control members, wherein each of the third plurality of temperature-control members comprises a phase-change material, wherein the third plurality of temperature-control members are arranged to circumscribe a void, and wherein the void of the bottom wall is unoccupied.

21. The combination of the pallet cover of claim 17 and a thermal insulation wrap, the thermal insulation wrap being removably inserted over the pallet cover.

22. A pallet cover suitable for use in covering at least a portion of a payload on a pallet, the pallet cover comprising:
(a) a first subassembly, said first subassembly comprising
(i) a central portion,
(ii) a first end portion disposed at a first end of the central portion, and
(iii) a second end portion disposed at a second end of the central portion;
(b) a second subassembly, said second subassembly comprising
(i) a central portion,
(ii) a first end portion disposed at a first end of the central portion, and
(iii) a second end portion disposed at a second end of the central portion;
(c) wherein each of the first end portion of the first subassembly, the second end portion of the first subassembly, the central portion of the first subassembly, the first end portion of the second subassembly, and the second end portion of the second subassembly comprises at least one pocket and at least one temperature-control member, the at least one temperature-control member comprising at least one container comprising phase-change material, the at least one temperature-control member being removably mounted in the at least one pocket; and
(d) wherein one of the central portion of the second subassembly and the central portion of the first assembly is mounted over the other of the central portion of the first subassembly and the central portion of the second assembly and wherein the first and second end portions of the first subassembly are offset relative to the first and second end portions of the second subassembly, whereby, when the pallet cover is positioned over a payload on a pallet, the central portions of the first and second subassemblies are positioned substantially over the top of the payload and the first and second end portions of the first and second subassemblies are positioned substantially along the sides of the payload.

23. The pallet cover as claimed in claim 22 wherein the first end portion of the first subassembly is detachably joined to each of the first and second end portions of the second subassembly with complementary hook and loop fasteners, wherein the second end portion of the first subassembly is detachably joined to each of the first and second end portions of the second assembly with complementary hook and loop fasteners.

24. The pallet cover as claimed in claim 22 wherein the first subassembly comprises a first pair of sheets, the first pair of sheets being joined to one another so as to define therein the central portion, the first end portion, the second end portion, and the at least one pocket in each of the central portion, the first end portion and the second end portion for removably receiving the at least one temperature-control member, wherein the second subassembly comprises a second pair of sheets, the second pair of sheets being joined to one another so as to define therein the central portion, the first end portion, the second end portion, and the at least one pocket in each of the first end portion and the second end portion for receiving the at least one temperature-control member.

25. The combination of the pallet cover of claim 22 and a thermal insulation wrap, the thermal insulation wrap being removably inserted over the pallet cover.

26. The pallet cover as claimed in claim 22 wherein the at least one pocket in each of the central portion and the first and second end portions of the first subassembly and in each of the first end portion and the second end portion of the second subassembly comprises a plurality of pockets for removably receiving temperature-control members, wherein the at least one temperature-control member in each of the first end portion of the first subassembly, the central portion of the first subassembly, the second end portion of the first subassembly, the first end portion of the second subassembly, and the second end portion of the second subassembly comprises a plurality of temperature-control members, with one of the plurality of temperature-control members being mounted within each of the plurality of pockets and wherein at least some of said plurality of temperature-control members within each plurality of pockets are of a first of two different varieties of temperature-control members and at least some of said plurality of temperature-control members within each of the plurality of pockets are of a second of two different varieties of temperature-control members, wherein the first of said two different varieties of temperature-control members comprises a uniform distribution of phase-change material and wherein the second of said two different varieties of temperature-control members comprises an alternating pattern of phase-change material and an insulating material, with phase-change material disposed at opposite ends of the temperature-control member.

27. The pallet cover as claimed in claim 26 wherein each of the central portion and the first and second end portions of the first subassembly and each of the first end portion and the second end portion of the second subassembly comprises two end pockets for removably receiving temperature-control members and at least one intermediate pocket for removably receiving temperature-control members, wherein the first of said two different varieties of temperature-control members is removably disposed in each of the two end pockets and wherein the second of said two different varieties of temperature-control members is removably disposed in each of the at least one intermediate pocket.

28. The pallet cover as claimed in claim 22 wherein the at least one pocket in each of the central portion, the first end portion, and the second end portion of the first subassembly extends laterally and generally parallel to the first end and the second end of the central portion of the first subassembly and comprises an opening at a lateral end thereof for passage of a temperature-control member therethrough, and wherein the at least one pocket in each of the first end portion and the second end portion of the second subassembly extends laterally and generally parallel to the first end and the second end of the central portion of the second subassembly and comprises an opening at a lateral end thereof for passage of a temperature-control member therethrough.

29. The pallet cover as claimed in claim 22 wherein the central portion of the second subassembly is devoid of a temperature-control member.

* * * * *